United States Patent
Smith

(10) Patent No.: US 10,711,452 B1
(45) Date of Patent: Jul. 14, 2020

(54) ACTUATABLE MODULAR STRUCTURES

(71) Applicant: William Ernst Smith, Lebanon, IL (US)

(72) Inventor: William Ernst Smith, Lebanon, IL (US)

( * ) Notice: Subject to any disclaimer, the term of this patent is extended or adjusted under 35 U.S.C. 154(b) by 572 days.

(21) Appl. No.: 15/389,803

(22) Filed: Dec. 23, 2016

(51) Int. Cl.
| | |
|---|---|
| *E04B 1/343* | (2006.01) |
| *B25J 18/00* | (2006.01) |
| *B25J 18/06* | (2006.01) |
| *G09B 23/24* | (2006.01) |
| *G09B 23/26* | (2006.01) |
| *F03G 7/06* | (2006.01) |
| *B64C 3/10* | (2006.01) |
| *G02B 26/08* | (2006.01) |

(52) U.S. Cl.
CPC ............... *E04B 1/343* (2013.01); *B25J 18/06* (2013.01); *B64C 3/10* (2013.01); *F03G 7/06* (2013.01); *G02B 26/0825* (2013.01)

(58) Field of Classification Search
CPC .. E04B 1/343; B64C 3/10; F03G 7/06; G09B 23/26; G09B 23/00; G09B 23/24; B25J 18/00
See application file for complete search history.

(56) References Cited

U.S. PATENT DOCUMENTS

| | | | |
|---|---|---|---|
| 3,796,004 A | | 3/1974 | Auerbach |
| 3,998,003 A | | 12/1976 | Rosenbaum |
| 5,173,053 A | * | 12/1992 | Swanson ............ H01R 13/5202 439/22 |
| 7,901,524 B1 | * | 3/2011 | McKnight ............... B29C 53/02 148/563 |
| 8,986,809 B2 | | 3/2015 | Gershenfeld et al. |

(Continued)

FOREIGN PATENT DOCUMENTS

WO 2014124293 A1 8/2014

OTHER PUBLICATIONS

Physical Finite Elements, Samuel Eli Calisch, MS Thesis, Massachusetts Institute of Technology, Sep. 2014.

*Primary Examiner* — Joanna Pleszczynska
(74) *Attorney, Agent, or Firm* — Grace J. Fishel

(57) ABSTRACT

Linear elements and connectors define the parts used by this building system to manufacture and/or form modules and multimodular structures. The linear elements and connectors meet and interact to form physical structures that can function as adaptable behavioral networks. At the junctures where linear elements and connectors meet, a plurality of interface mechanisms allow information transfer and/or form reversible structural changes within the modules and/or multimodular network structures built using this system. Structural changes within or between the fundamental digital elements making up a network structure may lead to the morphing of the greater structure. The fundamental digital elements are linear elements. The connectors allow the meeting/binding of digital elements. The connectors and linear elements act as structural and behavioral actuators that interface within the network structure they compose. These networks may use a plurality of linear element to connector interfaces to produce structural dynamism. This exemplary digital material's physical and logical topology is integrated to form fundamental networks that may produce structural and behavioral dynamism.

18 Claims, 32 Drawing Sheets

(56) References Cited

U.S. PATENT DOCUMENTS

| | | | |
|---|---|---|---|
| 2005/0161119 A1* | 7/2005 | McKinght | B29C 70/62 |
| | | | 148/108 |
| 2005/0201116 A1* | 9/2005 | Browne | F21S 41/333 |
| | | | 362/509 |
| 2005/0206095 A1* | 9/2005 | Keefe | E05B 47/0009 |
| | | | 277/628 |
| 2006/0186269 A1* | 8/2006 | Kota | B63B 1/285 |
| | | | 244/123.1 |
| 2012/0094060 A1 | 4/2012 | Gershenfeld et al. | |
| 2014/0302261 A1 | 10/2014 | Cheung et al. | |
| 2015/0367457 A1 | 12/2015 | Gershenfeld et al. | |
| 2015/0371556 A1 | 12/2015 | Smith | |
| 2016/0071433 A1 | 3/2016 | Smith | |

* cited by examiner

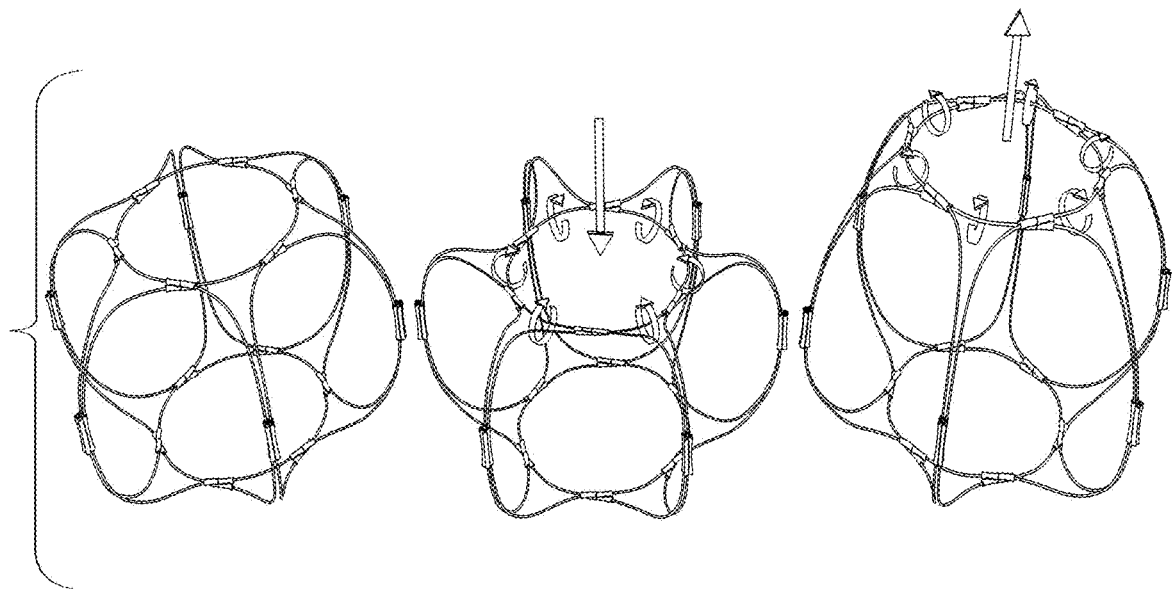
FIG. 3
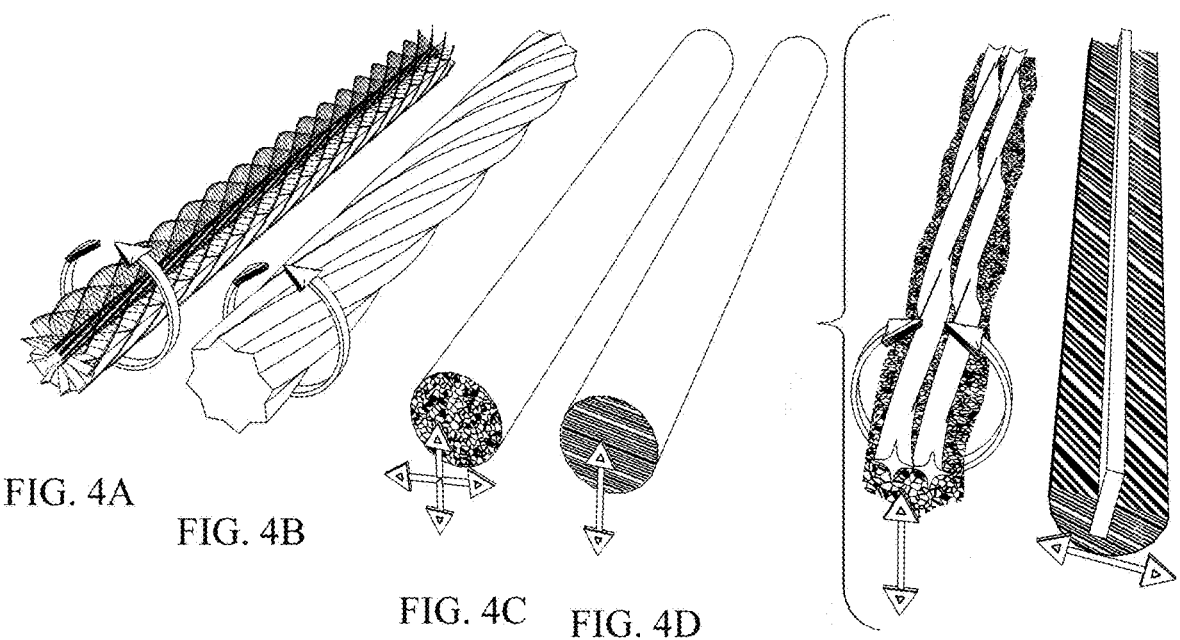
FIG. 4A
FIG. 4B
FIG. 4C
FIG. 4D
FIG. 4E

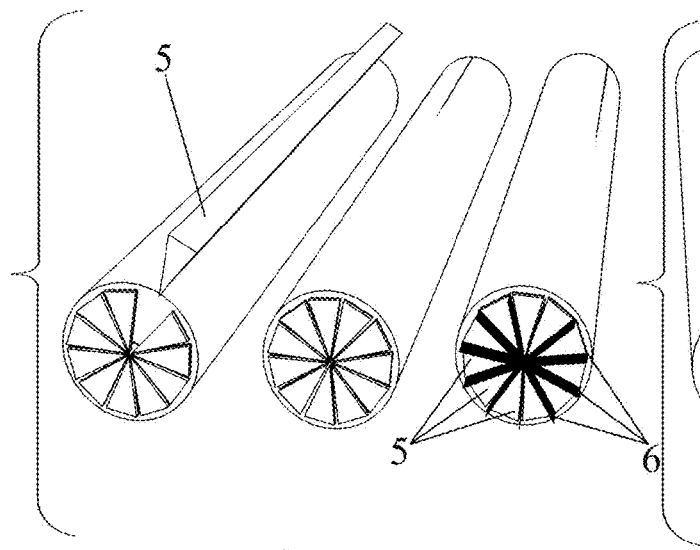
FIG. 5A
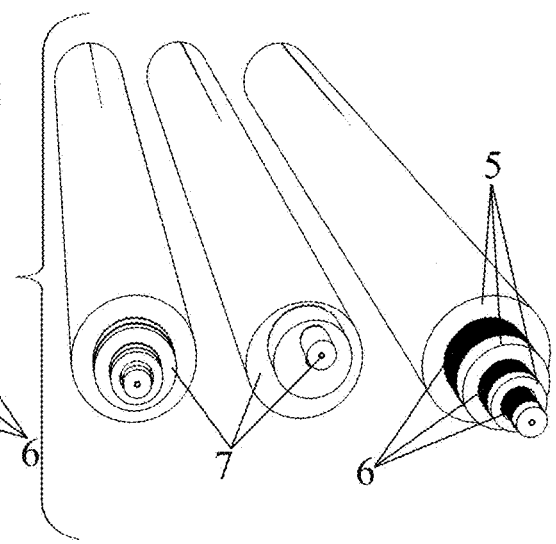
FIG. 5B
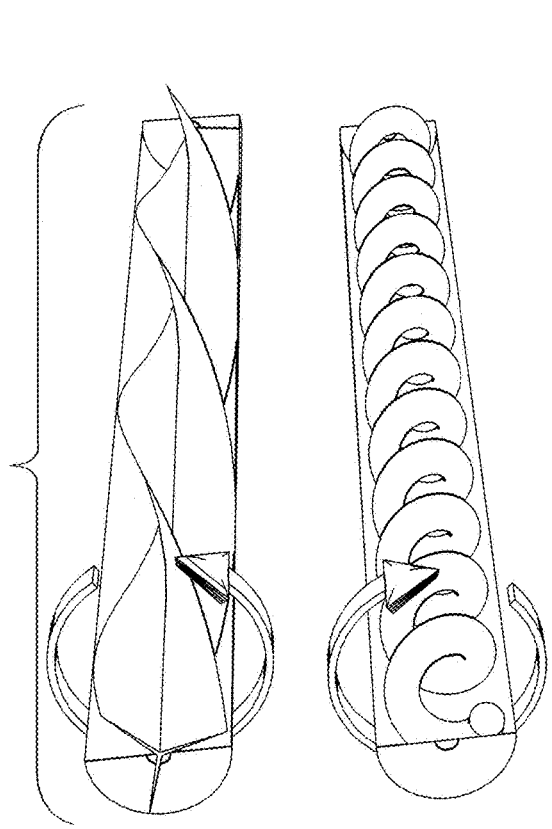
FIG. 6
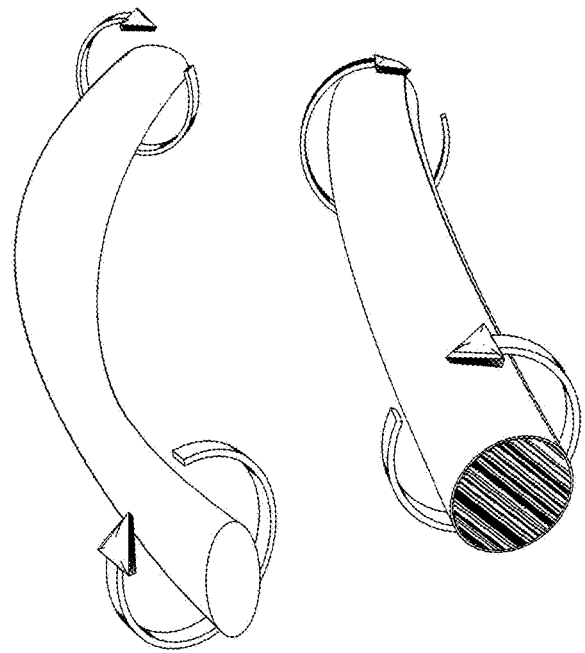
FIG. 7A
FIG. 7B

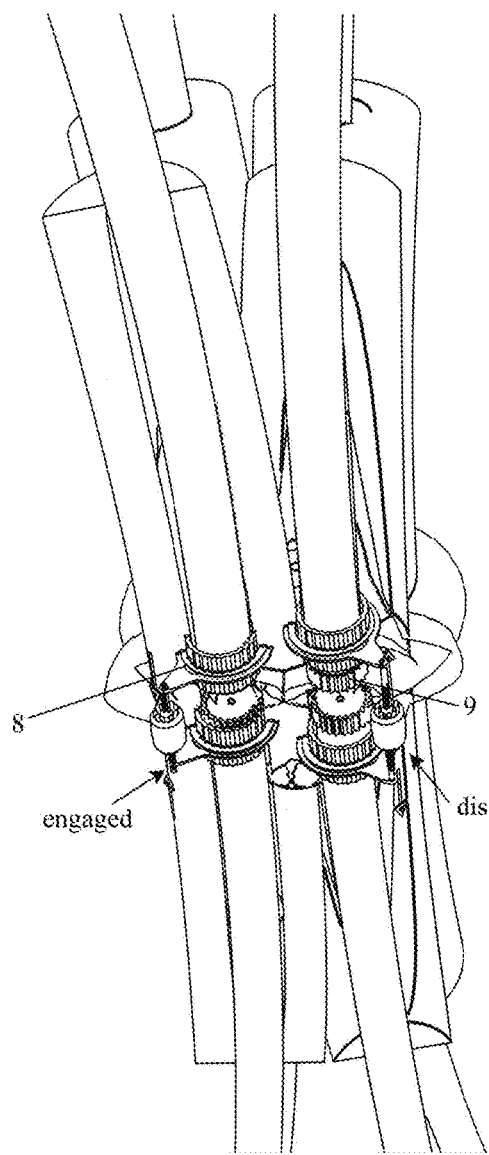
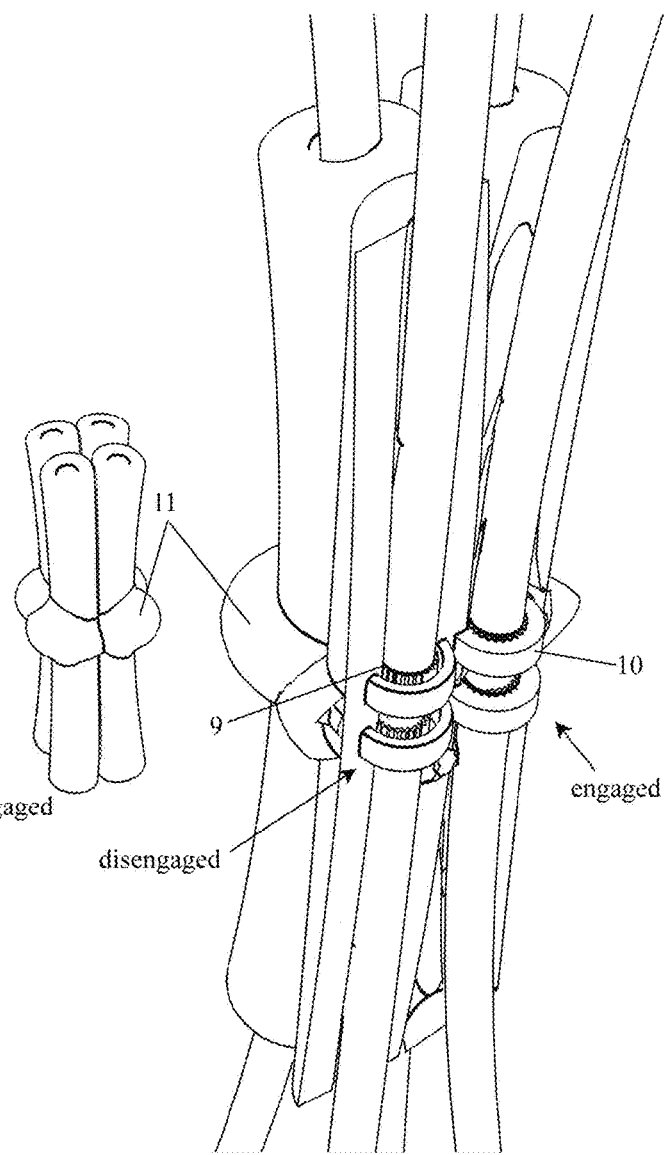
FIG. 9A                FIG. 9B
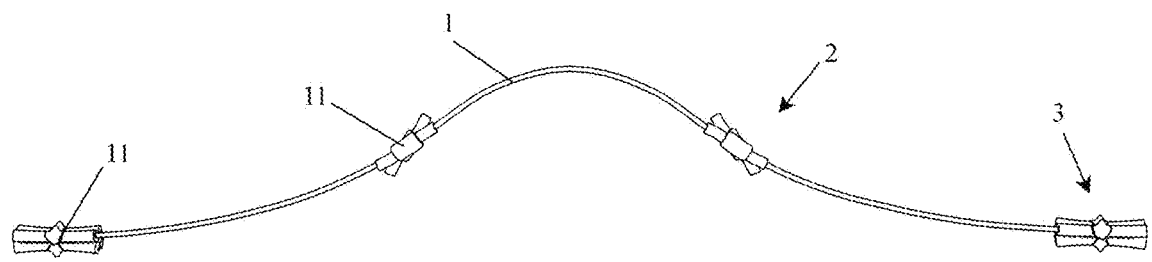
FIG. 10 base line  FIG. 28B  askew

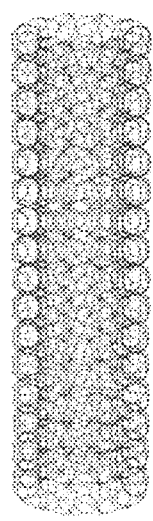
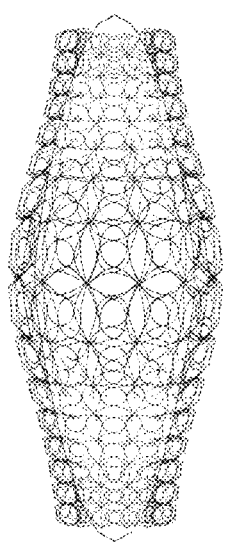
FIG 31A   FIG 31B
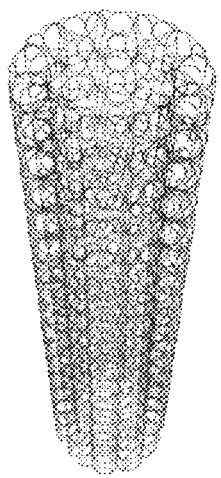
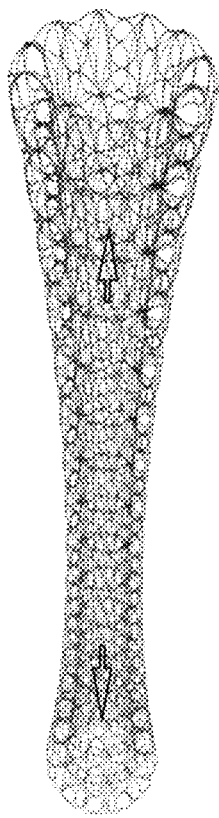
FIG 32A   FIG 32B

ACTUATABLE MODULAR STRUCTURES

BACKGROUND OF THE INVENTION

Field of the Invention

The present invention relates to an actuatable modular structure formed of linear elements held in assembly with intermodular and intramodular connectors. The elements of the actuatable modular structure include smart material and/or mechanical devices to assist in their adaptability and morphability.

Brief Description of the Prior Art

Existing devices that connect linear elements are incapable of actively altering said linear elements' material properties and/or physical position.

Connection devices that attach a plurality of linear elements to form modules and multimodular constructions exclusively function as connection devices and do not incorporate mechanisms that physically or electrically interface with the material(s) forming the linear element.

There are no multi-functioning connector devices with integrated electromechanical and/or tunable mechanisms capable of connecting linear elements to form digital structures that are composed of conventional composite material and/or smart composite material.

Existing connection devices that interface with the composite material linear elements are generally incapable of communicating with, altering and/or stimulating said composite material and/or smart composite material.

Existing connection devices with integrated electromechanical and/or tunable mechanisms are generally not capable of modulating the torque experienced by the linear elements they interface with.

Existing connection devices with integrated electromechanical and/or tunable mechanisms are incapable of reversibly engaging multiple linear elements end to end within a digital network structure.

Existing intramodular and intermodular connectors generally do not actively change their geometry and that of the linear elements they house.

Existing space frame truss systems are generally limited to forming planar structures and relatively simple geometries. Existing space frame systems' lattice structures are incapable of controlled elastic deformation and unable to adapt to external forces and/or load conditions.

Existing composite material systems used in aerospace and architecture are generally monolithic and difficult to modify and expand upon. They are also not modular and generally unable to form complex geometry which limits their prototyping capabilities and ability to form novel structures used in aerospace and/or robotic applications.

Existing steel superstructure systems are heavy, corrosion prone and limited in their ability to form the next generation of structures used in civil engineering and aerospace. Many current truss systems that use composite material vs steel are known to be stronger, lighter, and resistant to corrosion but they use a truss system similar to that used with steel. The building system described in this application uses a bio inspired modular system capable of taking advantage of modern and future composite material properties by allowing the creation of extremely complex forms for the next revolution in structural engineering.

Existing assembly devices that facilitate the rapid forming of sparse structures are not generally designed to manufacture/assemble modules and multimodular structures from linear elements, intramodular connectors and intermodular connectors.

BRIEF SUMMARY OF THE INVENTION

This application describes connector to linear element interface systems that use methods and mechanisms to form modules and multimodular network structures that may be capable of adaptable behavior.

All, some or none of the various mechanisms that populate the methods of interface can be integrated into or associated with the connectors and/or linear elements.

This application describes a digital material building system that strives to be elemental/fundamental in its choice of digital material units. Linear elements are the fundamental digital material units used by this building system. Structures formed from a plurality of interconnected linear elements show levels of structural hierarchy and structural organization. These levels/degrees of structural organization are similar to those seen in organic compounds, particularly those levels of structure attributed to the Structural Classification of Proteins. The incredible array of 3 dimensional shapes that can be formed using a relatively small number of amino acids inspires this building system.

Linear elements and connectors can be built and/or formed using tunable and/or conventional composite material.

The connector to linear element interface mechanisms described below can function independent of one another or be functionally integrated. The mechanisms used to stimulate tunable material may not be used if tunable materials are not used.

In general, linear elements made from tunable composite material provide greater functionality than those made of conventional composite material.

The described connector types can incorporate all, some or none of the mechanisms that interface with the linear elements.

Linear elements with specific physical and behavioral characteristics including material composition and cross sectional shape may be required to function in a coordinated manner with the specific connector mechanisms they interface with.

The described modular and multimodular manufacturing systems and the intramodular and intermodular connector to linear element interface types can be functionally interdependent.

Unless it is specified the connector to linear element interface mechanisms described in this application may be found in both intramodular and intermodular connector types.

Module and multimodular assembly systems may be dependent on the scale of the network structure being built, and also connector and linear element designs can vary based on scale.

The subject actuatable modular structure includes a plurality of linear elements held in assembly with an intermodular connector and an intramodular connector.

The intramodular connector interfaces with at least two linear elements along their lengths and the intermodular connector interfaces with the termini of at least two linear elements. An object of the invention is to provide a modular structure which may be shaped. For that purpose at least one of said linear elements or the intramodular connector or the intermodular connector functions as an actuator.

In one embodiment at least one of the linear elements is formed of a smart material which allows the linear element to function as an actuator to shape the structure. In other embodiments either an intermodular connector or an intramodular connector or both are formed of a smart material or includes an electromechanical device which allows the connector to function as an actuator to shape the structure.

In some embodiments the linear elements overlap in the intermodular connector or in the intramodular connector. In the same or other embodiments the intramodular connector or the intermodular connector allow substantial free rotation of the linear elements in the intramodular connector or the intermodular connector. In some cases the intramodular connector or the intermodular connector and the linear elements have complimentary engaging and alignment mechanisms.

The actuatable modular structure also includes structures wherein at least one of said linear elements is composed of a plurality of materials and/or wherein a cross-section or material forming the linear elements has a desired torsion and bending characteristic. It also includes structures wherein at least one of said linear elements, intramodular connector or inter modular connector is formed of a plurality of smart regions separated by a material layer that can selectively transmit and receive energy across its surface.

In some embodiments the material forming the linear elements is formed from isotopically distributed particles or anisotopically distributed particles. In those or other embodiments the electomechanical device has a gripping or engaging mechanism for gripping or engaging the linear elements and the electromechanical device is housed within a control system region of the intermodular connector or intramodular connector. When the actuatable modular structure includes intramodular connectors or intermodular connectos with electromechanical devices for shaping the structure, the structure may function as a peristaltic device, a parabolic adjustable reflector, a wing, etc.

An actuatable modular unit may be formed from at least three one-piece elastic linear elements having a length, sides and ends, each of the linear elements coupled with an intramodular connector at two points along the length of the linear element to the sides of the other elements. The linear elements between the intramodular connectors form a ring with each linear element being under tension and the ring under stress. The linear elements tangentially exit the ring between adjacent intramodular connectors jand are joined together with intermodular connectors whereby said modular unit has stored elastic energy. At least one of the linear elements, intramodular connectors or intermodular connectors formed of a smart material or including an electromechanical device for shaping the modular unit.

A product may be formed comprising a discrete repertoire of actuatable modular units as described above assembled into secondary modular assemblies by connecting the modular units with the intermodular connectors linearly or tangentially.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which:

FIG. 1C also shows examples of other module types formed from a plurality of said linear elements and connectors.

FIG. 3 is a perspective view of a multimodular structure being distorted and showing the linear elements and connectors rotating longitudinally in directions that depend on the direction of the force being applied to it.

FIGS. 4A,4B,4C,4D and 4E show different perspective views of different linear elements formed from a variety of material types and shapes, twisted fiber and/or nano particle orientations and/or cross sectional shapes. The arrows illustrate the possible directionality of the linear elements based on their structure and material composition.

FIGS. 5A and 5B show perspective views of two types of linear element material placement systems that have material placement regions oriented longitudinally within a linear element. These systems' material placement regions may contain different composite material types.

FIG. 6 are perspective cross sectional views of two different linear elements containing helical structures of different shapes that may be formed from smart material. These elements are shown to torque along their lengths to illustrate the directional characteristics of a helical structure.

FIGS. 7A and 7B show linear elements displaying asymmetric bending and twisting characteristics based on their materials' orientation and/or cross sectional shape.

FIGS. 9A and 9B show perspective views and/or cross sections of intermodular connector to linear element engager systems. The engager mechanisms are shown to be housed within the connector and may be mechanical and/or formed from smart material.

FIG. 10 shows a normal view of an exemplary, actuatable linear element and its actuatable connectors.

FIG. 15A is an exemplary structure able to absorb wave energy. FIG. 15B is an exemplary structure able to absorb energy from objects that actively move across it, i.e. vehicles on a bridge. Energy may be harvested from a structure that is distorted by external forces. In some cases, a modular structural network could be used to actively or passively harvest energy from its environment.

FIG. 18B shows said joining system and its electromagnet's associated parts.

FIG. 28B shows a normal view of two modules each containing mechanical, variable geometry, intramodular connectors. The actuatable connectors are shown to alter their geometry and, in turn, the shape of the module.

FIG. 31A is a perspective view of a module in a static state.

FIG. 31B is a perspective view of the module shown in FIG. 31A being axially stretched by internal pressure.

FIG. 32A is a perspective view of a module in a static state.

FIG. 32B is a perspective view of the module shown in FIG. 32A being axially stretched by internal pressure.

FIG. 35A is shown to have exposed, everted structures.

FIG. 37A shows a single layer modular structure of six sided modules attached to an array of round surface membranes.

FIG. 40C shows the structure with its appendages in a state of equilibrium.

FIG. 41A shows the actuators to be separate structures incorporated into a single layer multimodular structure.

DETAILED DESCRIPTION OF AT LEAST ONE PREFERRED EMBODIMENT OF THE INVENTION

Figure 1A:
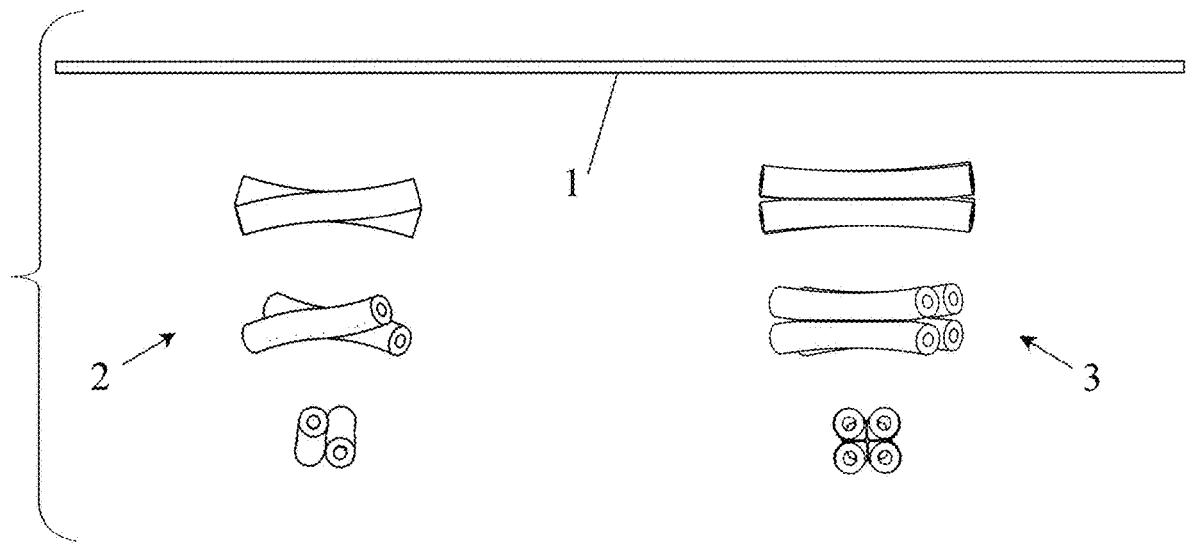
FIG. 1A shows a side view of a linear element as well as a side, perspective and top view of an intramodular and intermodular connector.

Linear elements and connectors are the physical building blocks used by this system to form modules and/or multimodular structures. The connectors are used to join linear elements. The connectors are of two types, intermodular and intramodular. Intramodular connectors are used to form modules. Intermodular connectors are used to join modules. The range of materials used to form linear elements and connectors include but are not limited to, composite materials, cellular materials, tunable materials and digital materials. The multimodular structures built of connectors and linear elements are physical digital structures. The linear elements and connectors can be seen as discrete digital elements. The connectors interface with and join linear elements. The linear elements and connectors interact to form network structures that are tunable, are capable of elastic deformation and can exhibit adaptive behavior. By individually controlling the mechanical properties (including but not limited to the elastic modulus) of the many actuatable, discrete linear elements and/or connectors making up a multimodular structure, large elastic deformations may be possible. Connectors may incorporate mechanisms designed to facilitate the deformation of the structure they compose. The mechanisms are located at the junctures where the linear elements and connectors meet and join. The mechanisms may be housed within the connectors. The mechanisms may input and output information and/or induce structural changes within the linear elements they interface with. These mechanisms housed within the connectors employ a variety of functions that are intent on changing the relative position of one linear element to another and/or modifying the physical characteristics and material properties of the linear element. The plurality of linear elements and connectors that form a module and/or a multimodular structure are individually communicative and controllable. The connectors and/or linear elements that form a network structure are individually identified spatially within the network structure. The mechanisms and/or electronics located within the connectors are similarly identified spatially within the network structure. A plurality of connectors and their repertoire of integrated mechanism can interface with their associated linear elements to form a geometrically complex digital network structure capable of behaviors that range from behaviorally dynamic to purely structural. In an exemplary embodiment this modular building system forms multifunctional structures from multifunctional materials. In an exemplary embodiment this modular building system forms highly interconnected network structures with integrated physical and logic topology.

Methods of automated assembly/manufacture may be used to form modules and/or multimodular structures from discrete linear element and connector parts. The types of assembly system are many and may employ methods and mechanisms that interface with programmable electronic devices. The materials used by an assembler may be performed into discrete parts and assembled in a sequential manner to form modules.

Referring to the drawings more particularly by reference character, the modular building system uses many discrete linear elements and connectors to form structural digital material networks. A structural digital material network may be a physical structure and/or a network topology formed from discrete components (linear elements and connectors) that may have discrete mechanical and/or electronic properties capable of collectively controlling and/or facilitating the control of the behavior of the structure they composes. The connectors used by this system join discrete linear elements to each other. The connectors are of two distinct types, intramodular and intermodular. The prefix intra means within. The prefix inter means between and the prefix intra means within. FIG. 1A shows an intramodular connector (2), an intermodular connector (3) and a linear element (1). These discrete units represent the fundamental components of this building system.

Figure 1B:
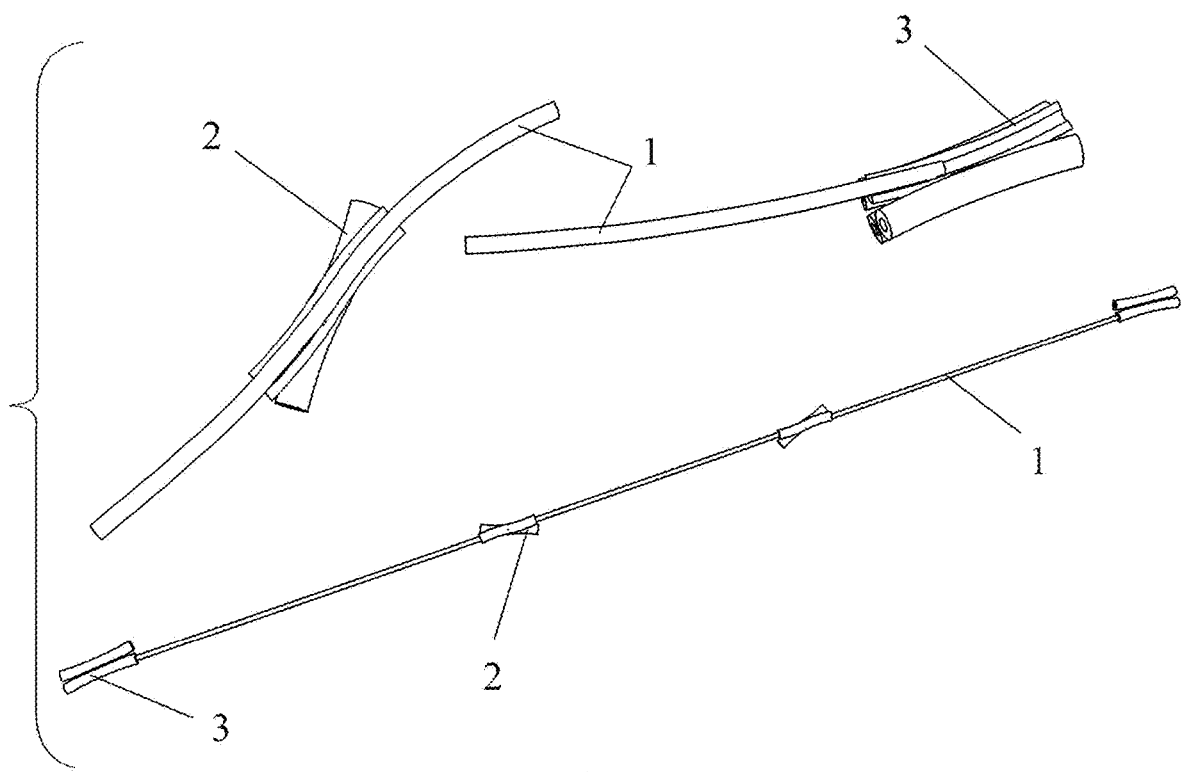
FIG. 1B shows a detail view and full view of a linear element passing through intramodular connectors and entering, not exiting, intermodular connectors.

FIG. 1B shows details of how the connector types interface with linear elements. Note how the linear element interfaces with the two connector types differently, specifically how the linear element (1) passes through the intramodular connector (2) but does not pass through the intermodular connector (2).

FIG. 1B also shows a single, complete linear element combined with its connectors. The linear element (1) passes completely through its associated intramodular connectors (2). The intramodular connectors are shown specifically positioned within the length of the linear element. The intermodular connectors (3) interface with the linear element's termini. The linear element does not pass completely through the intermodular connectors.

Intramodular connectors connect two linear elements within a module. These two linear elements pass through the intramodular connector along their lengths. The linear element always passes completely through intramodular connectors.

Intermodular connectors connect a plurality of linear elements between modules. The linear elements making up this plurality do not individually pass through the intermodular connector, and the intermodular connector exclusively interfaces with the linear elements' termini. The linear element never passes through intermodular connectors.

Figure 1C:
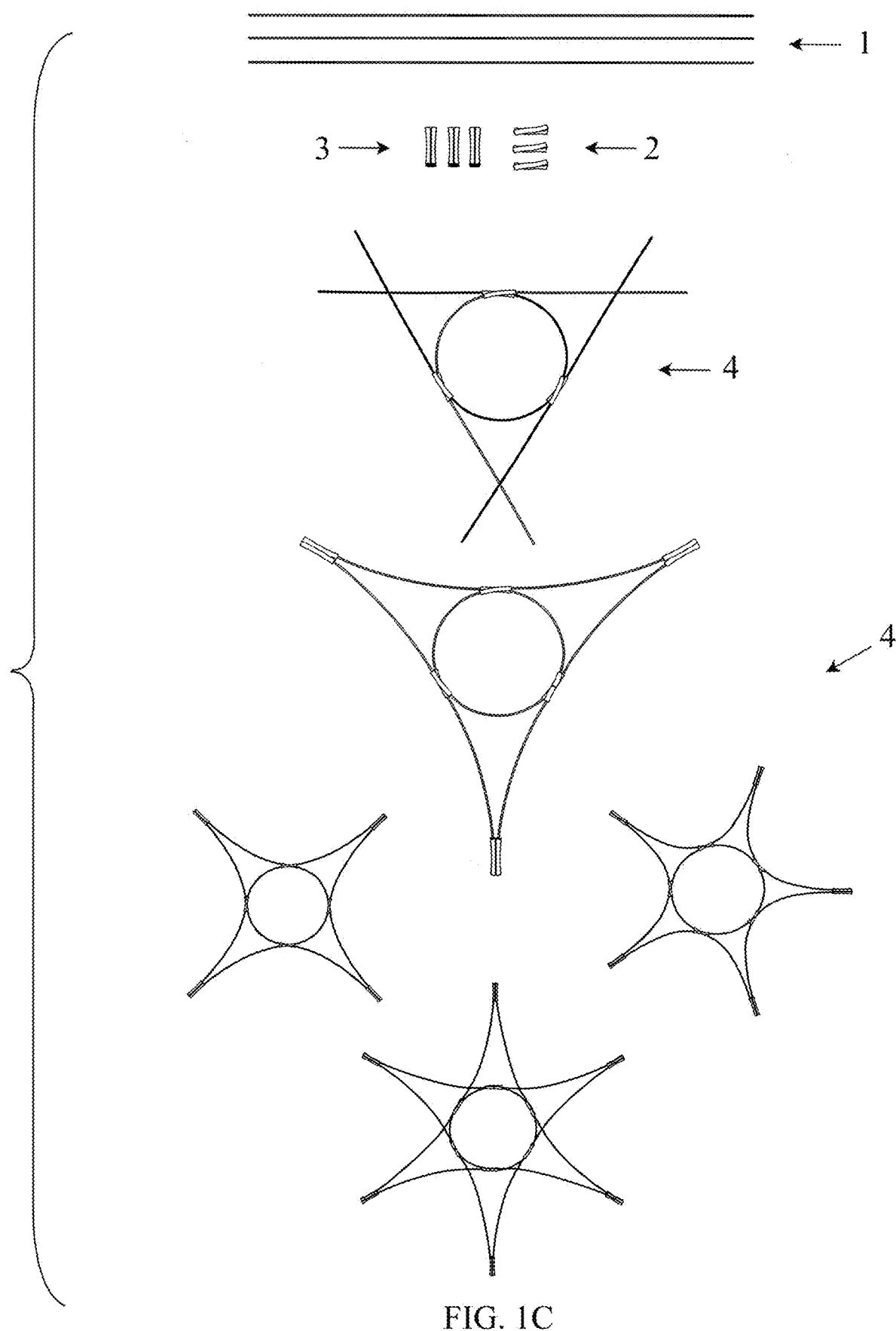
FIG. 1C is a normal view showing three linear elements, three intramodular connectors and three intermodular connectors as they form a three sided module.

FIG. 1C shows the progression of a module being formed using three intramodular connectors (2), three intermodular connectors (3) and three linear elements (1) forming a module (4). The intramodular connectors are shown joining linear elements along their lengths. The intermodular connectors are shown connecting the linear elements at their ends. These two connector types define and make possible the modular nature of this system. Without defining these connectors as distinct types, modularity would not exist. Linear elements and their associated connectors are the fundamental structural components this system uses to form and define modules. FIG. 1C goes on to show several examples of other module shapes/types built from the same fundamental unit parts. The formation of modules from fundamental parts is the basis of this system's levels/degrees of structural hierarchy.

Note: the intramodular connectors are positioned within the module structure's interior space.

Note: the intermodular connectors are positioned at the module structure's periphery.

Figure 1D:
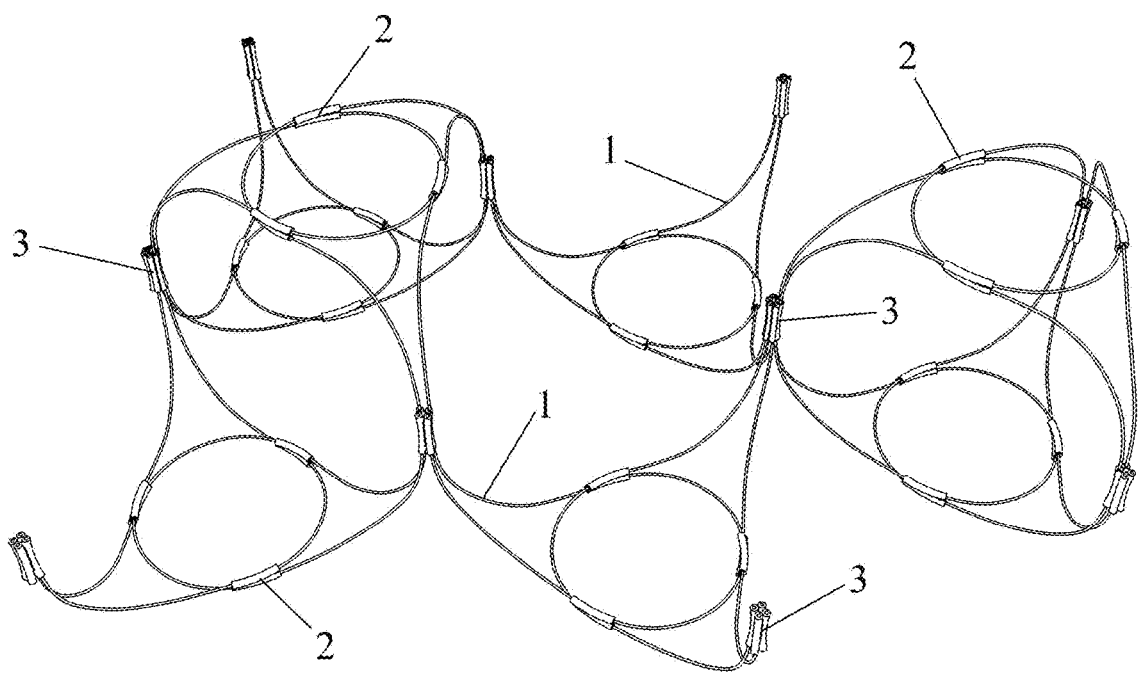
FIG. 1D is a perspective view of an multimodular assembly formed from seven of the said three sided modules. The multimodular structure is shown to be formed of intermodular connectors, intramodular connections and linear elements.

A single module type or a plurality of module types may interconnect to form a mutlimodular structure. FIG. 1D shows a relatively simple multimodular structure built from six identical three sided modules from family A. Connections between modules are made at the module's periphery by intermodular connectors (3). Intermodular connectors (3) form connections between the linear elements of different modules. The intermodular connectors (3) are shown in FIG. 1D to accommodate different numbers of linear element termini and may be designed to accommodate a specific number of linear element termini. Each intermodular connector interfaces with two linear elements (1) from each module it forms a connection with. If an intermodular connector joins two modules, it interfaces with four linear elements. If it joins three modules, it interfaces with six elements and so on. Intermodular connectors may connect a plurality of linear elements from a plurality of modules.

Figure 1E:
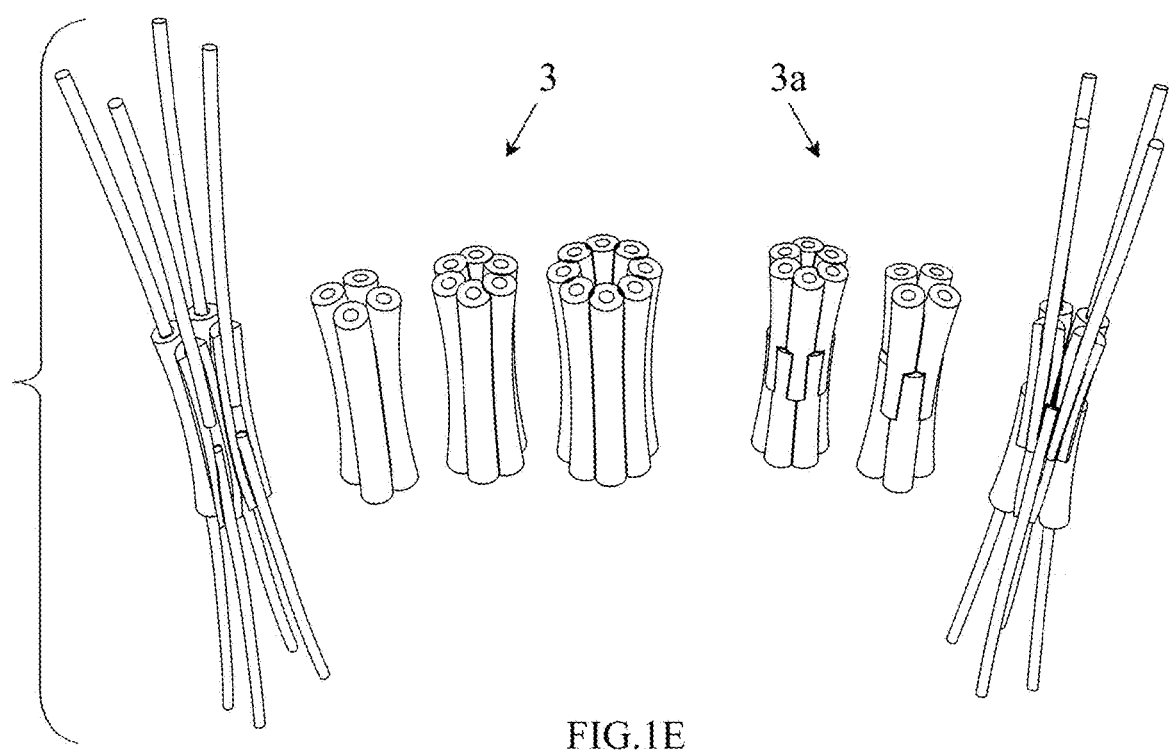
FIG. 1E shows perspective views of intermodular connector designs without linear elements in their housings and also cross section perspective views of intermodular connector designs with linear elements in their housings that are shown to overlap and not overlap.

FIG. 1D shows intramodular connectors (2) joining linear elements along their lengths to form modules and also shows how these intramodular connectors are integrated into a greater multimodular structure. FIG. 1D demonstrates how intramodular connectors (2) are limited to joining a total of two linear elements from the same module. Modules are formed by a plurality of intramodular connectors joining two linear elements along their lengths. There may be applications that require intermodular connector designs that allow the overlapping of the linear elements they house. There may also be applications that do not require overlapping. Examples of intermodular connectors without and with overlapping linear elements are shown in FIG. 1E, labeled 3 and 3a respectively. Linear element overlapping occurs when the termini of two or more linear elements from different modules extend beyond one another within the intermodular connector they share. The overlapping of linear elements within the intermodular connectors may provide additional strength at the point where modules connect and/or provide alternative methods of linear element intermodular connector interfacing, i.e alternative methods on transferring energy.

Linear Element to Connector Interface Types (1-8) and Their Impact on the Physical Network Structures built using this system: The following describes many of the linear element connector interface types that may be applied to this building system. The connector's fundamental function is to interface structurally with the linear elements. The connectors house and join linear elements to create structures that may be seen as complex networks. Beyond the connectors' fundamental function which is structural, a range of connector linear element interface methods may facilitate the reversibly controlled morphing of network structures formed from discrete linear elements and connectors. The controlled adaptability/morphability of a structure built from this system may be achieved by controlling and sensing the physical stresses within the network structure at the level of its individual actuatable linear elements and connectors. A form of any, all or none of the various linear element connector interface types that are described may exist where linear elements and connectors interact within a structure built from this system. Each linear element and/or connector may function as a discrete actuator within the highly interconnected actuatable network structure they form. To allow a better understanding the following information also describes various applications, assembly systems, mechanisms and design aspects of this building system at a variety of scales.

Free Rotation #1: The longitudinal free rotation of linear elements along their axis within the intramodular and/or intermodular connectors they interface with creates minimal axial torsion along the linear element's length. Allowing the linear elements to form a multimodular structure to passively rotate within their associated connectors as they experience axial compression or elongation forces within a modular structure will cause the linear elements to behave, deform and experience stress in ways that are different from those fixed to their associated connectors.

Figure 2A:
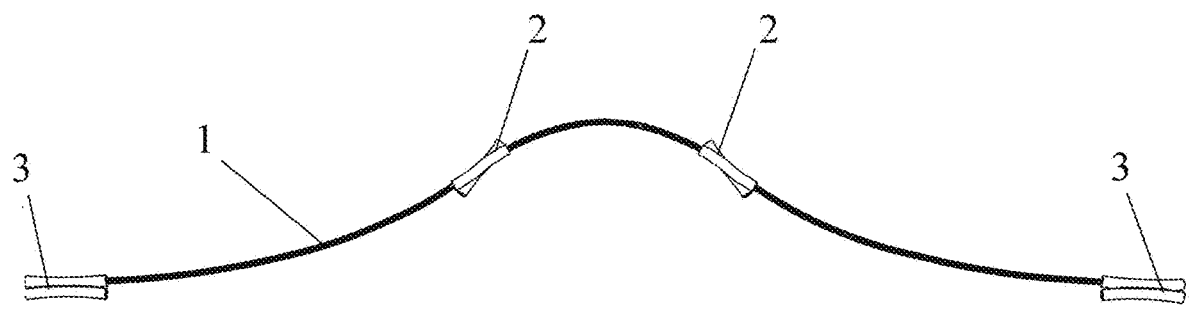
FIG. 2A shows a cross section normal view of a linear element and its associated intermodular connectors and intramodular connectors.

The linear element (1) shown in FIG. 2A passes through two intramodular connectors (2) and two intermodular connectors (3).

Figure 2B:
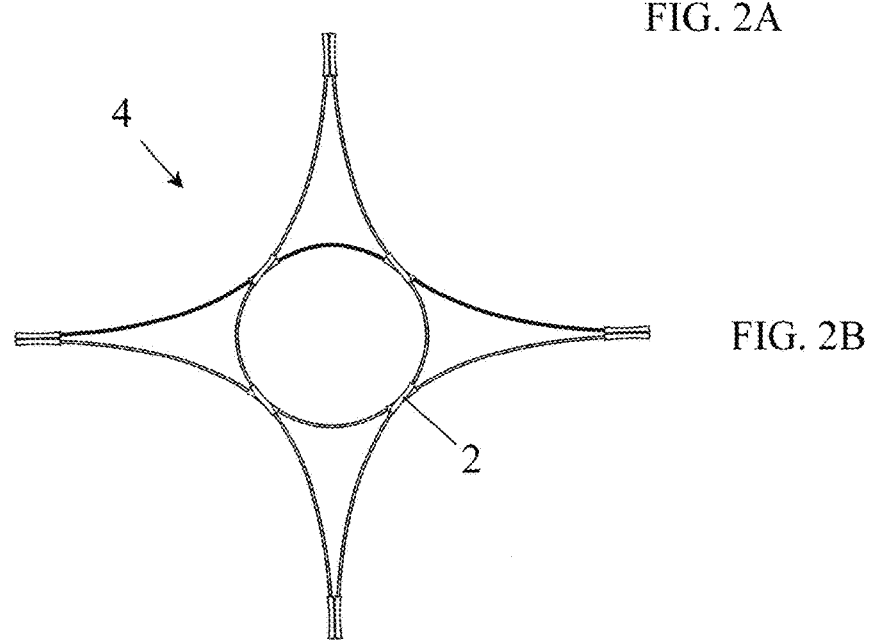
FIG. 2B shows said linear element and connectors as part of a modular assembly in a normal view.
Figure 2C:
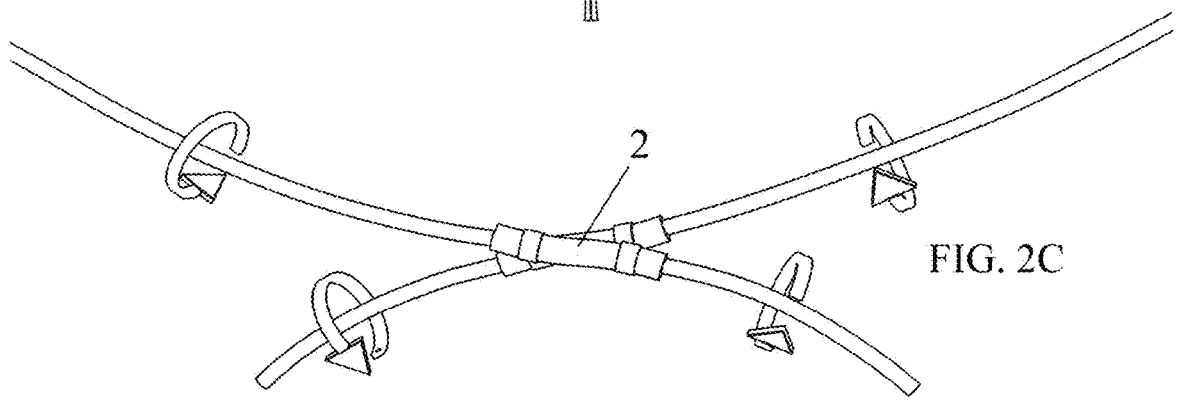
FIG. 2C shows a detail of two linear elements rotating within their associated intramodular connector.

In FIG. 2B linear elements and their associated intermodular and intramodular connectors form a four sided module structure (4) capable of connecting to other modules via its intermodular connectors. These intramodular and intermodular connectors are not fixed to the linear elements. Each linear element may freely rotate along its length within the connectors as shown in FIG. 2C.

Figure 2D:
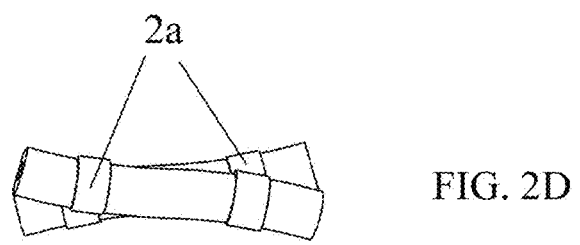
FIG. 2D shows said intermodular connector to have integrated low friction devices.

To allow free rotation of the linear elements within the intermodular and/or intramodular connectors, bearings and/or other type of low friction device(s) or material(s) may be integrated along the connectors' length. These devices could be the material making up the connector itself or be formed from a plurality of materials that may be integrated into the connector's structure such as a bearing or bushing that is held within the connector's structure. FIG. 2D shows an intramodular connector with integrated low friction devices (2a) that may or not be the same material as the connector tubes.

The linear element's low friction environment may exist within all the connector types and within modules and multimodular structures built from this system. FIG. 3 shows a structure built of two modules being deformed (elongated and compressed). From left to right FIG. 3 shows three topologically identical mutlimodular structures as undeformed, compressed and elongated. Note how the linear elements respond when the structure is deformed. The arrows indicate how the linear elements may rotate in relationship to the connectors during deformation. If the linear elements were fixed to the connectors, the linear elements would experience greater torsion along their lengths.

Linear elements allowed to freely rotate within their associated intermodular and intramodular connectors may require the least force to deform when compared to other linear element connector interface systems. This free rotation system causes the least total stress on the elements but not the greatest strength or least risk of buckling and/or failure. With free rotation the stress is unevenly distributed within the linear element's cross section and along its axis. Free rotation would produce minimal linear element twisting during changes in curvature.

If a linear element is not allowed to freely rotate within its associated connectors, it may experience twisting during deformation. That twisting causes the linear element to resist deformation. Torsion causes a linear element to become stronger and stiffer as it is deformed until it reaches the point of defection. A freely rotating linear element would likely fail before a twisted non deflected one, but it would deform more than the twisted one if it experiences the same bending forces. A free rotating non twisted linear element could be subject to acute stress on the apex of its bend causing failure. A twisted linear element could fail if buckling occurs. When a linear element is under torsion, the stresses along its bend would be more diffuse because its material is twisted. If the material that composes a linear element has a designed geometry, it could have characteristics of a twisted linear element and still be free rotating.

The Linear Element Material Composition and Shape: Linear elements and connectors are formed from composite material. Said composite material may include but is not limited to epoxy based carbon composites, resin based bio composites and nanocomposite materials. Said materials used to form linear elements and connectors may be manufactured using, but is not limited to, molding, lithographic and/or pultrusion techniques.

An exemplary implementations of this invention may be formed using Epoxy based nanocomposites and or cellular nano biocomposites. Various kinds of nanofillers such as carbon nanotubes, graphene and other carbon allotrope classifications/geometries may be used to reinforce the composite material's epoxy matrix and may improve the inherent brittleness of the epoxy resin. Nanocomposites mechanical, thermal, and electrical properties may improve dramatically over time.

The linear elements may be composed of a single composite material type or may be composed of a plurality of material types. Any material type or combination of material types may be organized to form geometry within the linear element. The composite material type(s) that could form linear elements may have a broad range of physical properties. The material can have a structural hierarchy present on more than one length scale. A material type's geometry can exist at a variety of scales. The linear element's outward/visible geometric structure may be formed by an internal geometric structure that exists at the material level. The internal structure/geometry of the material making up the linear element exists at the molecular and/or fiber level. Micro and macro geometry may determine the physical properties of the linear element and allows it to be tailored to to a function. For example: A linear element could be designed/programmed via its special material content and/or geometry to bend with less force in a specific direction(s) and also modulate its flexibility in reaction to a specific external force in a way that is specific to that force.

The linear elements that comprise the modules used to build multimodular structures are generally subjected to combined torsion and bending forces. Those forces make up the reservoir of material stress that exists within the network structure. The material composition of a linear element may have a geometric structure that influences the way it responds to torsion and bending moments. A linear element's geometric structure may exist at the level of its material composition as in the twisted fiber geometry seen in FIG. 4A and/or the form/shape of the linear element along its length as shown in FIG. 4B. The linear element's material geometry and/or cross sectional 2D and 3D geometry biases the element's torsion and bending characteristics. A tunable material linear element having a helical geometry along its length may have controllable stiffness and/or rigidity when the geometry within the element is stimulated.

The use of carbon allotropes may be an example of carbon based material geometry being found within the linear elements and/or connectors at the molecular level. The linear element's material composition and/or its geometric complexity may be designed from the molecular level up to fit specific applications.

Linear elements composed of material(s) with uniform geometry and/or isotopically distributed particles (molecules or fibers) as shown in FIG. 4C generally experience symmetric/unbias combined torsion and bending forces when they are part of a multimodular structure. Linear elements composed of material(s) having specifically designed geometry and/or ansotopically distributed particles as shown in FIG. 4D generally experience unsymmetric/bias combined torsion and bending forces when they are part of a multimodular structure.

A linear element's structure and/or material composition can be formed using a plurality of composite material types. Linear elements having unsymmetrical bending and torsion moments due to their diverse material composition may augment the structural and behavioral complexity found within this modular building system. Combining different material types within a linear element's structure could form multi-material geometries within the linear element's cross section as shown in FIG. 4E. Linear elements that are sectioned longitudinally by different types and classifications of composite materials with different physical properties could make lateral bending moments require different forces, i.e. require different pressures to equally deform the linear element longitudinally in different directions.

Examples of linear element material placement systems are shown in FIGS. 5A and 5B. Specialized pultrusion systems may be used to manufacture linear elements using these material placement systems.

FIG. 5A shows a radially oriented material placement system that may use tunable and/or nontunable material. A plurality of material placement regions (5) are radially oriented along the longitudinal axis of the linear element. These radially oriented regions (5) form the linear element and define the architecture of a system that may use a repertoire of materials having tunable and nontunable properties.

A version of a radially oriented material placement system like that shown in FIG. 5A could be based on the use of specific carbon nanotube alloys and/or carbon nanotube epoxy composites having defined levels of stiffness. Linear elements with asymmetric bending properties could be formed by placing stiffer materials in specific regions of the radial oriented system. Similarly the wedge like structures (5) may be composed of composite materials having various elastic modulus values. This may allow the linear element to have asymmetric bending and/or torque moments. Longitudinal material placement may also guide the formation of helical structures when a linear element is torqued.

FIG. 5A shows the linear elements' material regions separate from one another by an insulating and/or semiconductor material (6). The material regions may be formed from tunable material. Smart material wedges/regions (5) may be independently stimulated within the linear element, making the element an actuatable structure. The material that borders the smart material regions (6) may be an insulator and/or semiconductor. The system shown in FIG. 5A may function as a versatile pultrudable composite material architecture that uses both tunable and/or nontunable materials. The materials within this system may include embedded sensors, stimulators and other silicon and carbon based electronic components. If the regions are composed of tunable material, the linear elements may be seen as actuators whose structure may be thought of as being similar to the fiber bundle architecture of biological muscle.

FIG. 5B shows longitudinally oriented and nested cylinder regions (7) within the linear element. This nested cylinder material placement system may use both tunable and non-tunable materials to form a linear element. These nested regions (7) may be independently stimulated if they are formed of tunable material. This may allow highly controllable level of linear element flexibility. A linear element's material region's geometry and/or the material types contained within it can vary based on the element's intended function. For example, when a shaft/linear element is subjected to torque and or bending a shearing stress is produced in the element. The shear stress varies from zero near the axis to a maximum at the outside surface of the element. The highest shear stress a linear element experiencing torque and/or bending force occurs on the surface of a shaft. This fact may impact the linear element's material composition and/or placement. A layer of tunable material could be applied to the surface of a linear element. The modulation of the outer layer's material's stiffness could help to reduce or predict linear element failure. The longitudinally oriented, cylinder shaped regions (7) can be nested concentrically and/or not concentrically as shown in FIG. 5B. The layered regions may be isolated from one another by an insulating and/or semiconductor material (6). The nested cylinder's material regions may be formed from tunable material. Smart material regions may be independently stimulated within the linear element, making the element an actuatable structure. The material that borders the smart material regions (6) may be an insulator and/or semiconductor.

A linear element's material geometry at its most refined is created by the placement of its fiber and/or molecular composition. This geometry may be designed to fit a specific application. For example, longitudinal torsion biasing in a counter clockwise direction could be achieved by orienting the linear element's composite material fiber and/or molecular geometry in the clockwise direction.

Nanocomposite materials containing carbon nanotubes or other carbon allotrope classifications/geometries could be an exemplar material to be placed within the linear elements systems shown in FIGS. 4A-E and FIGS. 5A and 5B but not limited to them. Types of nanocomposite materials may be designed at the molecular level and all would exhibit unique physical properties when used to form linear elements.

The placement of materials having different physical properties into a linear element would allow the element to have bias directional bending and/or twisting characteristics. For example, if a linear element composed of two materials, one stiff forming 50% of the cross sectional area, the other 50% being made up of a flexible material, the resulting element would have bias bending characteristics. A linear element that is designed to exhibit bias bending and/or torsioning may have an enhanced ability to aggressively rotate an energy harvesting device. For example a linear element's geometry could be specifically positioned relative to the way it is bent and/or torqued within the modular structure. If a relatively flexible material is placed on the apex of the linear element's bend and rigid used in the interior of the bend where material compression is the greatest, this antithetical relationship of the linear element material placement and its bend may cause the element to aggressively rotate/move within the connector(s). An energy harvesting device may be one of many devices found within the connectors that make up a multimodular structure.

A multi material pultrusion technique/system could be used to create linear elements with a longitudinal architecture/geometry made up of a plurality of wedges, layers or any other system of material placement. The material's geometry within the linear elements could be designed to form elements with specific directional bending properties. Linear elements with directional bending and/or twisting properties could be specifically oriented within a greater network structure to form the basis of the network structure's bending bias.

Linear elements may exhibit controllable torsion characteristics if they incorporate helical structures formed of tunable material along their lengths. FIG. 6 shows two examples of linear elements that incorporate helical structures. If a tunable helical structure within the linear element is stimulated causing it to become stiffer and/or untwist, for example in response to an external force, the linear element's elastic modulus may increase. The arrows shown in FIG. 6 indicate the direction the linear elements may rotation/twist during stimulation. The controllable torsional rigidity that may be exhibited by linear elements containing tunable helical structures may also manifest itself in tunable linear elements having helical and/or a directional geometry that originates at the level of the material's fibers and/or molecules. The molecules' and or fibers' geometry may be created by directional bonding.

FIG. 7A shows a linear element made of a single material and having a non circular cross section (ovoid in this instance) functioning as a shaft with torsion bias. This bias occurs because the linear element is bent when torque is applied to it. FIG. 7B shows a linear element shaft having a circular cross section composed of an anisotropic material. This material system could similarly cause the linear element to function as a torsion biased shaft when it is bent.

Linear elements of a variety of cross sectional shapes/geometries can be used to create specific torsion and/or bending characteristics. Unless a linear element of uniform diameter and shape is designed to do other wise, its torsion will not be uniformly distributed along its length, and also its angle of twist per unit length will vary along the length.

Actuatable linear element designs containing tunable material may reversibly lengthen longitudinally when stimulated causing the deformation of its associated module and therefore the greater digital network structure. The internal architecture of the linear element's composite material may augment this lengthening behavior. For example a linear element with internal helical architecture may have reversible tunable helical pitch and therefore length.

Linear element and/or connector architecture may contain material regions that may be reversibly electrically isolated from one to another. For example a linear element formed from several materials placed in close proximity within the linear element's structure may be separated by a material layer that can selectively transmit and receive energy across its surface. For example circuits may reversibly and/or permanently exist within the element's material architecture that help control and direct the flow of electricity intent on doing work within the greater network structure. This reversible flow of electricity used to do work may be used by variable geometry electro mechanical and/or tunable connectors and/or by reversibly stimulating actuatable tunable material linear elements for the purpose of deforming the digital structure.

The internal architecture of specially pultruded linear element and/or connector may contain tunable material regions where signaling may change a material's electrical, thermal, mechanical and/or optical characteristics. A plurality of tunable material regions may be organized/compartmentalized within the linear element and/or connector's internal material structure. Thin layers of dielectric material may electrically isolate tunable material's regions within the linear element and/or connector's architecture. The layers of dielectric material may act as electromagnetic switching regions that reversibly form circuits that stimulate specific material regions possibly in a programmable sequence. The thin layers of material separating tunable material regions may also generate sensory information used to enhance the system's performance. This actuatable material system (muscle), stimulatory system(motor neurons) and sensory system(sensory neurons) is analogues to the components found in the animal neuromuscular systems.

Gripping/engaging #2: The controllable gripping and/or engaging of linear elements within the connectors may allow the torque acting on the linear elements to be modulated when the structure experiences deformation. Gripping and engaging happens between linear elements and connectors. Each intermodular and intramodular connector in a structure built from this system may house active gripping mechanisms. The gripping mechanism may be a tunable material device and/or electromechanical device. The mechanisms may allow free, selective, or null rotation of the linear element in relation to the connectors. The engaging mechanism may selectively bind the connector to its associated liner element. This would be a simple way to transfer and/or store the energy used to deform a structure.

The control of the gripping/engaging mechanisms would be through addressing and signaling (wirelessly and/or hard wired) any and all of the devices within the network structure. The energy used to power the gripping mechanisms may flow directly through the composite material making up the connectors and/or linear elements. This energy may also accumulate within the linear element(s) and/or connector(s) to be used to actuate the gripping mechanism. Energy used for signaling within the network can be stored and used for motive purposes. Energy may be stored in a structural material and/or electronic devices.

A linear element gripping mechanism may be formed from a shape changing smart material or a non tunable material mechanism. A shape changing material may be a cellular solid that exhibits anisotropic swelling or a polymer nanocomposite having electrochemically controlled swelling.

The individual linear elements that comprise any and all module types can be held, freely rotate or partially rotate along their longitudinal axis. Gripping can occur at any or all four of the connection points found on each linear element, shown in FIG. 10. The control of the linear element's longitudinal rotation may occur within the intermodular and/or intramodular connectors labeled 2 and 3.

Figure 8A:
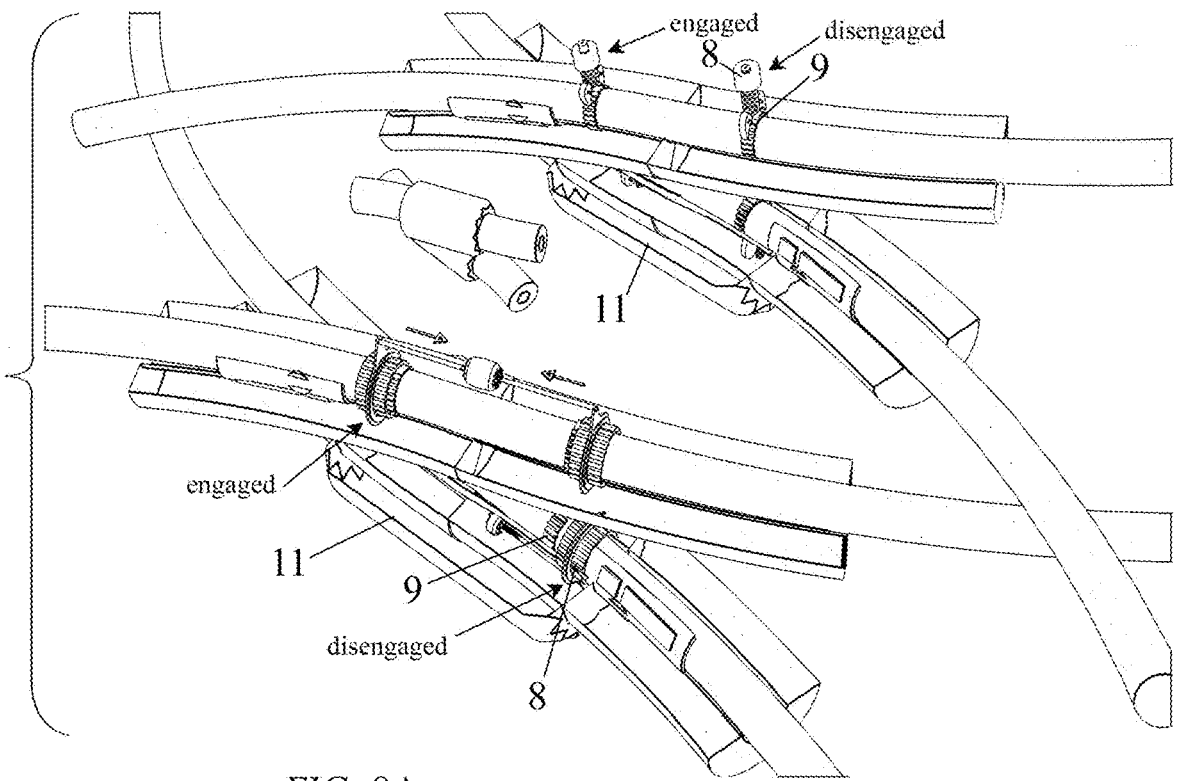
FIGS. 8A and 8B show perspective views and/or cross sections of intramodular connector to linear element engager systems. The engager mechanisms are shown to be housed within the connector and may be mechanical and/or formed from smart material.

FIG. 8A shows two examples of intramodular connectors that incorporate electromechanical mechanisms that reversibly grip/engage the linear elements that pass completely through them. The electromechanical engager mechanisms (8) may take on a variety of forms that may be housed within the intramodular connectors' control system (11). When an electromechanical engager mechanism is stimulated it articulates and binds the connector to the linear element. The engager mechanism (8) may change position when stimulated thereby engaging a complimentary friction/engaging surface (9). This engaging surface (9) may be integrated into the linear element. The linear element may form the engaging surface. The friction/engaging surface may or not be part of the engager mechanism. Note: the label engaged and disengaged.

Figure 8B:
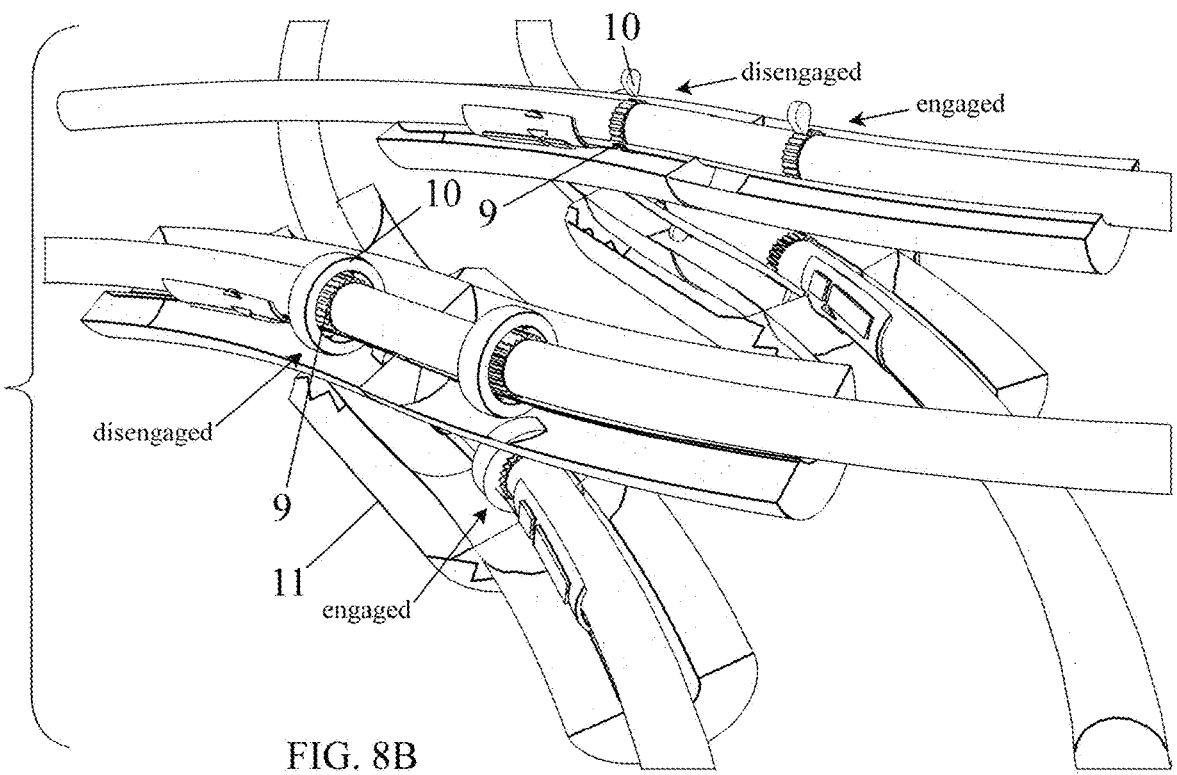

FIG. 8B shows two examples of intramodular connectors that incorporate a tunable material engager that reversibly grips/engages the linear elements that pass completely through them. The tunable material engager (10) may be integrated into the intramodular connector. When a smart material engager is stimulated to actuate it may swell and bind to the friction engaging surface (9) on the linear element. This binds the element to the connector. The tunable material engager (10) may reversibly engage its complimentary friction/engaging surface (9) on the linear element. When stimulated the tunable material engager/joiner (10) may go from a fluid to solid reversibly. Note: the label engaged and disengaged.

FIG. 9A shows an example of an intermodular connector that incorporates an electromechanical mechanism that reversibly grips/engages the linear elements that intersects but do not pass completely through it. The electromechanical engagers (8) may be integrated into the intermodular connector. When an electromechanical engager mechanism (8) is stimulated it binds the connector to the linear element. The electromechanical engager may change position when stimulated to engage a complimentary friction surface (9) on the linear element. In this case the friction surface is a spline shaft, but it is not limited to being this type of mating surface. Note: the label engaged and disengaged.

FIG. 9B shows an example of an intermodular connector that incorporates a tunable material engager that reversibly grips/engages the linear element that intersects but does not pass completely through it. The tunable material engager/joiner (10) may be integrated into the intermodular connector. When a smart material engager is stimulated it may bind the connector to the linear element. The tunable material engager may change position and/or swell when stimulated to engage a complimentary friction/engaging surface (9) on the linear element. Note: the label engaged and disengaged. The reversible gripping and/or engaging systems described are meant to demonstrate how a linear element and connector systems can be reversibly physically bond using a simple device. A specific device design would likely not be scalable but its function would be the similar independent of scale.

If intermodular and/or intramodular griping hardware/mechanisms are capable of actively allowing or denying the rotation of all the linear elements they house, then the longitudinal torsion each linear element experiences during deformation could be controlled. The longitudinal torsion experienced by the linear elements within a modular network structure during its deformation from external forces could be modulated using this system. In effect this system of torsion control could allow each element to be fixed to or rotate independent of any other element it shares intermodular or intramodular hardware with. This system of gripping/torsion control could modulate the stiffness of a structure built of these modules. Each linear element that makes up a multimodular structure can be allowed or denied the ability to rotate independent of its associated connectors.

The gripping/engaging mechanism parts labeled 8, 9 and 10 are located within the control system labeled 11 in FIGS. 8A, 8B and 9A and 9B. The control system is the central region of the intermodular and intramodular connector that houses/encloses the electromechanical and/or smart material devices that interface with the linear elements.

As shown in FIG. 10 each linear element (1) passes through two intermodular connectors (2) and two intramodular connectors (3). Each one of these connectors has a control system (11) that may contain devices capable of gripping/engaging the element in any combination along its length. For example, if the intermodular connectors grip the linear element termini and denying its rotating during deformation, that linear element would experience torsion its entire length. If held by the intramodular connectors alone, the linear element would experience torsion only within the region of the element that makes up the module's central ring. Forces within a structure could be transferred from one location to another via the gripping and releasing of the linear elements.

A structure with freely rotating linear elements could be deformed and then have its linear elements engaged by the gripping/engaging mechanisms. This engaging of the linear element's position within the connector at the time of distortion would store a portion of the energy it took to deform the structure in the form of torsion within the linear elements.

Torque #3: Electromechanical and/or tunable material mechanisms may be housed within intermodular and/or intramodular connectors that torque the linear elements. The torque mechanisms that may be integrated into the connectors could place each and all of the linear elements making up a modular network structure under controlled, reversible, longitudinal torsion. This torsion is energy stored within the linear element that results from material deformation.

If tunable linear elements are used, a mechanical torque mechanism may not be necessary to torsion the element if the smart material exhibits controllable torsional rigidity.

Figure 11A:
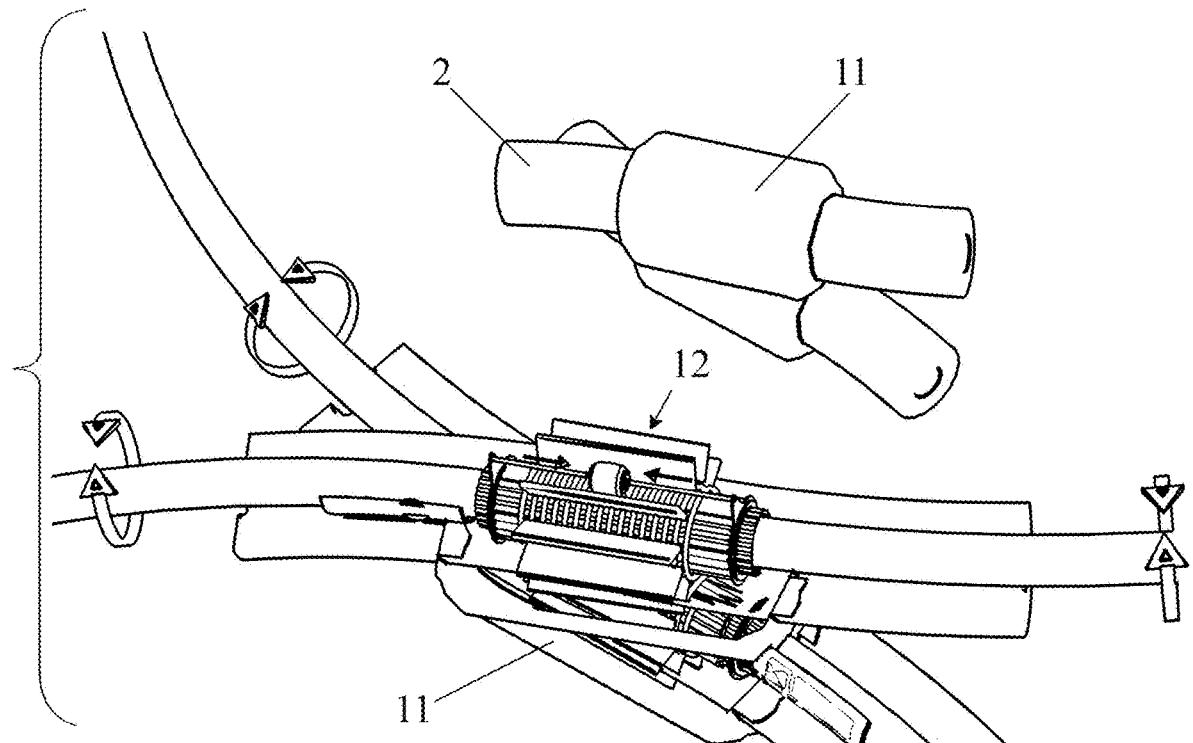
FIG. 11A shows a perspective view and a cross section view of a intramodular connector to linear element torque system. The torque mechanism, in this case, is electro mechanical and shown to be housed within the connector's control system.

FIG. 11A shows an intramodular connector (2) and its associated control system (11) containing an exemplary electromechanical torque mechanism (12) capable of rotating the linear elements passing through it. This torque mechanism may include a torque motor, stepping motor or other motive device capable applying torque and resulting shear stress to the linear element.

Figure 11B:
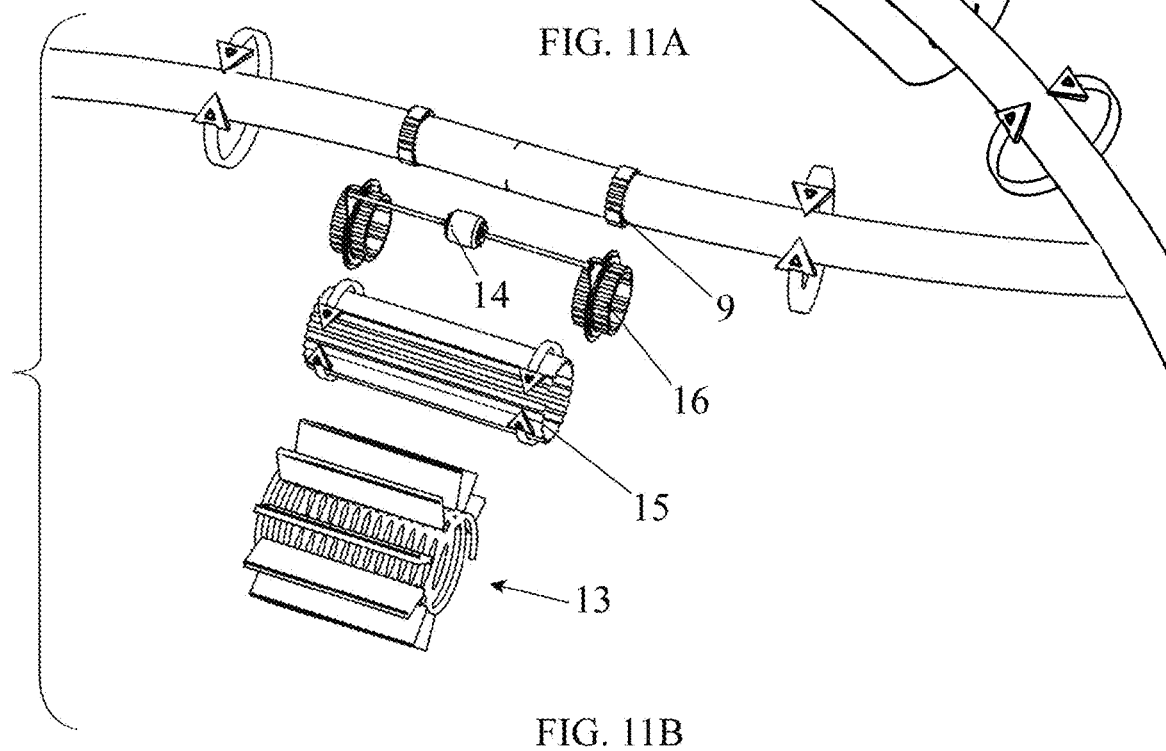
FIG. 11B shows an exploded perspective view of a linear element and its associated torque mechanism.

FIG. 11B shows a single torque motor, its associated engager mechanism and linear element. The torque motor's stator (13) drives the torque motor armature (15). A engager motor (14) and associated hardware control a nested spline system that functions to engage the armature to the linear element. The nested spline system contains an internal spline that is integral to the motor armature (15), an engager spline having both internal and external splines (16) and a complimentary engaging surface (9) that is integral to the linear element. The engager motor actively positions the engager spline. The engager spine (16) may reversibly mesh with both the armature spline (15) and complimentary engaging surface (9) thereby coupling them and/or uncouple them. When uncoupled the linear element is allowed to rotate independent of the connector.

Figure 12:
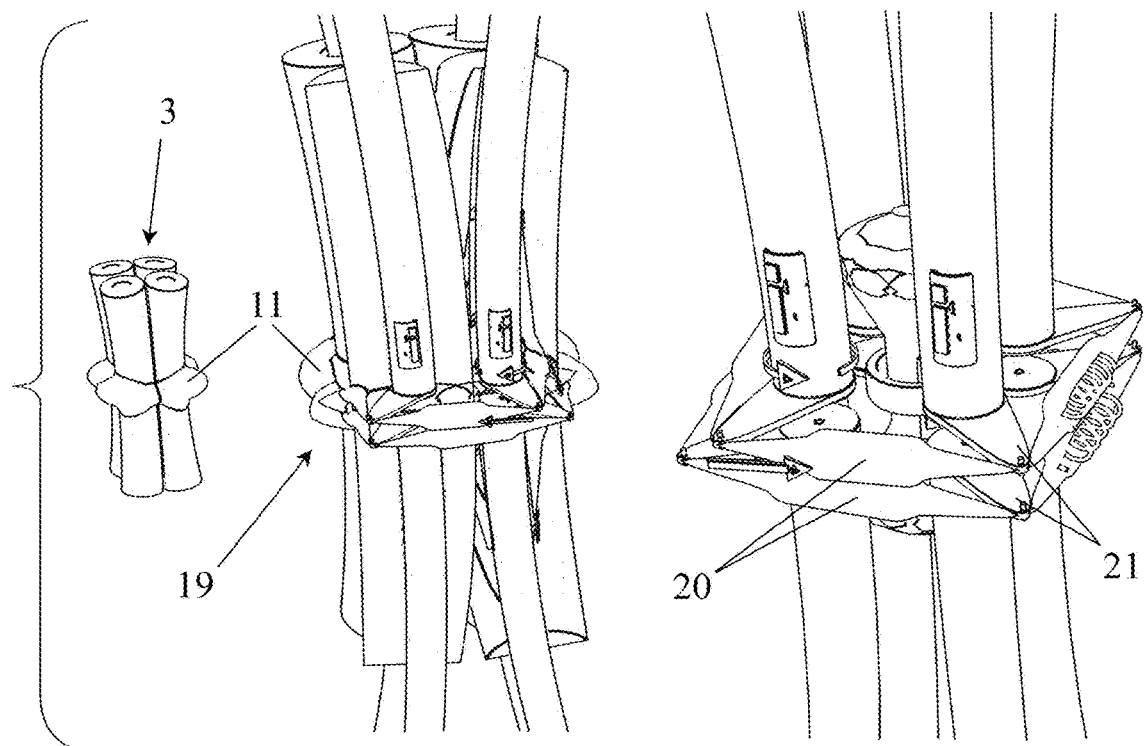
FIG. 12 shows a perspective view and a cross sectional view of a intermodular connector and its associated linear element torque system. The torque mechanism, in this case, uses smart material actuators and levers to torque the linear elements. The smart material torque mechanism is shown to be housed within the control system.

FIG. 12 shows an intermodular connector (3) and its control system (11) which houses a smart material torque mechanism (19). Smart material actuators (20) within the torque mechanism, twist their associated linear elements via levers (21) whose fulcrums are located at the linear element longitudinal axis. The smart material actuators have a twisted material geometry. In FIG. 12 the smart material actuator configuration intends the individually smart material actuators (20) work in unison by holding, relaxing, contracting and expanding.

Torque mechanisms may apply torque, sense torque and also function as a gripping mechanism. The mechanisms housed within the control system (11) may be designed to be highly integrated and their parts actuated by a single mechanism that performs work.

The action of the torque mechanisms within the connectors and the resulting longitudinal torsion of the individual linear elements comprising each module is a form of material tuning. The tuning of a structure through mechanical connector to linear element interface could function in consort with material level tuning if smart material is used.

A mechanism integrated into intramodular and/or intermodular connectors having components that deform or change position relative to their associated linear element(s) may also function as energy harvesting devices. For example if the torque from a twisted linear element is allowed to rotate or distort piezoelectric parts within the control system, energy could be generated. The rotation of the linear elements within the connectors due to the distortion of a structural network by external forces could be potential energy that may be harvested using the same mechanism(s) and/or devices that apply torque to the linear elements.

Figure 13:
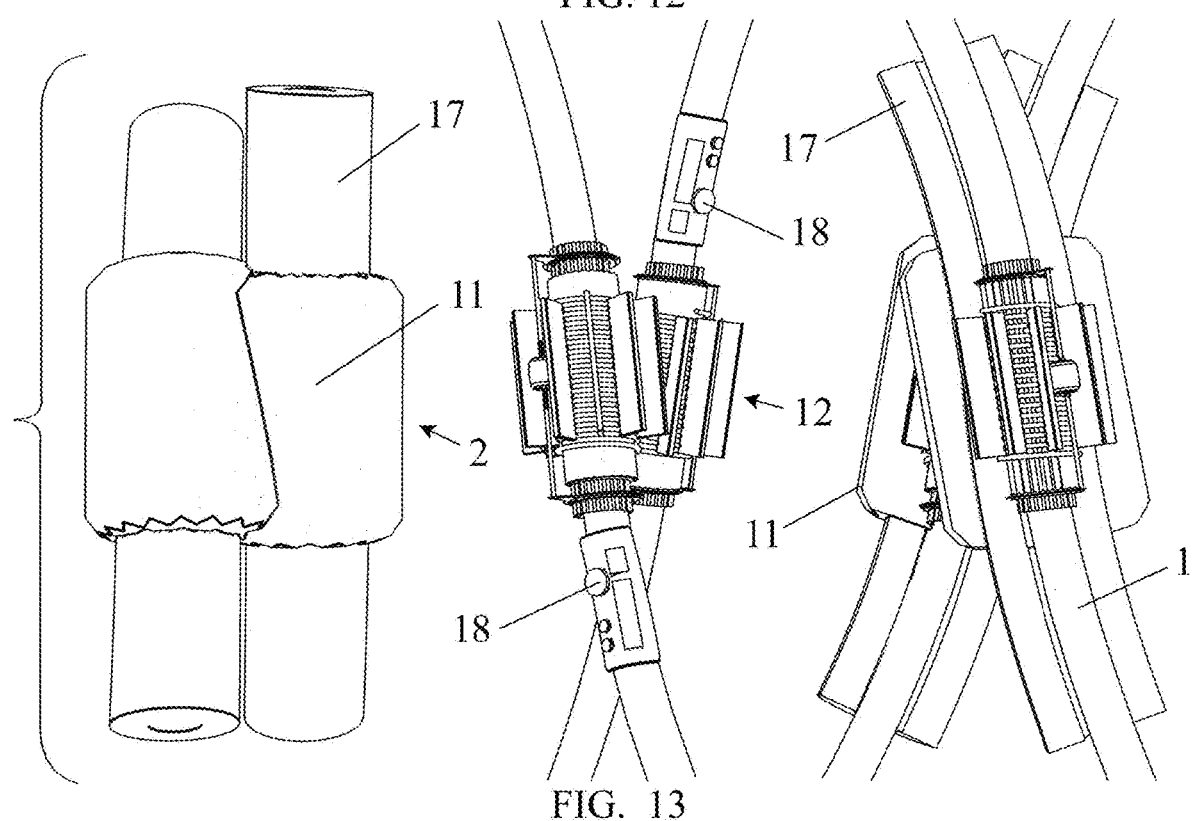
FIG. 13 shows the anatomy of an intramodular connector and its associated linear elements and devices, including the electronic components that may interface with all the components.

The Control System: The control system (11) may be a multi functioning mechanism. It can house any or all of the possible electromechanical and/or tunable devices associated with the connectors. For example, the control system may function to hold, allow free rotation, actively rotate, and/or harvesting energy from the linear element it interfaces with. FIG. 13 shows the control system (11) integrated into a intramodular connector (2).

If the building system uses tunable material, linear elements and/or connectors, the control system (11) may not house any mechanisms and may not be a physical part of the connector. If this is the case, the control system interface (18) may communicate with and/or control the behavior of the smart material linear elements and/or connectors. There may be tunable material systems that do not require any peripheral mechanical devices for it to function; therefore, the control system will not be present but the control system interface will.

The connector tubes (17) are the foundation structure for the control mechanism. The connector tubes and control mechanism may be integrated. Each tube (17) can have an integrated torque mechanism or other mechanism that is functionally independent and housed within the connector control system.

The connector tubes (17) may keep the linear elements (1) electrically and/or physically isolated from one another.

The control system (11) can be powered by energy delivered to it from its associated linear element(s) or wirelessly. The component parts of the control system that physically contact the linear elements may independently receive electrical energy from the linear elements.

The control system interface (18) allows bi directional data transfer including signaling the activity of all the mechanisms contained within the control system and peripheral devices. The activity of the various mechanisms housed within the control system may be controlled wirelessly and/or be controlled by the information entering the multimodular network structure via momentary or sustained physical contact or proximity to another structure. The wireless information and/or data transmitted within the network structure may be processed by the control system interface (18). The said information could control the multimodular structure's behavior in real time or may be stored within the many control system interfaces (18) as a behavioral meme to be expressed at another time by the coordinated activity of the control system interfaces. The control system interfaces become a network of ganglion similar to the central nervous system of an insect.

The signaling/controlling information could be introduced into the structure physically, remotely/wirelessly or be autonomously generated based on information processing. The transfer of information from one modular network structure to another via physical contact or other means could be important to the way interacting structures behave within some systems. The sharing of information between tunable structures within an environment could lead to dynamic behaviors emerging.

An intermodular and intramodular connector and its integrated control system may function as microelectromechanical system (MEMS).

Figure 14A:
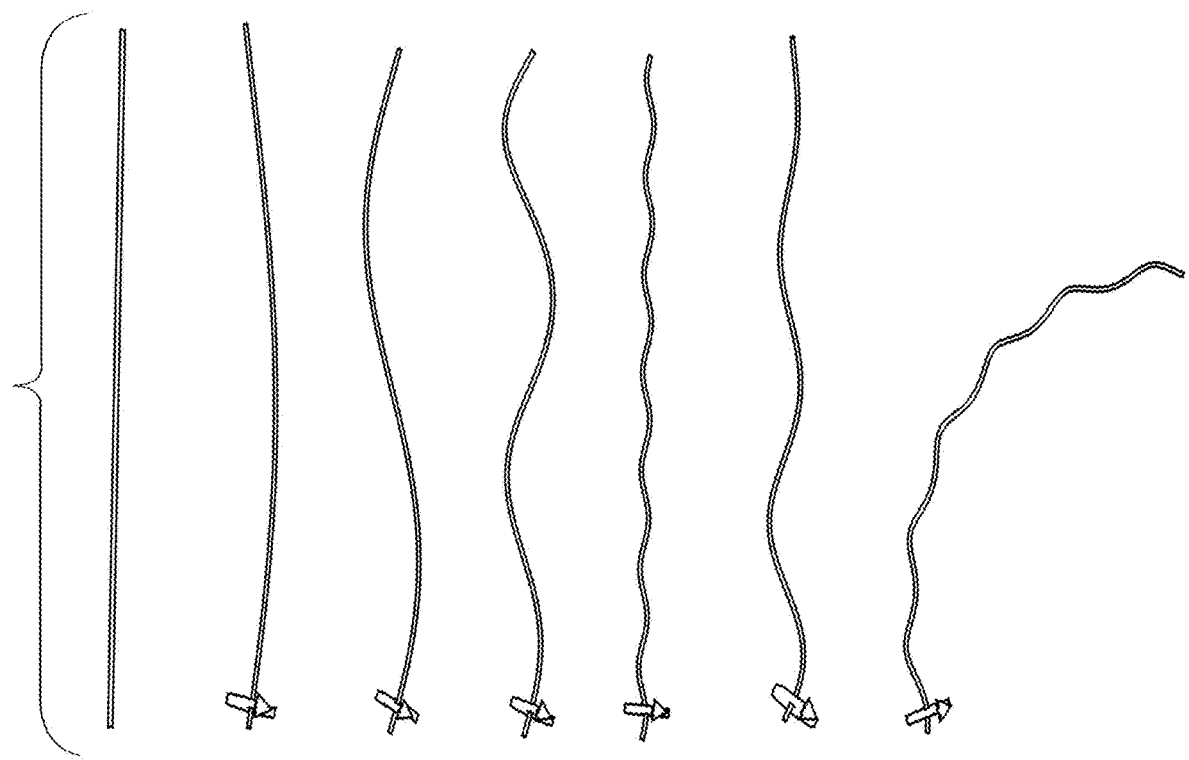
FIG. 14A is a series of side views of linear elements experiencing varying degrees of longitudinal torsion and/or bending that results in deflection and the eventual coiling of the linear element.
Figure 14B:
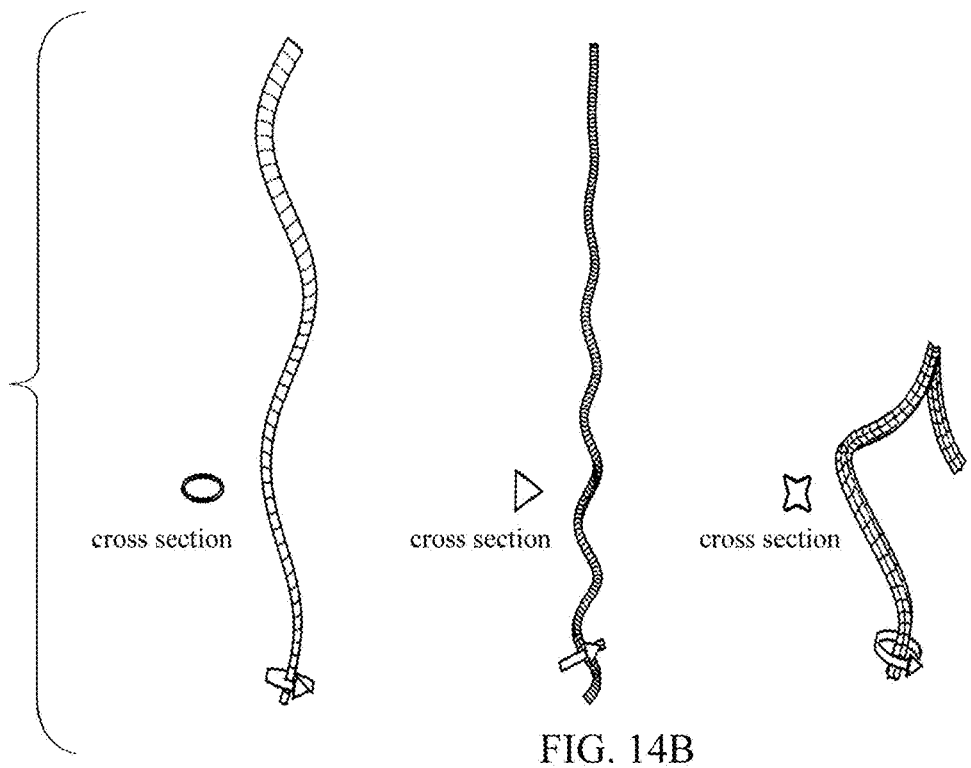
FIG. 14B shows different linear elements having different cross sectional shapes being twisted and/or bent longitudinally.

The Effect of Linear Element Coiling: Allowing linear element coiling and/or deflection is a way to store energy in the deformed linear element. Flexibly designed structures may be better adapted to linear element torsion that leads to angular deflection and coiling. FIG. 14A shows linear elements being twisted and/or bent to varying degrees and the resulting deflection and subsequent coiling behavior. FIG. 14B shows how the linear element's cross section may impact its ability to form a stable helix and resist buckling. Linear element helical coiling may particularly apply to structures built for energy harvesting applications. Relatively flexible modular network structures that allow the coiling of their linear elements would likely be built from modules with larger element length to element diameter ratios. Linear element coiling behavior may require torque and/or angle of rotation/shear strain be greater than many applications. Specific torque angles of rotation or sequence of angles may be reversibly used to create specific coiling behaviors. A multimodular structure may be formed from many linear elements, individually experiencing varying degrees of controlled distortion and/or deflection.

The torque mechanisms may serve a vibratory function. Programmed or autonomous torque mechanism behaviors could function to transmit vibratory frequencies into the linear elements for desired structural oscillations. Specific oscillations formed within the structure may act as a catalyst allowing conformational changes within the structures. The vibration of the elements by the connectors within a multimodular structure may be sympathetically tuned to the greater structure. The elastic nature of a structure built of helical linear elements may help it resonate at a specific frequency.

The free rotation of the linear elements may cause greater lateral forces to be applied to the linear elements. These forces may cause buckling during deformation and may also cause a structure to be less able to controllably morph at the modular and/or multimodular level. Adding the element of axial torque and/or coiling may provide greater strength, flexibility and mophability, particularly if smaller diameter linear elements are used.

Figure 15A:
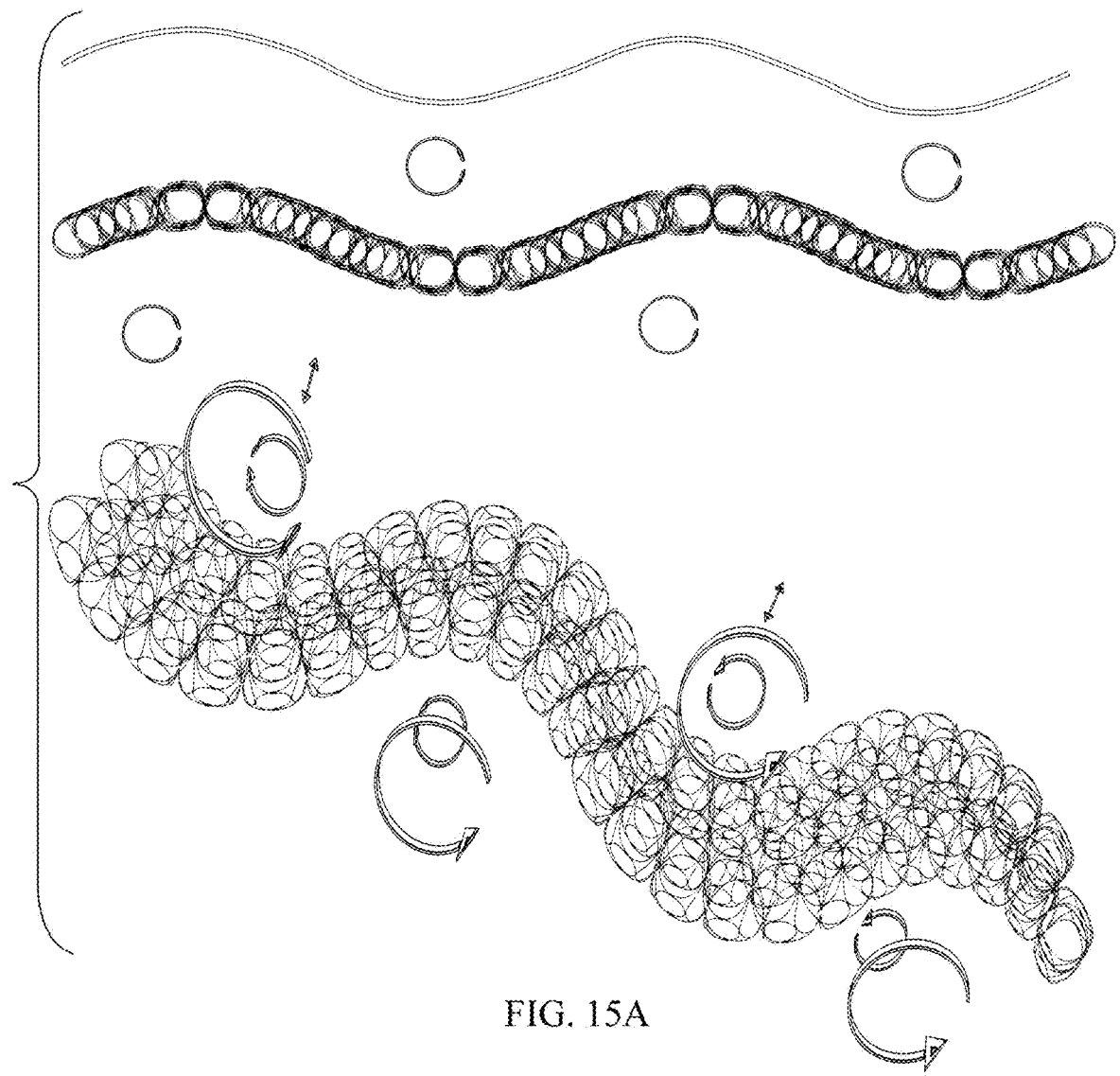
FIGS. 15A and 15B show a side view and/or perspective view of an actuatable structure built of many modules forming a layer/plane structure that is being passively distorted by waves.
Figure 15B:
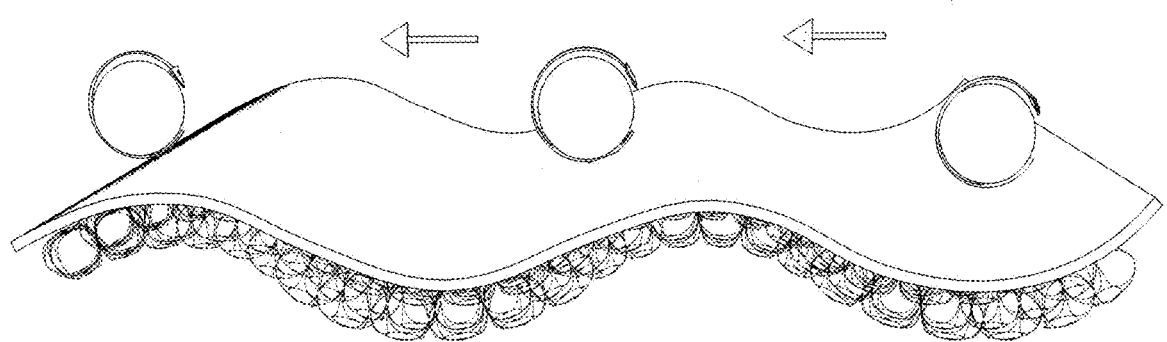

Specific linear elements torsion loads may allow structural harmonics to manifest themselves within twisted, coiled and/or bent linear elements. FIGS. 15A and 15B represent wave energy harvesting systems. Conventional and active tunable materials would both be capable of harvesting energy using such a system. A plane or other structure built of active tunable materials having piezoelectric properties could generate energy from the materials' flexing and twisting in a fluid or gas. A conventional composite material plane or other structure could harvest energy through connector linear element interface mechanisms.

The coiling behavior of the linear elements could be used to alter their lengths and may have robotic applications. The coiling and holding of linear elements within a structure could be a way to capture energy. The release of said stored energy from coiled linear elements could have many applications.

The torque applied to one liner element may need to be choreographed to the torque applied to proximal linear elements so as not to cause unwanted twisting and possible helical buckling of adjacent linear elements due to passive torsion.

Modules built of conventional or tunable composite material and having linear element connectors with torque/control mechanisms could be used to build large scale structures. Energy could be harvested from bridges, towers and other structures as they flex and torque. As a structure's linear elements bend and twist energy would be generated and harvested.

Modular lattice planes or other shapes placed on or beneath the ocean surface could actively resist wave action. FIG. 15A represents a type of wave energy harvesting system. Conventional and active tunable materials would both be capable of harvesting energy using such a system. A plane or other structure built of active tunable materials having piezoelectric properties could generate energy from the material's flexing and twisting. A conventional composite material plane or other structure could harvest energy through connector linear element interface mechanisms.

A conventional composite material ocean plane energy harvesting system would utilize the active gripping and releasing of the elements to harvest energy as the ocean waves force the plane to follow its wave form. The structure grips and releases the linear elements as they are torqued by the waves, thereby allowing optimum resistance to the wave action and maximum rotational force of the linear elements within the connectors. This energy harvesting system could be used to reduce wave action in coastal areas where it is detrimental.

A native resonance (oscillatory) frequency could be generated and maintained within the structure. This native frequency could be considered a torsion wave. The torque mechanisms could actively control the flow of the energy through the structure by manipulating the torquing of the linear elements. This could allow for the maximum energy movement and energy production from a bridge or other structure.

Energy harvested from a bridge could be captured from the vehicles or from other external forces that impact its structure. A self driving vehicle's energy expenditure and position on the structure could be actively controlled to optimize and maximize the bridge's energy harvesting potential as represented in FIG. 15B. The vehicles or other entities that impose forces on a structure may effectively become integrated into a bridge or other structure's flow of energy. As the structure is deformed and absorbs energy from external forces a wave from may be generated and actively maintained that allows it to more efficiently harvest, store and generate energy.

The combination of gripping/engaging, releasing and joining the linear elements end to end to form loops could create a dynamic environment where strain energy could be collected and harvested within specific regions of the structure. This dynamic energy production system would also work well with structures designed to have coiled linear elements.

The mass of the torque/control mechanisms could limit the functionality of microstructures. Therefore, mechanical morphing and mechanical energy harvesting would not be as applicable to structures built of modules at the small end of the size spectrum.

Alignment #4: The longitudinal alignment of the linear elements within the module and modular assembly may be accomplished by keeping the linear elements from sliding longitudinally within their connectors.

Figure 16:
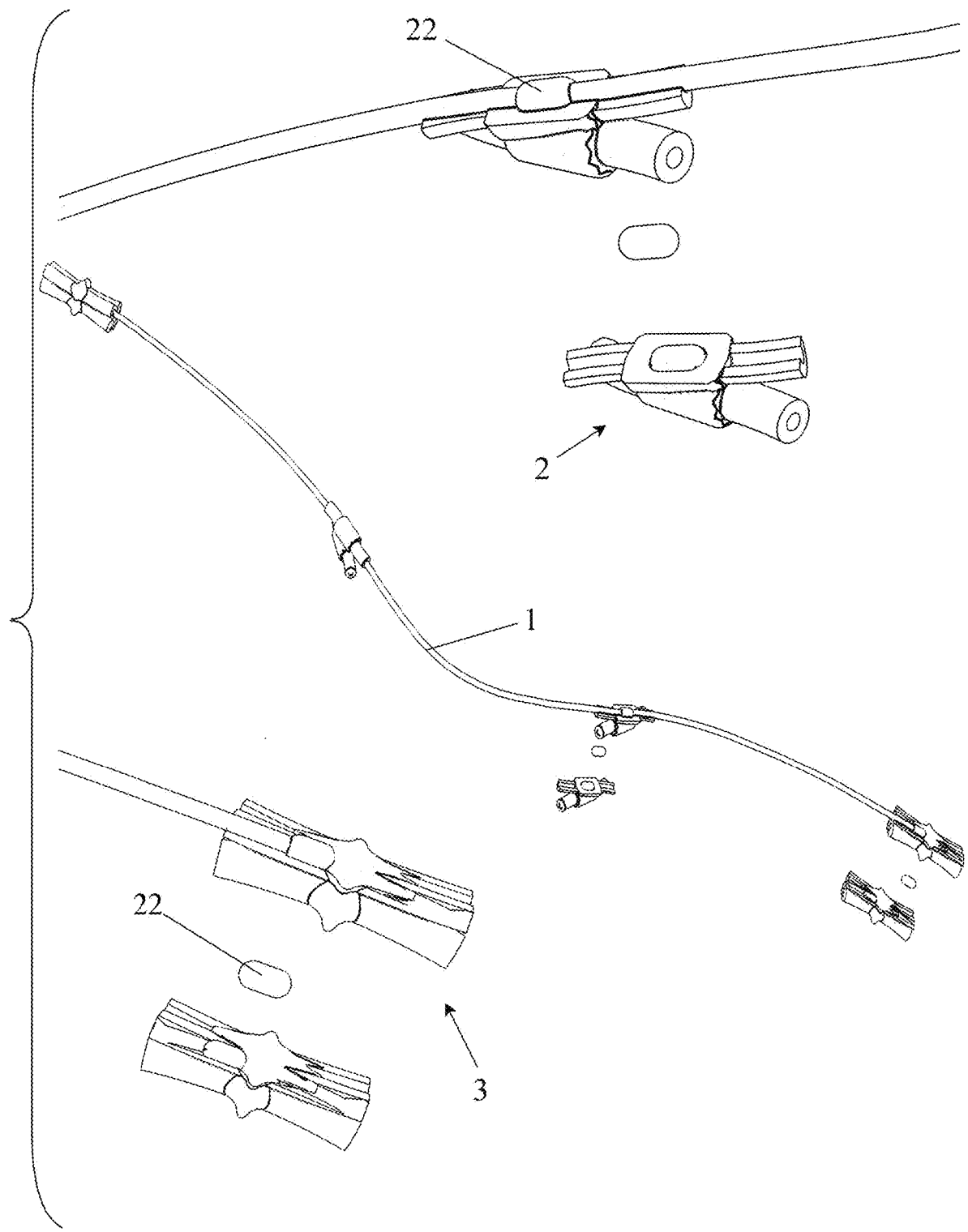
FIG. 16 shows details and a normal view of an alignment mechanism used to position the linear elements within a modular assembly. The cross section details show the embossed region and its complimentary shape.

FIG. 16 shows linear elements with an embossed regions/alignment mechanism (22). These alignment regions are designed to be received by an intramodular connector. The embossed regions or other type of locking mechanisms could be part of each linear element. A negative shape that mirrors the linear element's embossed region could exist in the connector's interior.

The embossed alignment region could form a specific shape that provides a method for the torque mechanism within the connector to engage the linear element(s).

The embossed alignment region may function as part of a mechanism that is able to vary the module's geometric relationship to phi. The mechanism may do this by moving the alignment region and linear element longitudinally within the connector.

The embossed region could also function as part of a mechanism used to engage linear elements together. This is possible because adjacent linear elements are housed within the same connector. The engagement of the linear elements within a shared connector may be a physical or magnetic coupling.

Figure 17:
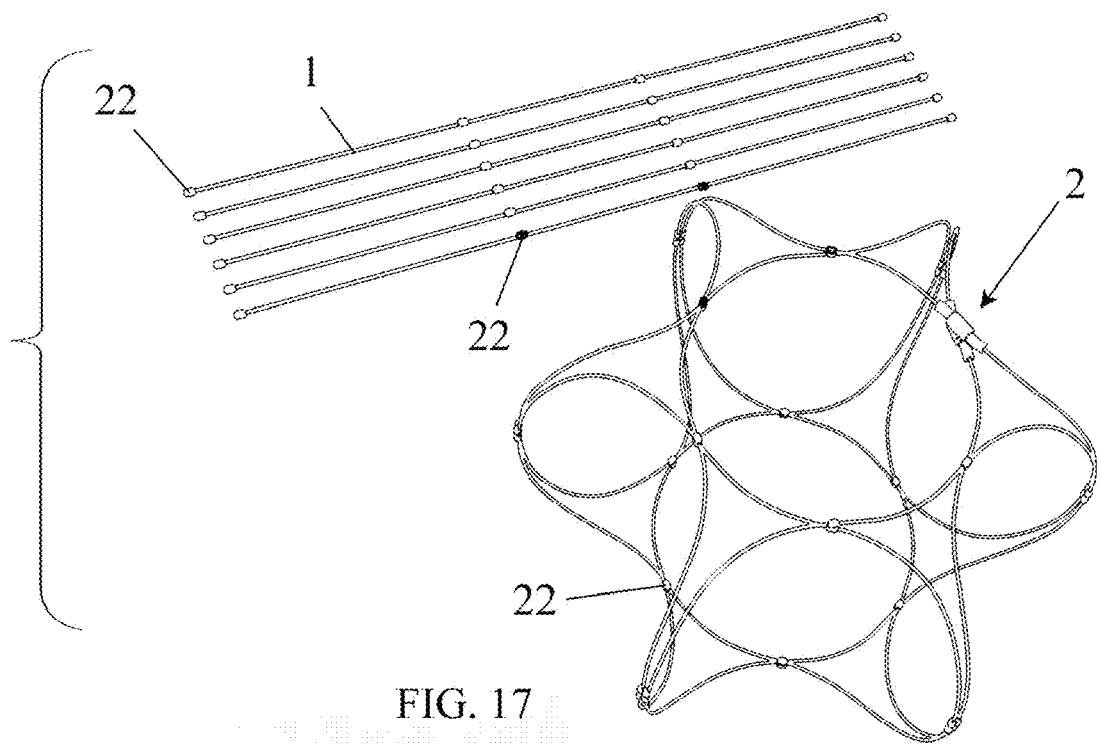
FIG. 17 shows a perspective view of six individual linear elements with embossed alignment regions and a perspective view of a structure built from linear elements that use the said alignment system to determine its geometry.

The embossed region (22) acts as an alignment mechanism to hold the linear elements in position longitudinally in relationship to its associated connector ensuring that the Phi relationship is maintained within the module's geometry. The intramodular and/or intermodular connectors could be made from a plurality of parts allowing them to be assembled around a linear element's alignment mechanism in parts, The intramodular and/or intermodular connectors could also be printed and/or formed around the prepositioned linear elements. The embossed regions or other type of alignment mechanism (22) hold the linear elements in place and determine the linear elements orientation within a module's geometry as shown in FIG. 17.

Joining/Linking/#5: The joining of linear elements may occur end to end and/or side to side within the connectors. Joining/linking happens between linear elements. A linear element joining/linking mechanism may be formed from a shape-changing smart material or a nontunable material mechanism. A shape-changing material may be a cellular solid that exhibits anisotropic swelling or a polymer nano-composite having electrochemically controlled swelling. The individual linear elements that comprise any and all module types can be held, freely rotate or partially rotate along their longitudinal axis. The joining/linking of linear elements may occur at any or all four of the connection points found on each linear element. Intramodular connectors can form only side to side joining of linear elements. Intermodular connectors can form side to side and/or end to end element joining.

Figure 18A:
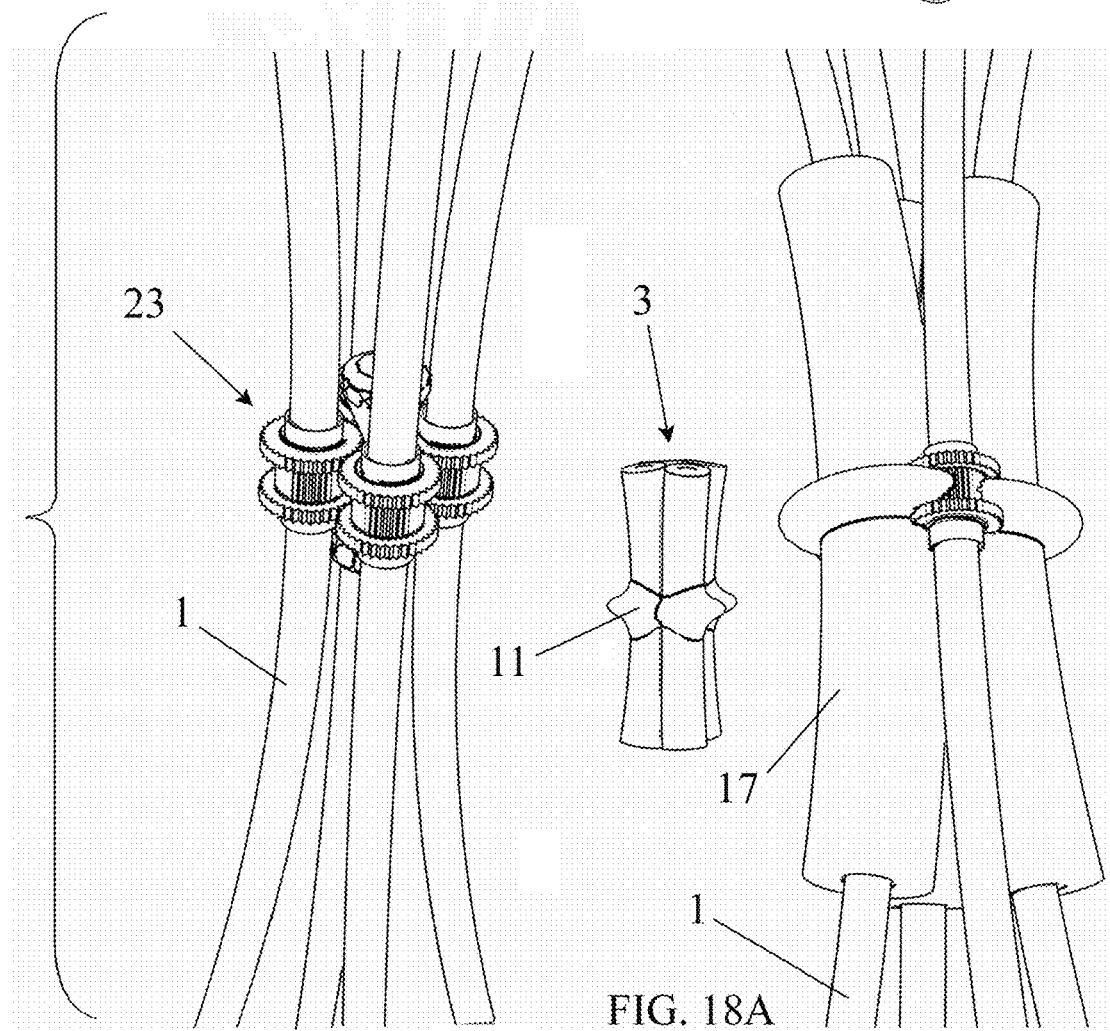
FIGS. 18A and 18B show perspective views of an intermodular connector and its associated linear element joining system. The joining mechanism, in this case uses an electromagnet to join the linear elements end to end and/or from side to side.
Figure 18B:
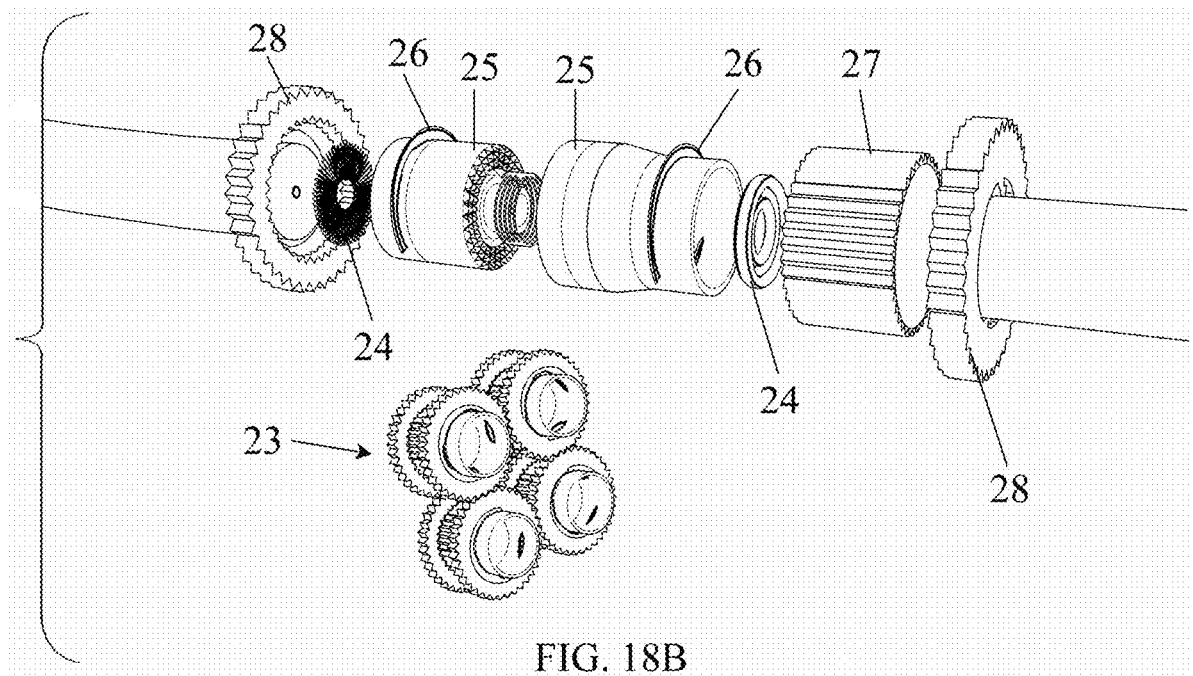

FIG. 18A shows an intermodular connector (3) and its control systems (11). In this example, the control system houses an electromechanical joining mechanism (23) capable of joining linear elements end to end and side to side. The joining mechanism (23) may use a device driven by an electromagnet to link linear elements. FIG. 18B shows an electromagnetic clutch, spline and spur gear system. This mechanism uses electromagnets to form physical mechanical connections. The mechanism may join linear elements end to end and/or from side to side. The electromagnets' coils (24) and hubs (25) may be fixed to the linear element termini using clips (26). Driven by electromagnets, the hubs' mating surfaces may reversibly mesh to join linear elements end to end. The electromagnets also actively position the engager spline(s) (27) to engage the spur gears (28) that in turn join elements side to side. The engaging of linear element termini only occurs in intermodular connectors. The engaging of linear elements side to side is compatible with the previously described intramodular connectors' designs.

Figures 18C, 18D:
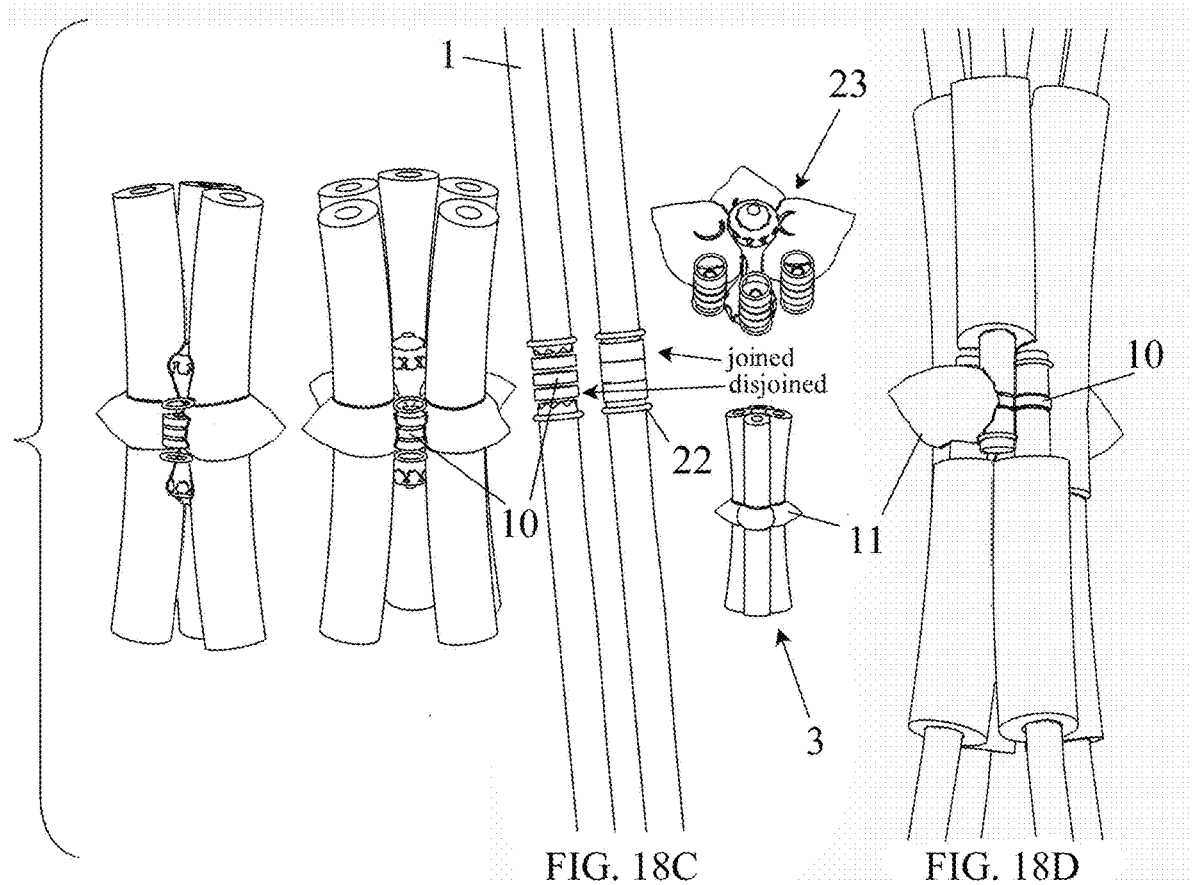
FIG. 18C shows views of an intermodular connector and its associated smart material joining mechanism located within the connector's control system. The joining mechanism's smart material engagers are shown to join linear elements longitudinally by changing shape.
FIG. 18D shows a cross section view of an intermodular connector, its associated smart material joining mechanism and linear elements that overlap within the connector housing but do not pass through it.

FIG. 18C shows a variety of intermodular connector types that contain tunable material engagers (10). These connectors may join linear elements longitudinally at their termini. Note: the label joined and disjoined. FIG. 18D shows an intermodular connector containing tunable material joining devices with overlapping linear elements. Linear element overlapping occurs when the termini of two or more linear elements from different modules extend beyond one another within the intermodular connector they share. The overlapping design may allow elements to join side to side at their termini. The use of an intermodular connector designed that overlaps the linear element it houses could make for a stronger intermodular connection.

The joining mechanism could only function if the linear elements were free to rotate within their connector. The engaging of linear elements lengthens the parent element. This causes the joined linear elements to experience torsion along their combined lengths if the intramodular connectors have a frictionless surface.

Figure 19:
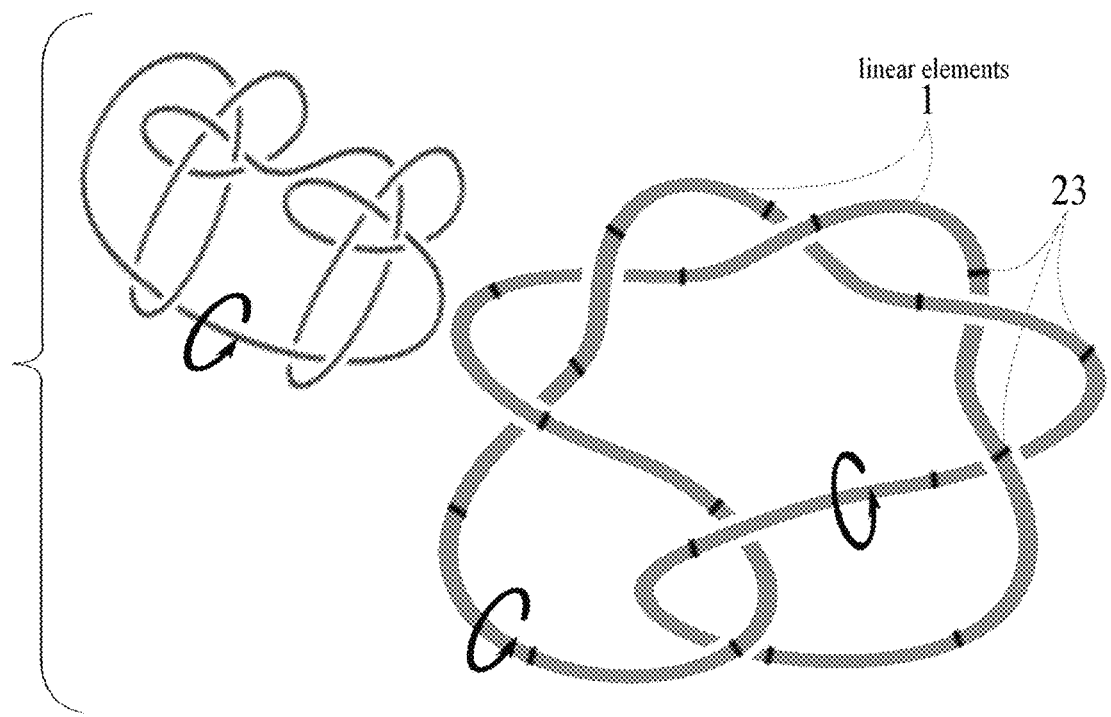
FIG. 19 illustrates how a plurality of linear elements and plurality of engagement mechanisms may reversibly form integrated torque loop structures within a modular assembly by joining linear elements end to end.
Figure 33:
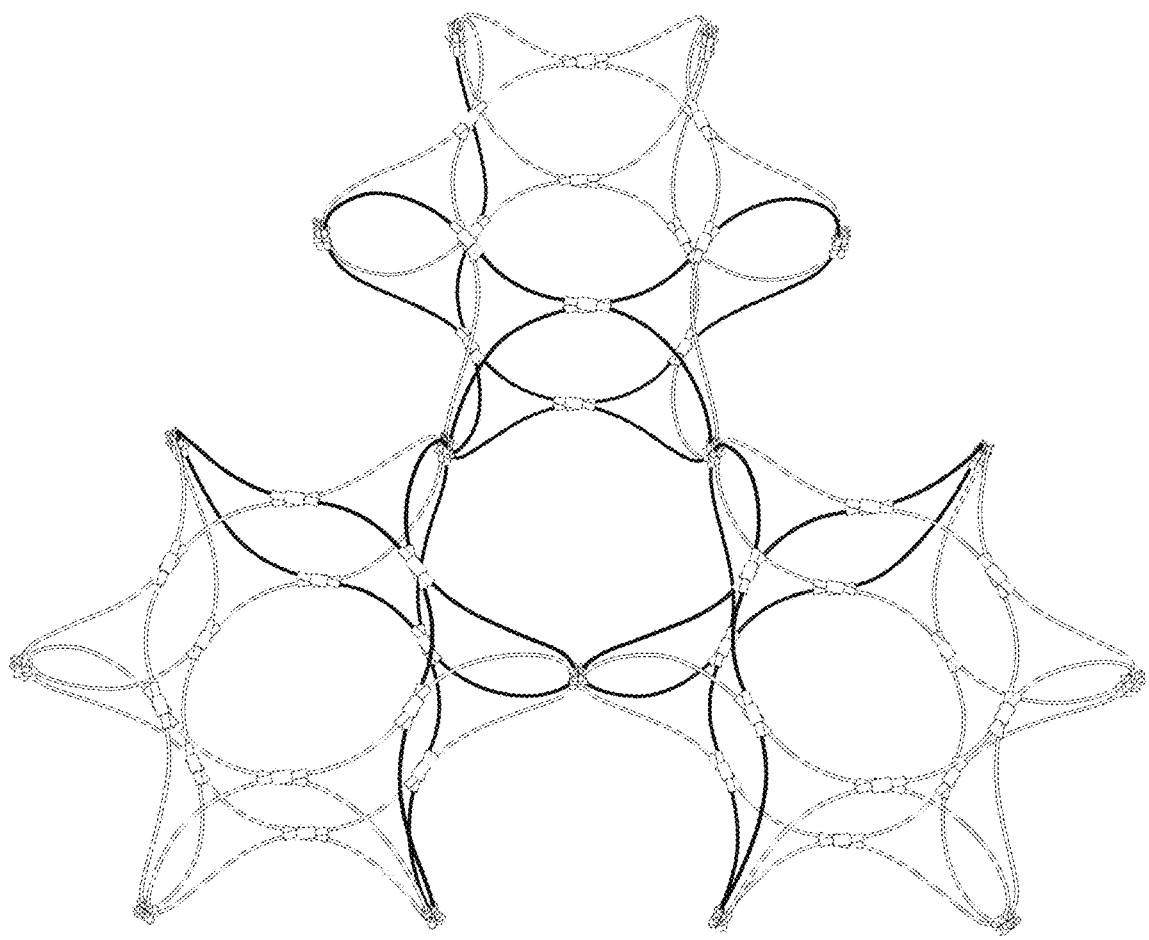
FIG. 33 shows a perspective view of a multi modular assembly formed from six modules. The solid lines are linear elements that are linked at their termini and may form loops within the network structure.

Structures could be designed that take full advantage of linear elements' end to end linking capabilities. A network structure could be programmed to have its many linear elements engage end to end in a sequence that dynamically weaves within the larger network structure. As shown in FIG. 19, a multimodular assembly could in effect be built of a single linear element that forms a network structure from a flowing loop. FIG. 33 depicts a similar linear element looping system within a multimodular structure.

Figure 20:
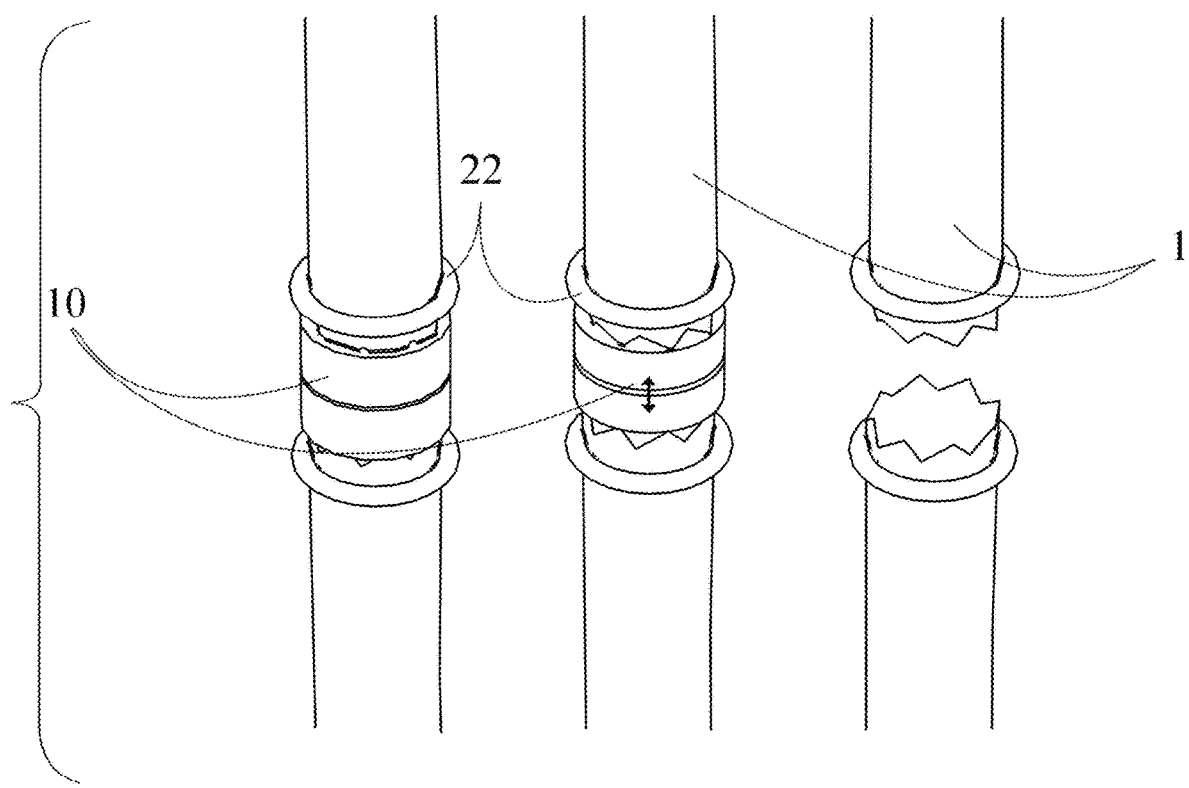
FIG. 20 shows detailed views of a smart material engager and a compression ring and groove connection alignment mechanism that may be an alternative to the embossed region alignment method.

The compression ring and groove connection/alignment method shown in FIG. 20 is one of many alternatives to an embossed region/alignment mechanism (22).

A type of additive manufacturing technology could be used to join and/or encapsulate the linear elements at the appropriate regions along their lengths during or prior to the building of a module and/or multimodular network.

There may be processes and/or applications where a module and/or multimodular network structure could be formed as an integrated unit, and its linear elements and connectors exist only in terms of their functions. A structure's linear elements and its intramodular and intermodular connectors may functionally exist but not be capable of existing independently of one another. The linear elements, connectors, modules and modular assembly could be formed in one process and never exist as individual parts.

Stimulation/energizing #6: The connectors and linear elements within a network structure may be energized in various ways, by a physical connection to an energy source, from an energy rich medium they are immersed in, self energizing, or from electromagnetic radiation. Energy may be actively and/or passively acquired and stored by the system.

Figure 21:
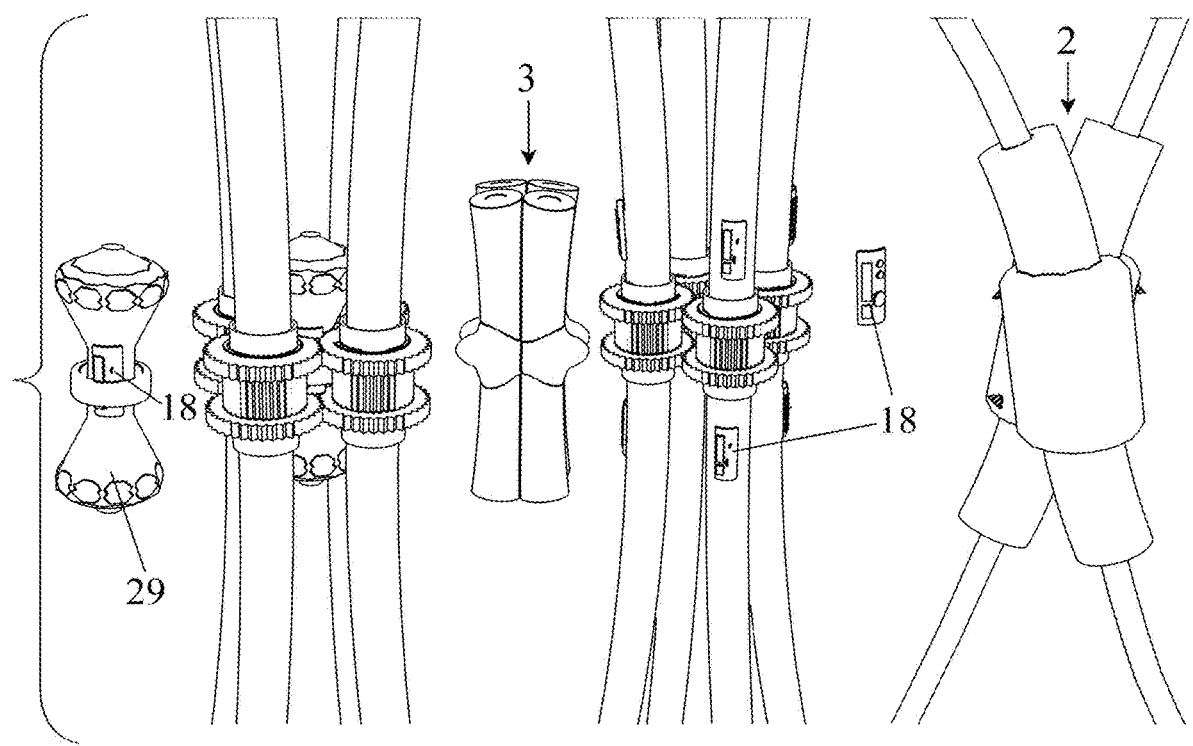
FIG. 21 shows perspective views of the different ways the control system interface may be positioned within the intermodular connectors, intramodular connectors and/or linear elements.

The intentional/active introduction of energy into an actuatable smart composite material linear element and/or associated connector hardware may involve the control system interface (18). The control system interface (18) may contain a wide variety of electronic components not limited to processing, stimulation and sensing. FIG. 21 shows a control system interface (18) in conjunction with various linear element connector types. The control system interface may be integrated into inter and intra modular connectors and/or the liner elements. FIG. 21 shows how a control system interface may be individual to each linear element or how a single interface may serve multiple elements with the use of a distribution hub (29) that networks the linear elements within an individual connector. The control system interface (18) may be formed into the material of the linear elements and connectors.

Tunable carbon based polymeric composite materials could comprise the components of this building system. The perfect carbon fiber is a nanotube; a nanotube may be an actuatable molecule. Carbon nanotube and/or graphene doped composite material is structurally superior to the conventional carbon fiber used to form the structural components of this system. Types of carbon nanotube polymer nanocomposites that display tunable material functions such as actuation, sensing, self healing, energy storage and energy generation could be used as the components of this system. Electroactive polymers, or EAPs, are polymers that exhibit a change in size or shape when stimulated by an electric field.

Molecular manufacturing techniques could produce specific allotropes of carbon designed to have electrocatalytic, electrostatic and/or piezoelectric properties that could be incorporated into the component parts of this system.

Various types of sensing and stimulator mechanisms could be placed within the connector hardware and/or integrated into the composite material itself. A type of stimulator mechanism could function as a control system that modulates the material's flexibility by passing complex stimuli through it. The stimuli could be a specific frequency or oscillation that causes mechanochemical changes within the carbon allotrope type or species making up the tunable material. This stimulator mechanism could be part of the control system interface (18). This control system interface may be housed within the control system (11).

Sensing #7: The active real time sensing of the forces and other environmental factors that impact a structural network could provide the information used to guide responses to stimuli and also initiate specific autonomous behaviors.

Sensing can originate within the linear elements and/or within the connectors. All the mechanisms or materials making up a network structure can share the information they generate.

The information acquired from sensing the structure's internal and external environment is integrated into the network structure's behavioral programming. The forces experienced by a structure when it exhibits a behavior can result from its programming and/or external stimuli. Information from sensing a load, torque, position, the presence of a chemical and/or chemical gradient, etc. can be actively integrated into a structure's programmed behavior.

The active sensing of the forces within a structure as its collective parts actuate could help mitigate structural failure. The data generated and received by the collective control system interfaces is processed and shared within the network.

This sharing of sensory information within a structure may play a similar role as pain serves in an organism. Both may be used to reduce the likelihood an organism damages its structure during a strenuous activity.

Self-healing material may allow the structure to repair and/or become stronger when it experiences stress and strain beyond a certain level. The system of sensing within a network structure would include parts integral to the control system interface (18). Sensorial data may be gathered from mechanisms, the material and/or sensor devices that make up the network structure.

Spatial addressing #8: Each linear element and connector is given an address identifying it within the network structure. The address contains information on its part type, its three dimensional coordinates, its behavioral characteristics, its sensing capabilities, etc. The addresses of all the parts that make up a network structure could be the digital information used to form it and simulate its behavior prior to it being formed. The information that represents the structure virtually is intended to correctly represent and facilitate the creation of its real world analog.

The CAD/CAM/CAE software used to model a network structure and simulate its behavior could serves as the template for the software used to program the network structures behavior in real world applications.

If data could represent all the physical and behavioral aspects of a structure, this data could be used to physically build that structure using additive manufacturing or another digital manufacturing process.

A hybrid process could use an additive manufacturing process in conjunction with premade physical parts. This process could integrate the premade parts into the network structure as the additive manufacturing process proceeds. The premade parts' physical characteristics must mirror those represented within the structure's virtual model.

The spatial and behavioral information generated in the process of designing, modeling and simulating a structure's physical and behavioral properties could directly feed into the building and/or behavioral programming of that structure. This data could be used to manufacture a network structure as a unit or its data could be used to create the individual parts and then be assembled into the network structure.

A multimodular structure can exist as a behavioral network, structural network and/or communication network simultaneously. For example a multimodular structure could exhibit ambulatory behavior, orient its self spatially and combine with other structures and/or objects. The act of structures and/or objects combining/binding allows information to be shared; therefore creating a network that is complex structurally, behaviorally and informationally. These network structures built of many reversibly joined multimodular structures or objects may exhibit higher order behaviors, like performing autonomous work or calculating. The level of integration required for complex network structures to function efficiently within the totality of its cascading events could require the structure be a deterministic system.

The Integrated Functionality of the Connectors and Linear Elements: A fully integrated intramodular or intermodular connector can serve many functions. It is always structural and may be tunable, electromechanical, energy generating, sensorial, and have stimulatory functions. Besides physically connecting the linear elements to form modules and a greater multimodular structure, the connectors may house any or/all of the components used to control the structure's behavior as described above.

Behaviors are most likely controlled at the level of the control system interface (18). A connector at its most dynamic will interface with its associated linear elements in all the ways described above.

Figure 22:
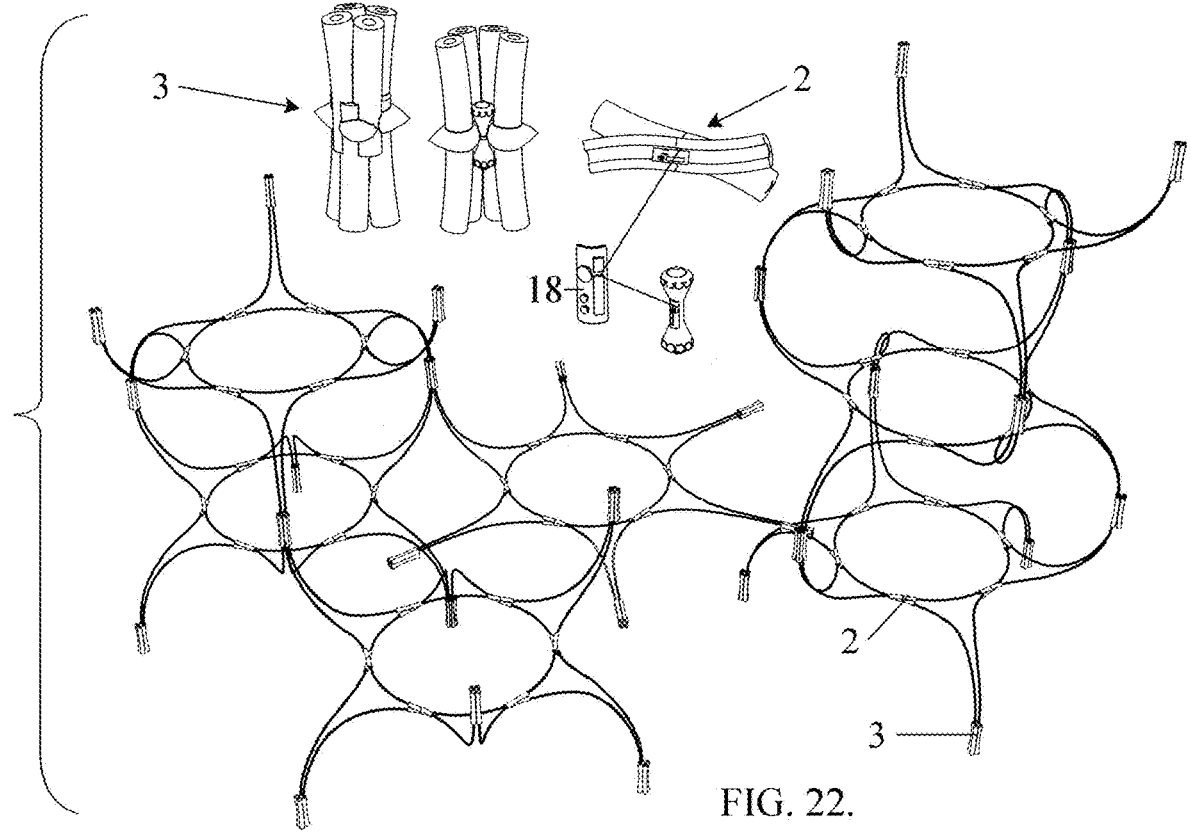
FIG. 22 is a perspective view of a multimodular structure that is shown as a network of actuatable structures that may be controlled by a plurality of control system interfaces.

FIG. 22 shows the general composition of a multimodular construction. It depicts a multimodular assembly comprised of seven modules. This network structure is composed of intermodular (2) and intramodular (3) connectors and linear elements (1). The linear elements and connectors bidirectionally transfer information via the control system interface (18). The plurality of control system interfaces that punctuate a multimodular structure may collectively control the structures behavior. The collection of interfaces with a structure may function as a group of networking processors. Collective processing within the structural network may reduce the processing requirements of the individual control system interfaces.

The Distribution of Forces within a Structure and its Modulation: The static forces (the base line forces) placed on a linear element within a multimodular network structure equals the collective forces imposed on it from the network it is a part of. The static forces and the external forces placed on a linear element combine to form its total stresses.

Within a multimodular assembly, the static forces/forces of equilibrium are not always uniformly distributed throughout the structure. Some regions of the structure are under greater static forces than others. If a multimodular structure is deformed by external forces, the regions of high static force within the multimodular structure could be modulated to ensure that one part of the structure does not fail before another part.

The regions within a structure under the greatest stress may function as a energy reservoir. Stress dense areas may transferred energy to areas of low stress by tuning high stress regions to become less and/or more flexible. This evening out of the stress placed on the structure could be actively controlled as external loads are imposed on a structure.

The structure could be behaviorally modulating in real time by the intramodular and intermodular connector control system (11). The control system could house torque and lateral force sensors that provide data used to determine the appropriate modulating actions needed to avert damage to high stress and/or highly deformed regions within the network. Excessive stress and excessive deformation may have similar outcomes.

The forces that mirror the structure's shape are the static forces and define the structure's equilibrium state. It may be possible to redefine the equilibrium state through tuning for certain applications. External forces add to the forces that define the equilibrium state.

The active torque modulation using mechanized or muscular connectors is a form of external force. It is a separate from the equilibrium state. Wind or gravity are also externals forces. These two types of external forces are similar in that they both are fueled by energy from a source that is outside the structure itself. They differ in that the wind and gravity are uncontrollable and the mechanized connectors are controllable. Because of this, a force that is unknown is the force that drives the modulation. The modulation could be applied by the mechanized connectors in order to maintain a steady state.

The Linear Element Length to Linear Element Diameter Ratio and its effect on Flexibility: Linear element flexibility determines module flexibility and, in turn, the flexibility of a structure built of multiple modules.

Module flexibility determines the level of deformation a module can experience without failure. In turn, the individual module's flexibility determines the level of deformation that a multimodular assembly can experience without failure. More flexibility equals greater deformation.

Figure 23:
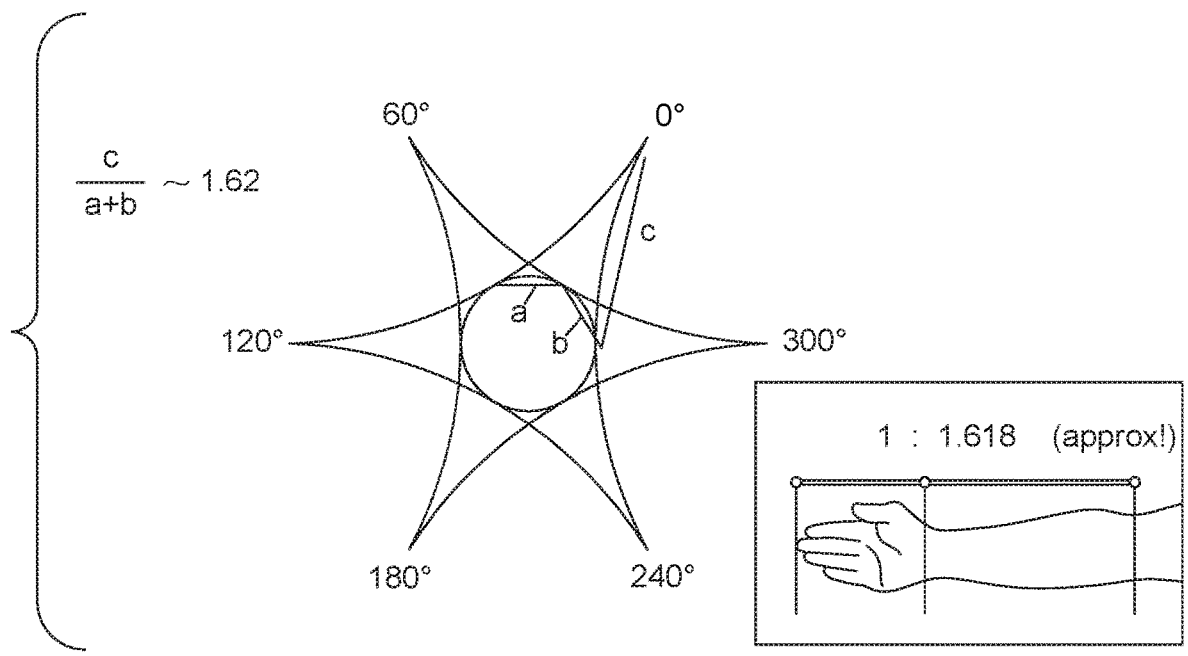
FIG. 23 is a normal view showing a module's geometric relationship to phi.

As noted and shown in FIG. 23, all modules approximate the geometric proportional relationship to phi. Regardless of scale, type and family affiliation, each module maintains this fundamental geometric relationship to phi within its design.

Modules containing tunable linear elements stimulated to alter their length will maintain a geometric proportional relationship to phi. i.e. The relationship is not impacted by changes in scale.

Because the fundamental modular design and its proportions do not appreciably change with scale, the factor that determines a specific module's flexibility is essentially the linear element's flexibility.

A module's linear element's cross sectional diameter is not defined by the module's scale. It is defined by its functional requirements. There is a disproportionate decrease in flexibility as linear elements cross sectional diameter increases given the same material type. This is similar to the relationship of surface area to volume. The flexibility of a linear element is determined by the physical properties of the material composing the linear element and also the cross sectional shape and diameter of the linear element.

If a material used to form a linear element is not tunable, the factor that determines a linear element's flexibility is the material's physical properties and the linear element's diameter alone.

If tunable materials are used, a linear element of a specific cross sectional diameter, shape and length can have variable flexibility. A tunable actuatable linear element's physical properties are not fixed. If a linear element is placed under longitudinal torsion via the torque mechanism, its physical properties within the structural network are also not fixed. Mechanical torquing is a way to simulate modest tunability.

The Use of Linear Elements and Connectors Having Different Specifications: Modules and multimodular network structures may contain linear elements of different flexibilities, cross sectional shapes and diameters. A module made up of linear elements of different physical properties will cause asymmetric forces within the module and the central ring or rings will become ovoid or distorted. If tunable materials are used, modules composed of identical diameter linear elements can simulate these conditions. If tunable material linear elements of different diameters are used to create a module, the elements can be tuned to create symmetrical forces within the modular structure.

Linear elements and connectors may use tunable material that allow the control of their physical properties which include flexibility, conductivity, length, etc.

Figure 24:
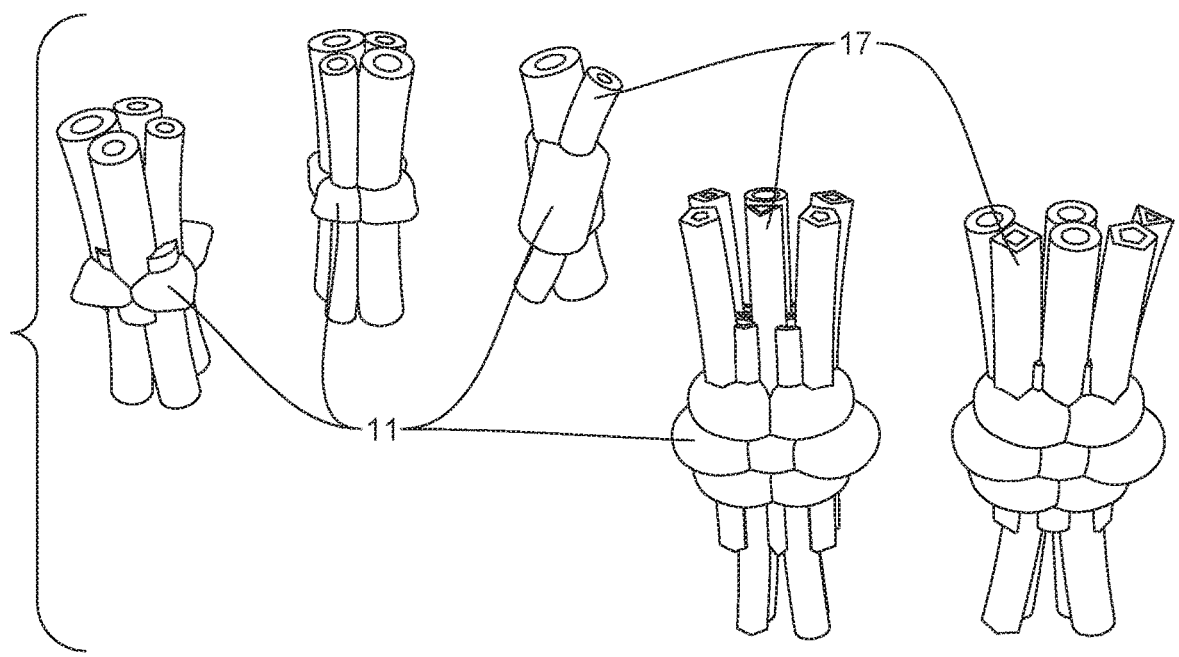
FIG. 24 is a perspective view of connectors having different shaped connector tubes that may accept different linear element shapes.

Modules may contain any combination of linear elements, diameters and cross sectional shaped connector tube (17) interiors. Modules made up of different linear element types may require intramodular and intermodular connectors with connector tubes (17) of various diameters and shapes and/or lengths as depicted in FIG. 24.

Figure 25:
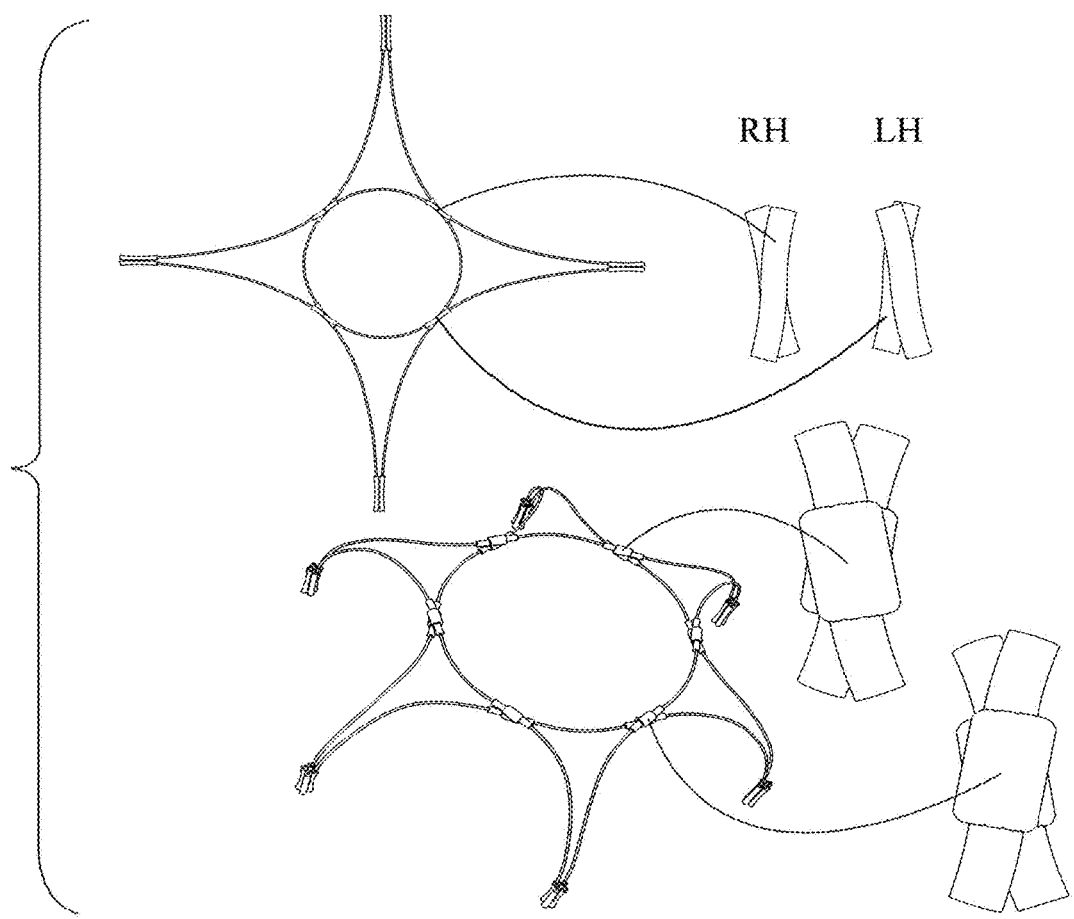
FIG. 25 is a normal and perspective view of modules that individually contain intramodular connectors that are mirror images, LH and RH.

FIG. 25 shows how intramodular connector isomers can be positioned within a module and how the connector isomers determine the linear elements' orientation to one another. Intramoduler connector chirality impacts the linear element orientation within the module, the module's physical properties and the behavior.

Figures 26A, 26B:
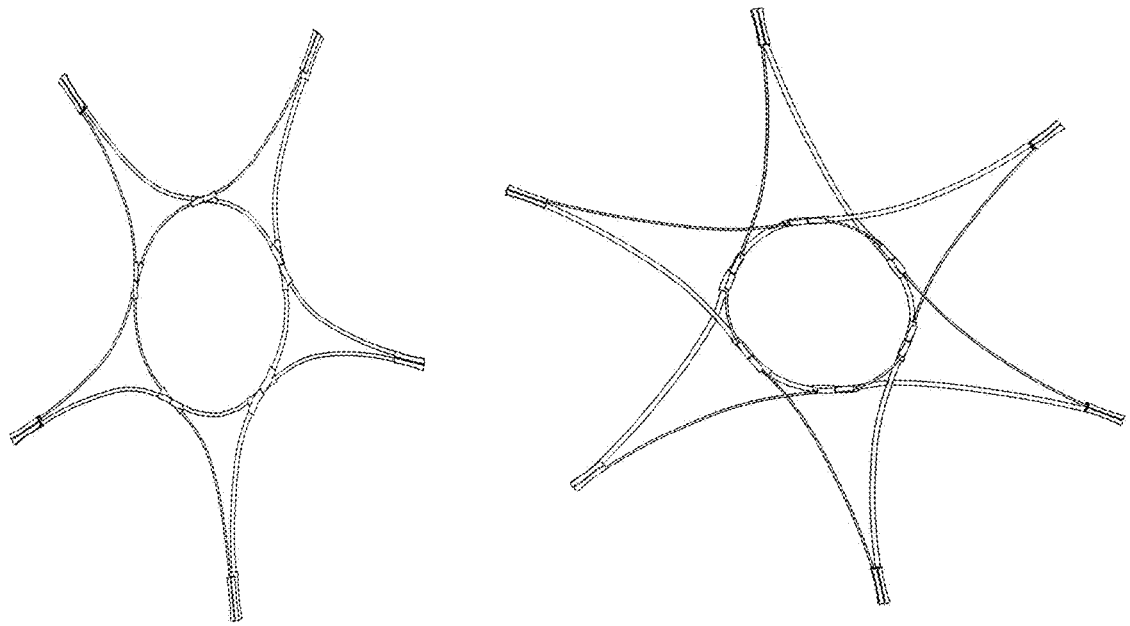
FIGS. 26A and 26B are normal views showing modules built using various diameter linear elements and how this may alter their geometry.

FIG. 26A shows a module from Family A composed of five linear elements of three different linear elements. The distorted central ring is cause by the asymmetric forces created by linear elements.

FIG. 26B shows an module from Family B composed of six linear elements of two different diameters. This six sided module is designed to have different diameter linear elements that alternate within the module.

Variable Connector Geometry: Intramodular connector hardware could function to vary a modules geometry. The connectors could actively change the angle linear elements intersect with one another. This change in geometry could alter the tension within the module and also at each linear element intersection point in unison or independently.

An intramodular connector without variable geometry holds linear elements parallel to one another unless the connector hardware has some other fixed geometry.

Figure 27:
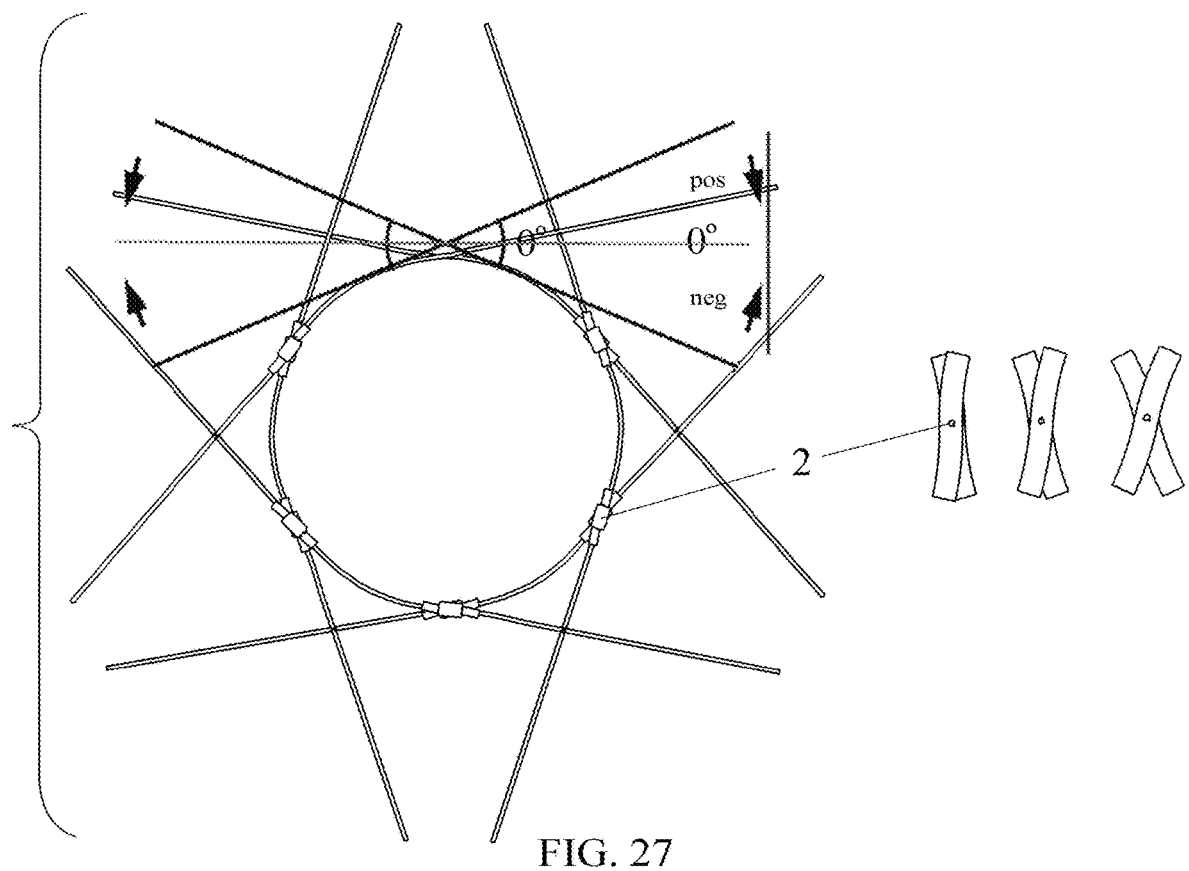
FIG. 27 shows a detail view of an intramodular connector varying its geometry in a sequence and also a normal view of a module containing variable geometry connectors that may be capable of altering the module's geometry.

A variable geometry connector may allow the intersection angle of linear element to vary. When two intersecting linear elements are oriented parallel to one another at the point of intersection, they are at their base line orientation of zero degrees as depicted in FIG. 27. Deviation from the base line indicates the linear elements are geometrically positive or negative. Variable geometry connectors allow each linear element to orient itself positively or negatively in relation to their zero degree parallel orientation. In FIG. 27 linear elements within a connector are shown to change their orientation within a six sided module from family A.

Figure 28A:
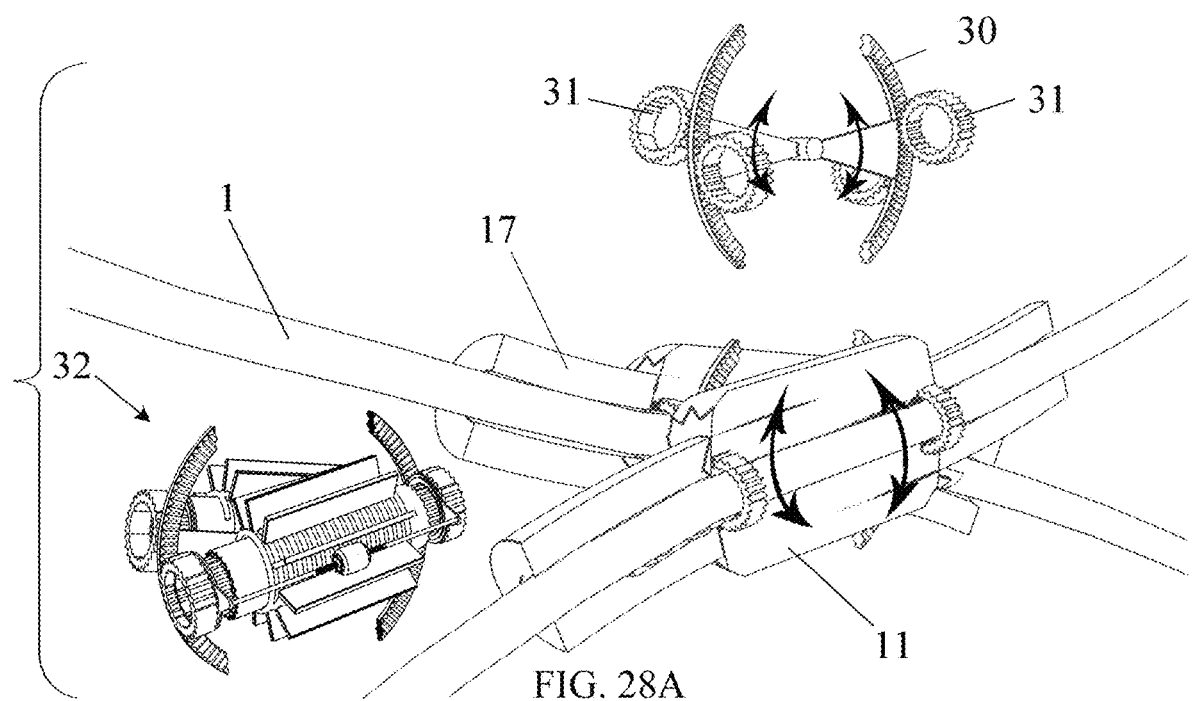
FIG. 28A shows an exploded perspective view of an electromechanical, variable geometry, intramodular connector. Its variable geometry mechanisms are shown to alter the geometry where linear elements intersect within a connector.

A variable geometry connector could incorporate a mechanism that alters its connector tubes' (17) orientation, for example, the ring (30) and pinion (31) mechanism shown in FIG. 28A. The ring and pinion system changes the geometry of the connector tubes. FIG. 28A shows a variable geometry mechanism (32) that includes the ring and pinion system. Variable geometry systems including MEMS and NEMS could be used to alter the connector tubes (17) position relative to one another.

FIG. 28B shows variable geometry connectors within a module and demonstrates how they can alter the modules geometry by holding the linear elements at a base line and then holding them askew.

Figure 29A:
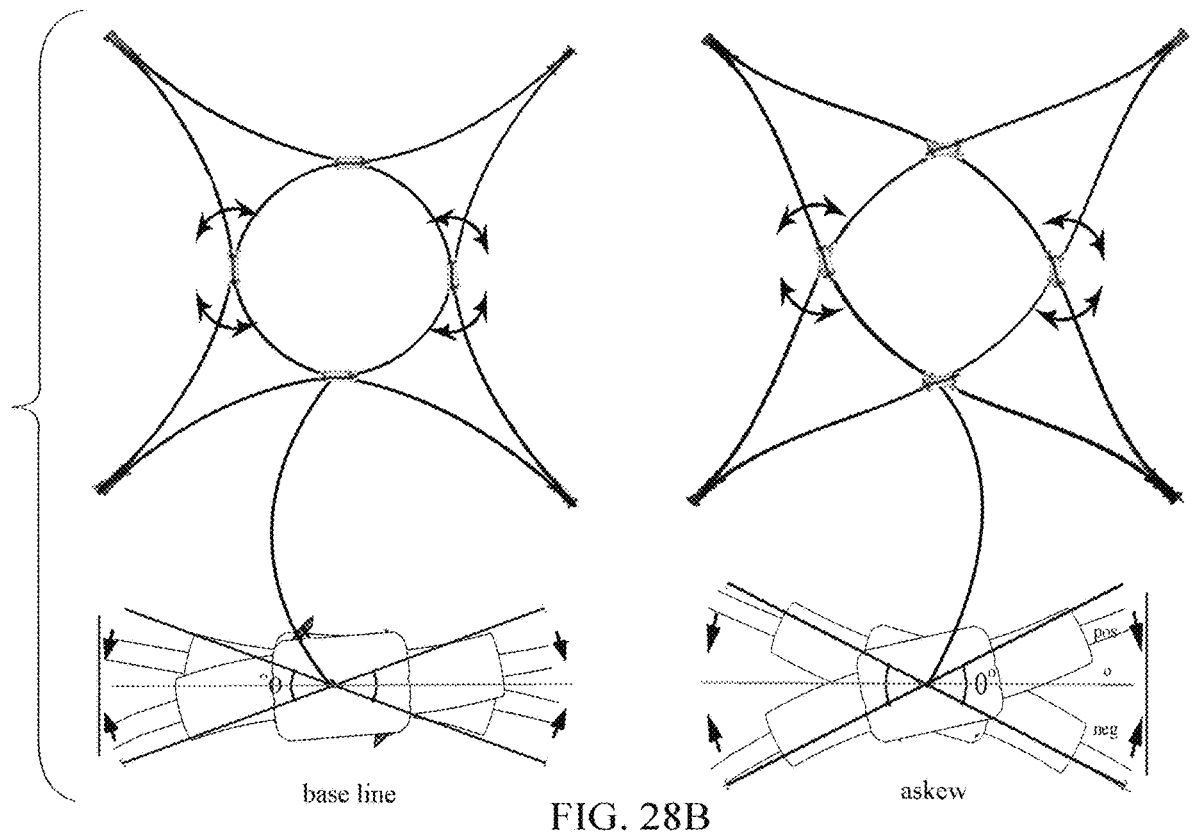
FIG. 29A shows a perspective view of a variable geometry, intramodular connector with tunable material actuators on its ends.
Figure 29B:
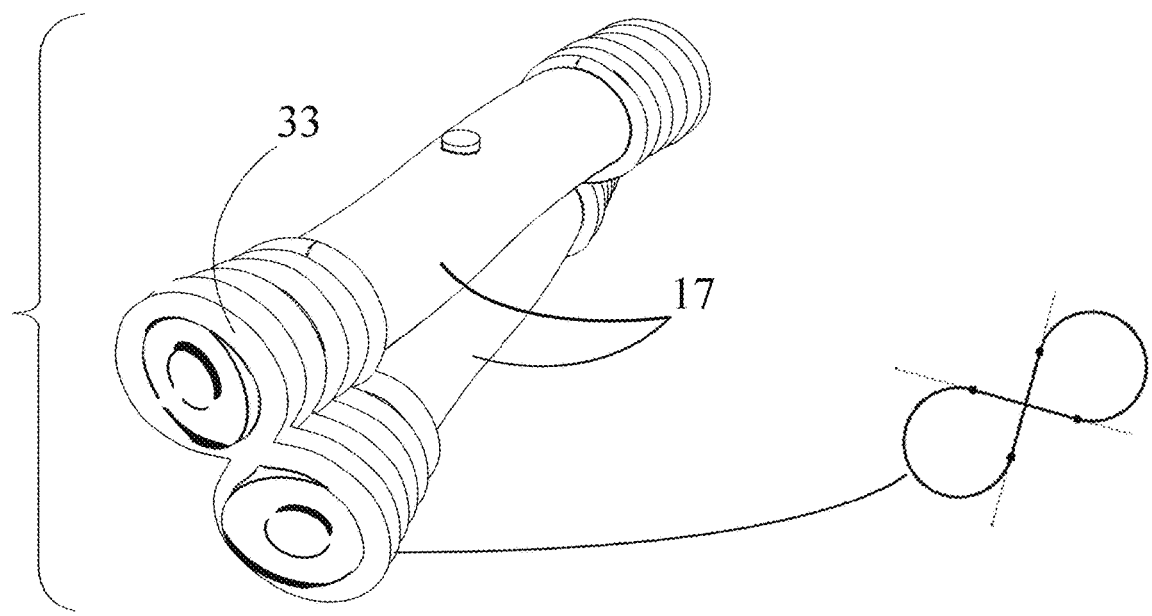
FIG. 29B is a normal view showing the twisted shape of a tunable material actuator.

Variable geometry connectors could contain tunable material in differing amounts and locations. FIG. 29A shows a variable geometry connector that incorporates tunable material on its ends. When the tunable material is stimulated to constrict, the tension placed on the intramodular connector changes its geometry. The tunable material actuator (33) may have a twisted orientation (a lemiscate in this case) as seen in FIG. 29B. The actuator's' shape and geometry may be application specific.

Figure 29C:
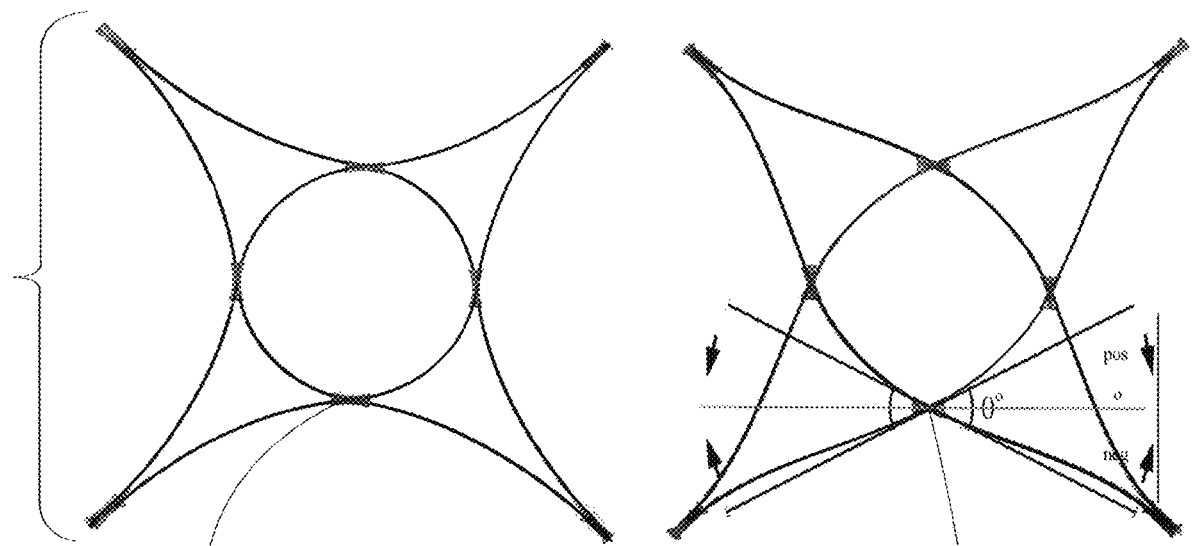
FIG. 29 C shows a normal view of two modules each of which containing tunable, variable geometry, intramodular connectors. The actuatable connectors are shown to alter their geometry and, in turn, the shape of the module.
FIG. 29D shows perspective views of an actuatable/tunable intramodular connectors made of a single material that relax and constrict to change its geometry. The structure of the connector including its tubes are shown to stretch.
FIG. 29E shows perspective views of an actuatable/tunable intramodular connector made of multiple materials that relax and constrict to change its geometry. The connector's tunable material actuators change the geometry of the connectors tubes.

FIG. 29C shows two modules each containing tunable, variable geometry, intramodular connectors. When part of a module, these connectors form actuatable points where two linear elements intersect. These points are the foci of geometric changes within the module. The actuatable connectors are shown to alter their geometry and, in turn, the shape of the module.

Figure 29D:
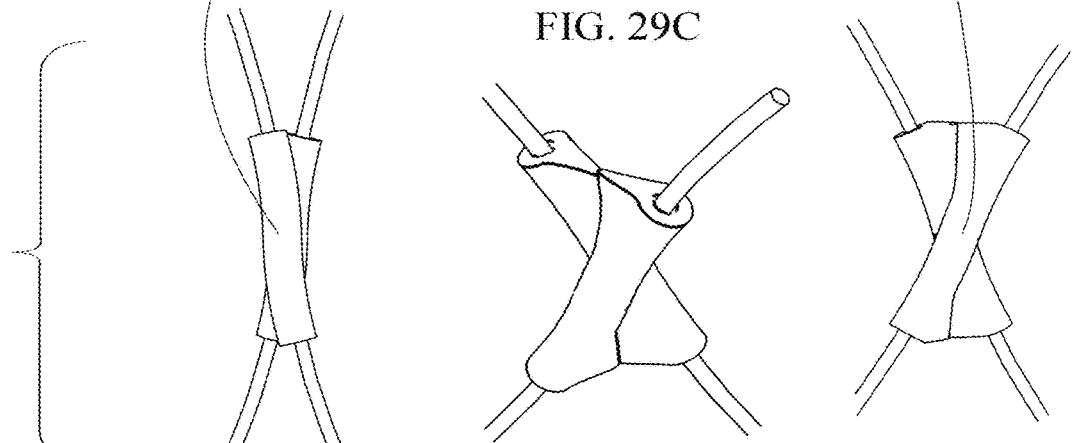

FIG. 29D shows a tunable intramodular connector composed of a single smart material changing its geometry and flexability. This single material type of connector is shown to reversibly distort with changes in the module's geometry. These connectors alter the module's geometry by constricting or relaxing. The potential energy within the bent linear elements may act to reverse the constriction of the connector, there by returning the structure to its low energy state.

Figure 29E:
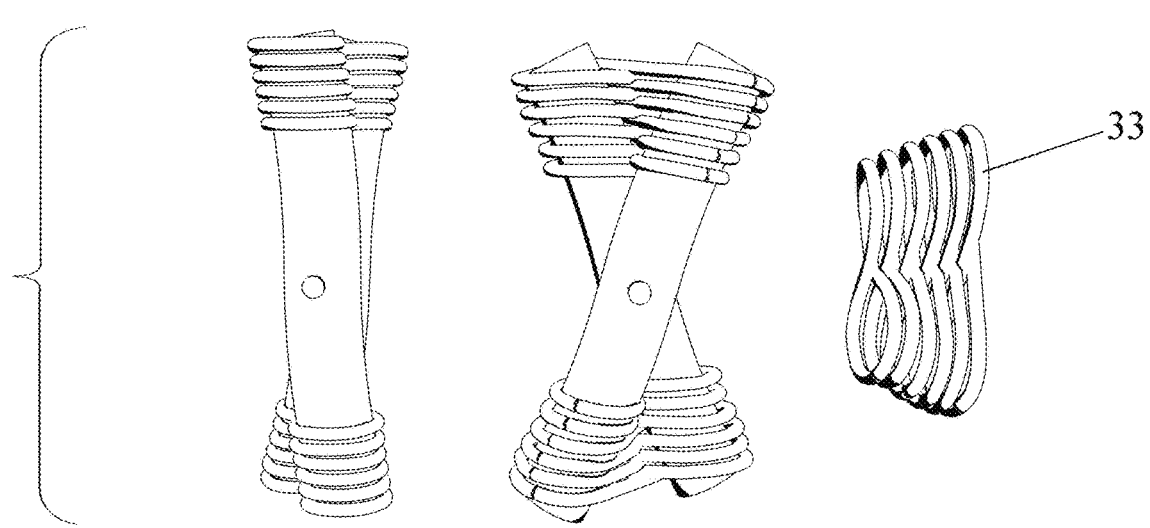

FIG. 29E shows a tunable intramodular connector made of multiple materials altering its geometry. The connectors tunable material actuators located on the ends of its connector tubes distort and change the connector's geometry. The potential energy within the bent linear elements may act to reverse the motion of the smart material actuators (33) there by returning the structure to its low energy state.

Tunable variable geometry connectors could be built as discrete units and combined with the linear elements to form modules or they could be formed around the linear elements using an additive process, possibly an additive process that builds onto the linear elements at the molecular level.

These printed smart material connectors may incorporate processing and/or sensing devices. A printed connector may have a high level of functionality.

Figure 30A:
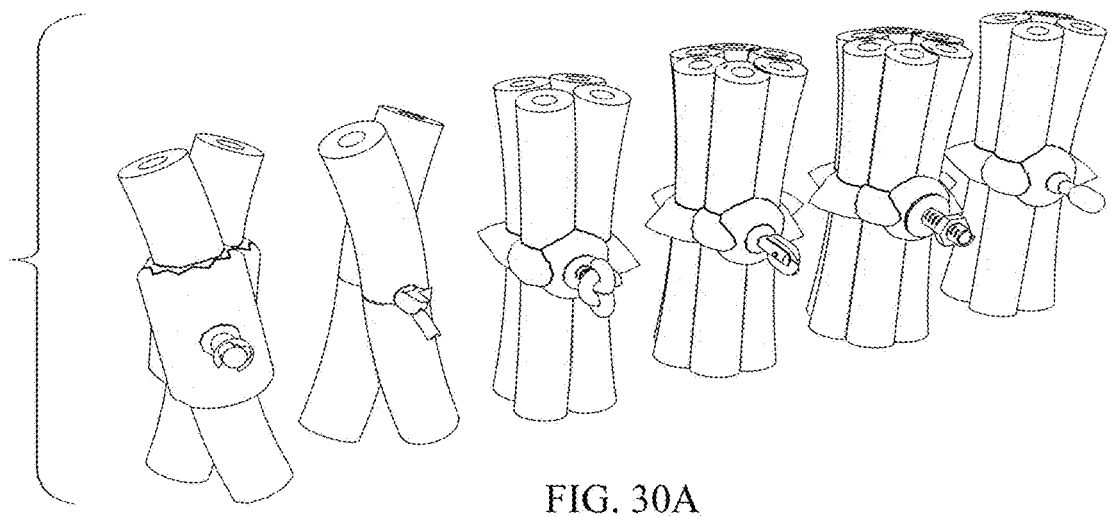
FIG. 30A shows a perspective view of exemplary attachment mechanisms that have been integrated into the intramodular and intermodular connectors' structure. Said mechanisms may include pinned locking mechanisms, elastic locking mechanisms, compression rings, structural processes, and clips
Figure 30B:
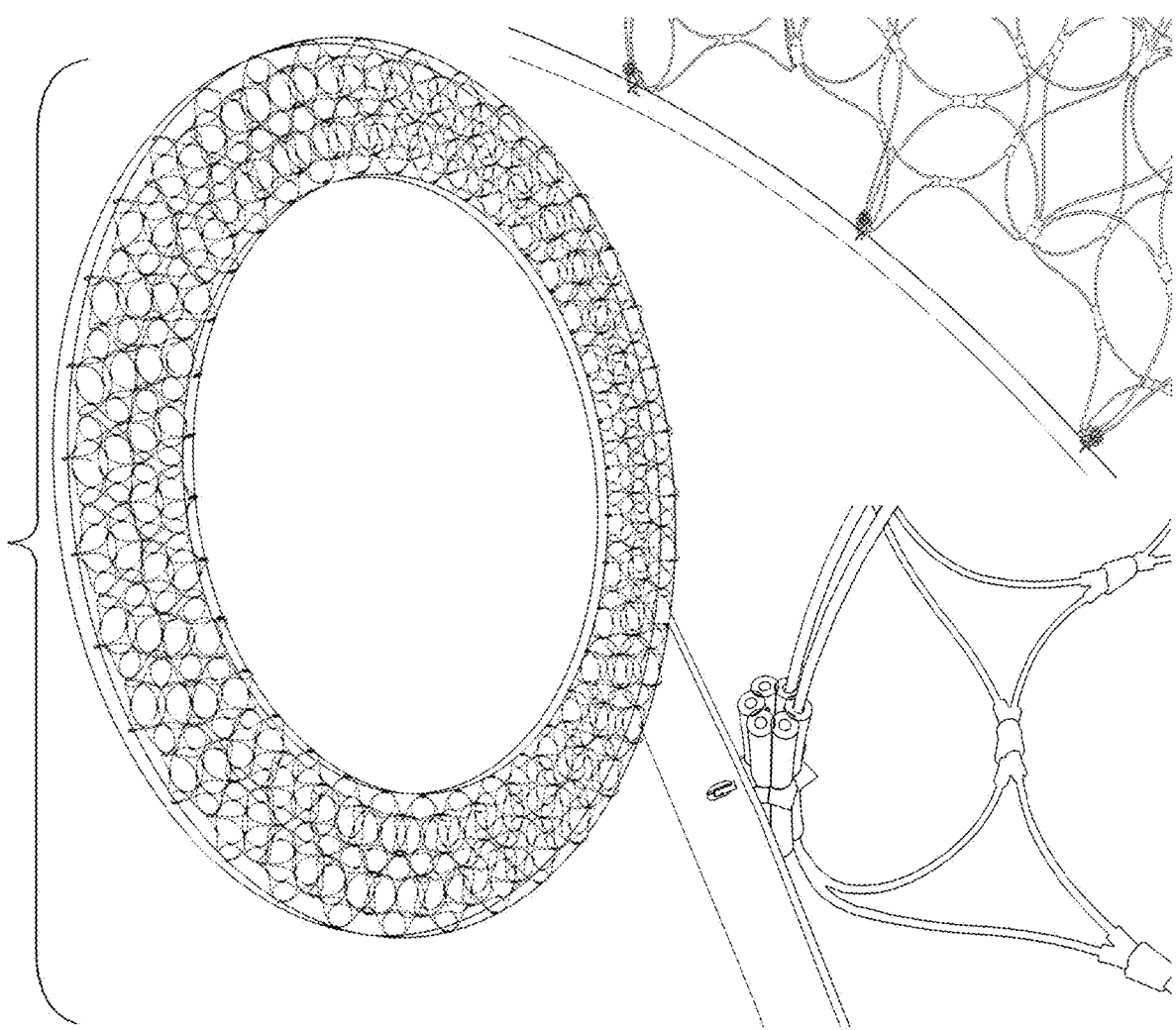
FIG. 30B shows a close up and a perspective view of a multimodular tube structure attached to a surface using mechanisms (pinned locking devices) that have been integrated into the intermodular connectors.

The Attachment of a Module and/or Modular Network Structure to the Surface(s) of an Object: A multimodular structure can form attachments and/or other types of interfaces with the surface(s) of an object. A modular structure attaches to an object's surface at the level of its linear elements and/or connectors. Connector(s) and/or linear elements may form physical attachments to objects in order to interface with its surface using various mechanisms. Mechanism may include but are not limited to, bone like material processes, pinned locking mechanisms, elastic locking mechanisms, compression rings and clips shown in FIG. 30A FIG. 30B shows an example of a multimodular structures' intermodular connectors attached to a surface.

Figure 30C:
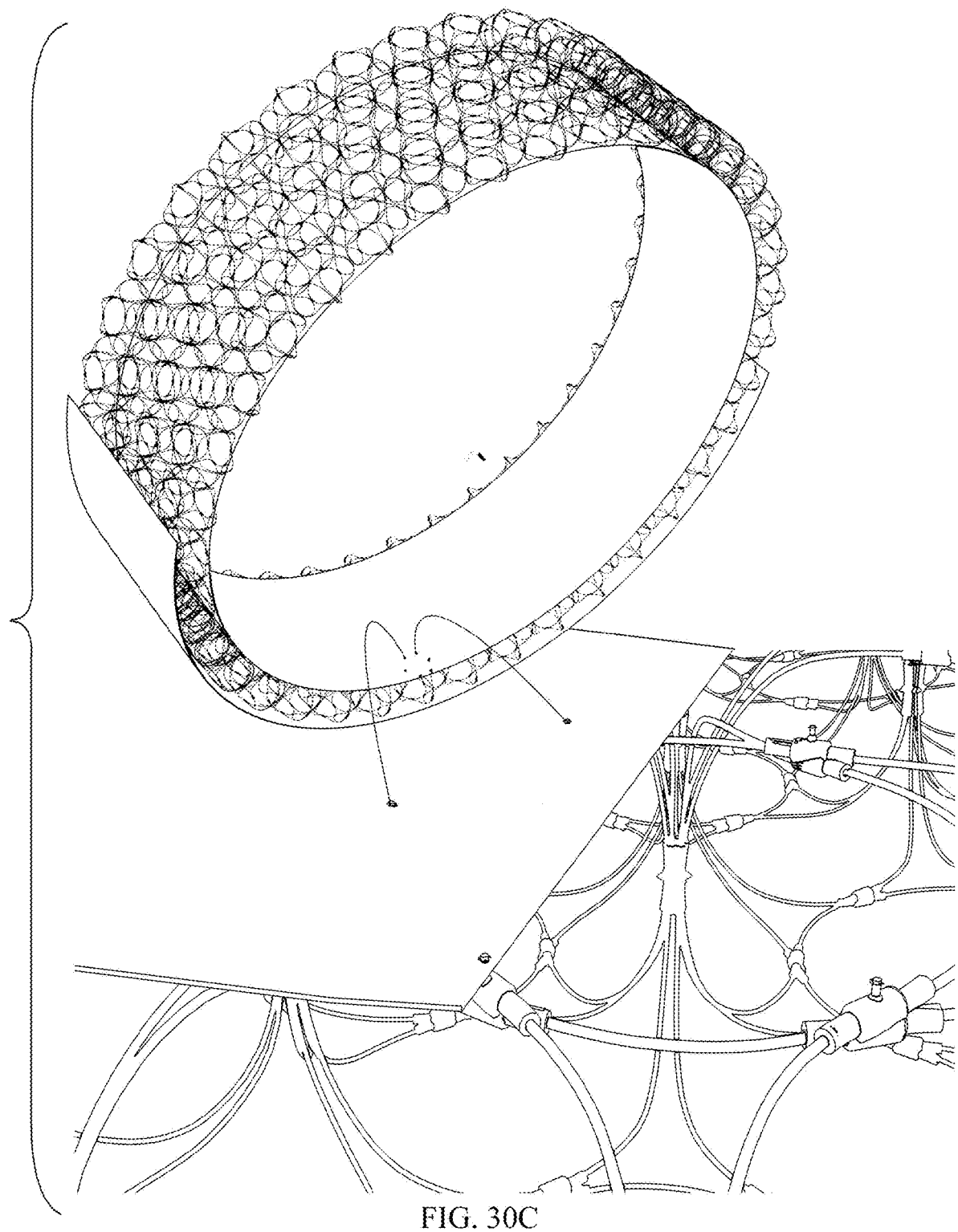
FIG. 30C shows a close up and a perspective cutaway view of a multimodular tube structure attached to a surface using mechanisms (clips) that have been integrated into the intramodular connectors.

FIG. 30C shows an example of a multimodular structures' intramodular connectors attached to a surface.

Surfaces and/or films that are permanently attached and/or reversibly attached to structures built from this system may function as part of its electrical network. Electrical circuits may exist that include a surface(s) and the multimodular structure. Current may flow to and from the surface to power electronic, electromechanical and/or tunable devices that are integrated into the linear elements and/or connectors.

The Programmability of Structures and the Analogy to the Skeletal Muscular System: A programmable structure formed from actuatable linear elements and connectors may have the ability to follow instructions and reversibly transition from its current shape into a desired shape. For example from a plane to a cylinder or possibly from a tube to a helix.

Programmable network structures must have some form of actuatable component. Programmable network structures may incorporate both tunable and nontunable linear elements and connectors. If tunable connectors and/or linear elements are used, they could be tunable at the electrochemical level and/or be mechanical.

Programming systems may require the activity of many linear elements and connectors within the structure causing its gross deformation. This does not mean that structure wide deformation requires broad action. The targeted deformation of specific regions within a structure may spur/catalyze large scale conformational changes in said structure.

Programming systems may also produce isolated regional changes in the structure that do not lead to collective deformation. These isolated regional changes within a structure may take the form of locomotive appendage structures like legs or wings. A regional actuatable appendages like the one shown in FIG. 40 B is an example of a simple everted structure whose linear elements may be programmed to actuate as a appendage having motive force.

Figure 40A:
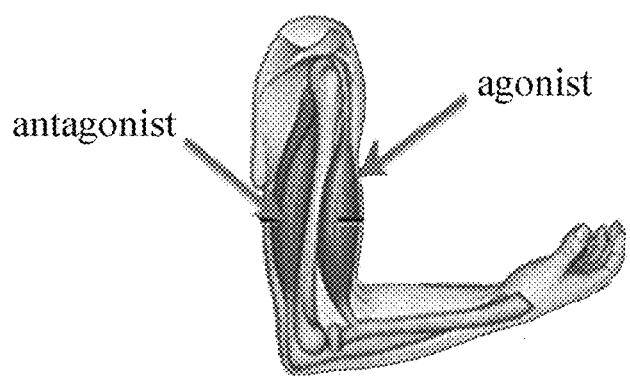
FIG. 40A is shown as an example of an appendage that demonstrating the biomechanics of muscle theory.

Muscles lengthen, shorten or remain a certain length. The linear elements, the modules they compose and their multimodular constructions can perform similarly. Lengthening and shortening may be caused by structural/mechanical and/or electrochemical deformation. FIG. 40A is an exemplary skeletomuscular appendage. Agonists, antagonists, synergists, fixators, stabilizers and neutralizers are terms used to describe this biological system's behavior. The dynamic relationship of forces that allow muscles to function as they do, could also be applied to the interconnected motion of linear elements that work in tandem to produce a specific motion.

The mechanical longitudinal twisting of a smart linear element as it is being electrochemically tuned by being stimulated at molecular level, could provide a high level of structural control. This hybrid control system may provide the fine to course spectrum of control seen in biological muscles.

The actuation/tuning of many linear elements in unison that are similarly oriented within a network structure may lead to the gross directional morphing of a structure. The morphing of a structure by tuning a plurality of the elements in specific orientations would cause the bending and/or twisting of the entire structure. An example of this may be an actuatable multimodular structure attached to a surface forming a morphable aerodynamic device and/or wing (FIGS. 36B and 36C).

A network structure's geometry and the programming system that controls the network's component parts should work in consort to efficiently provide the desirable deformation. A specific structure's geometry requires specific instructions to have it function efficiently. An example would be an anisotropic multimodular network structure designed to have its many linear elements similarly oriented. This structure's specific design may be analogous to the directional cellular architecture of cardiac muscle tissue. Another example may be a helical shaped multimodular network structure programmed to coil and/or uncoil and/or change its helical pitch when specific linear elements are tuned.

The diversity of linear element orientations that can exist within a network structure's architecture could allow it to function similar to skeletal muscle tissue. Altering the linear elements' lengths by coiling them could enhance the structure's ability to simulate the elastic contraction behavior of muscle fibers and/or tissue. The morphing/tuning of many obliquely oriented linear elements within a structure in a dynamic and/or complex way, may enhance the greater structure's morphing ability in a fine controlled way.

The Scale of a Structure and the Impact it has on its Behavior and Applications: The system's applications can be structural, mechanical and/or robotic. These labels are defined by their level of dynamism. In general, the smaller the modular network structure's scale, the more dynamic its behavior.

Increased module density within a multimodular structure can give it finer control/resolution and possibly increased strength and flexibility. This system's applications range from exclusively oscillatory to robotic, to mildly adaptable, to purely structural. These applications (Structural, Mechanical and Robotic) tend to follow the spectrum of scale. The smaller the multimodular structure the greater it's possible level of dynamism.

The examples given below are relatively simple and intended to show the system's potential.

Structural, Mechanical and Robotic Definitions and Applications: A structural application is a multimodular construction composed of tunable and/or nontunable material. If tunable, the construction can use mechanical and/or muscular/smart material tuning methods to alter its structural integrity and/or level of energy production. The application is structural when it functions as a structure and is not capable of performing physical work or exhibiting locomotive behavior.

A mechanical application is a multimodular construction composed of tunable and/or nontunable material. If tunable the construction can use mechanical and/or muscular tuning methods to alter its structural integrity and/or level of energy production, along with function as a working part of a greater machine.

A robotic application is a multimodular construction that contains tunable material. The construction can use mechanical and/or muscular tuning methods to alter its structural integrity and also produce energy while performing individual work functions that involve fine to gross movements.

Structural: Structural applications may be macroscopic or microscopic. Structural application can be purely structural, oscillatory and/or generate electricity via passive or active flexion.

FIG. 15A shows a planar structural application intended to generate electricity within its structure by harvesting energy from wave action. FIG. 15B shows a similar structural application intended to serve as a multimodular plane and/or surface that generates electricity by harvesting the energy from objects as they move across it. FIG. 15B could represent a bridge able to harvest energy from vehicles as they pass over it.

FIG. 31A shows an exemplary modular network cylinder structure built of four sided modules. FIG. 31B shows the same cylinder being distorted by internal forces. FIG. 32A shows an exemplary modular network cylinder structure built of four sided modules. FIG. 32B shows the same cylinder under tension, being stretched axially by external forces.

A structural application of a modular network structure could be to form resonance frequencies and function as an oscillatory device. The said joining of linear elements into loops within the structure may facilitate this oscillatory function. FIG. 33 shows the linked elements within a network structure as solid lines. This linking is reversible and may be programmable. The linked elements form loops that may be forced by the connectors to specifically vibrate to form a resonance frequency within the structure.

Mechanical: Purely mechanical applications using this system could be used at all scales. Specific applications may require different designs based on scale.

Figure 34:
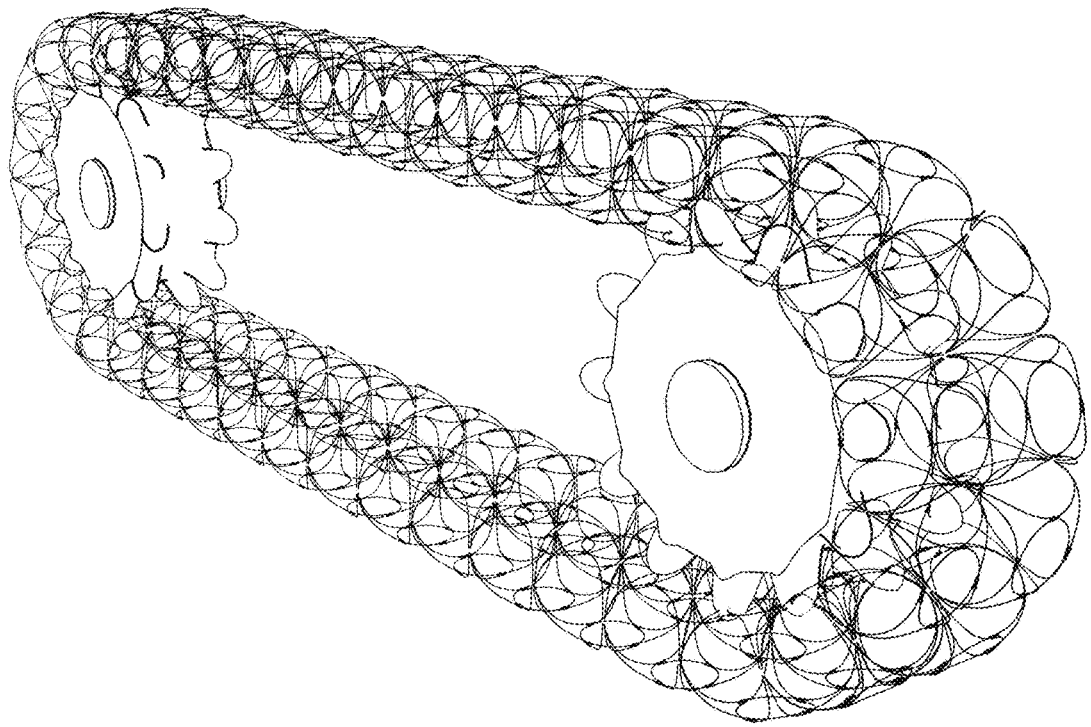
FIG. 34 is a perspective view showing a multimodular mechanical tract system built of two module layers forming a loop driven by sprockets wherein multimodular planes built of a number of module layers could absorb and control vibration in a variety of applications.

FIG. 34 shows a light weight, resilient, mechanical track or belt system with integral shock absorbing characteristics. Its shock absorbing characteristics may be modulated through the network structures' tunability.

Figure 35A:
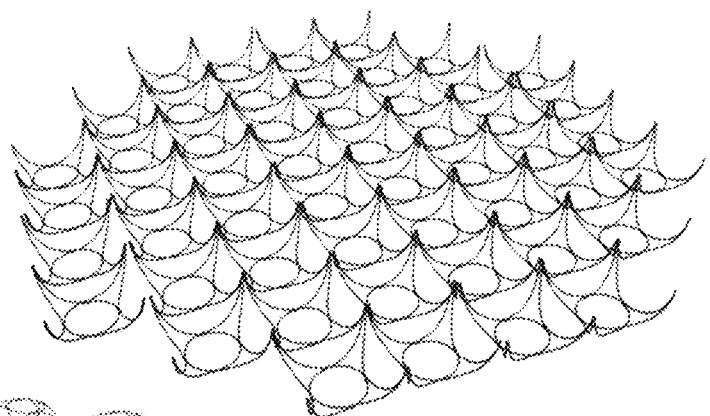
FIGS. 35A and 35B show a mono layer and a bilayer plane built of four sided modules from Family A.

Multimodular planes built of a number of module layers, could absorb and control vibration in a variety of applications. FIG. 35A shows a mono layer and FIG. 35B a bilayer plane built of four sided modules from Family A.

Figure 36A:
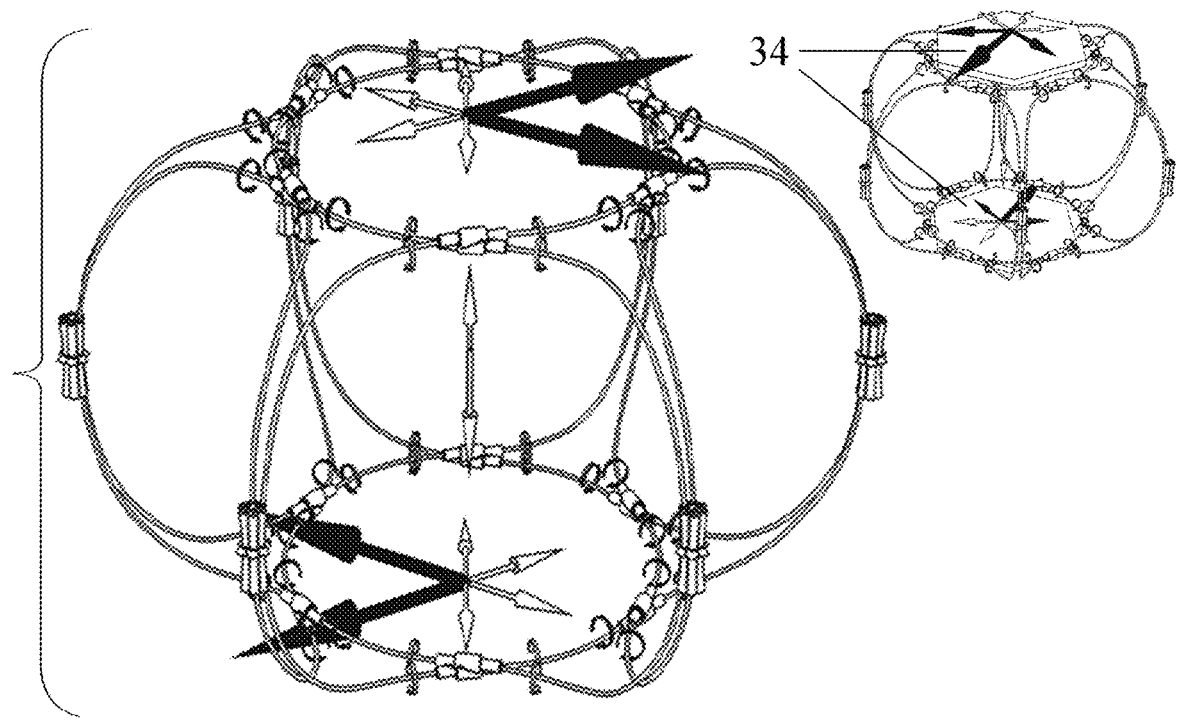
FIG. 36A shows a perspective view of two connected modules that are part of a larger structure. The arrows show the twisting of the linear elements and the direction force may be applied to the structure.
Figure 36B:
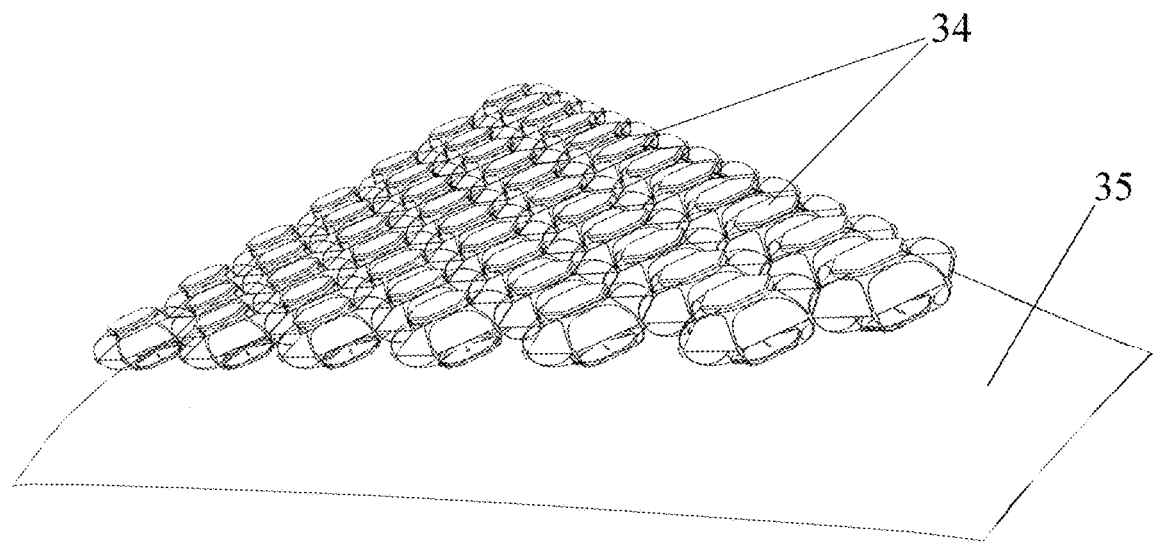
FIG. 36B is a perspective view of a tunable mutlimodular structure and its complimentary wing envelop. The multimodular structure is shown undistorted and outside the wings' surface to make it visible.
Figure 36C:
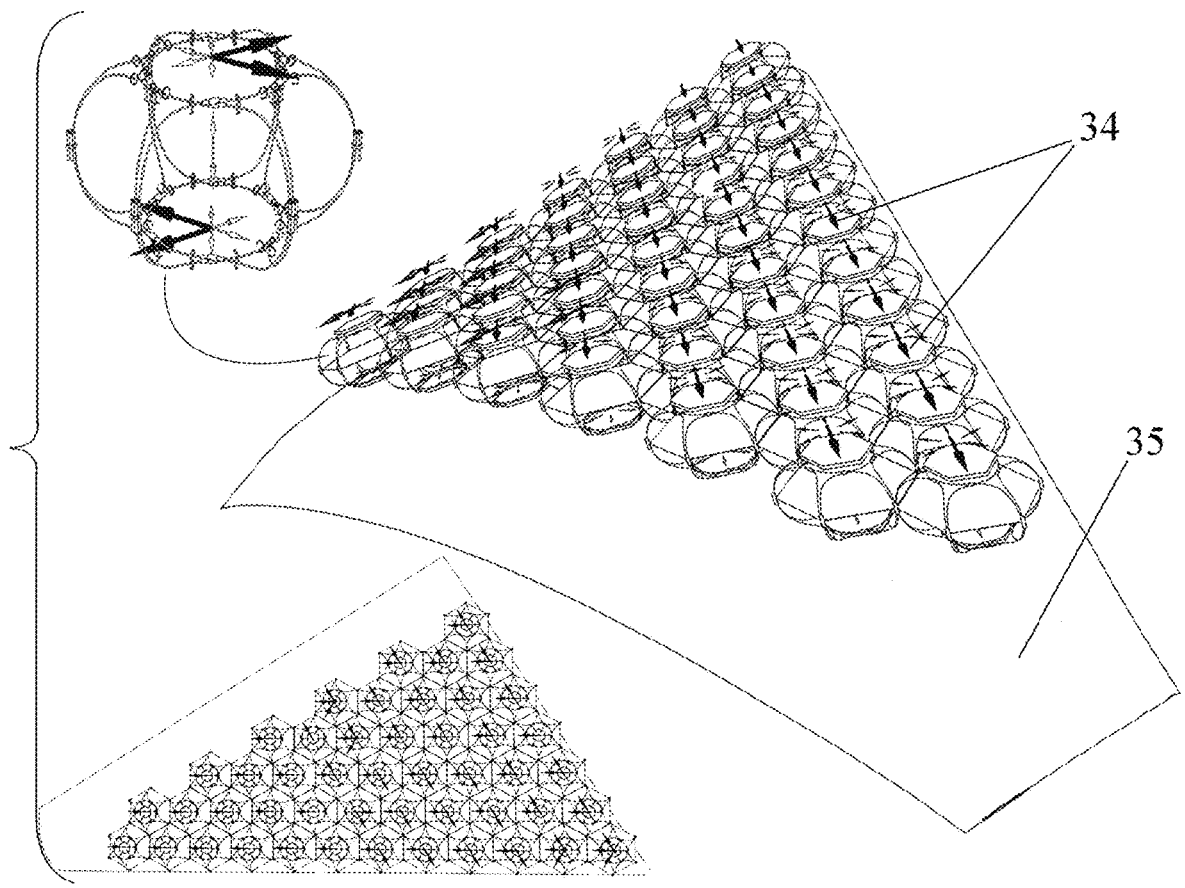
FIG. 36C shows perspective views of a wing and its associated tunable mutlimodular structure. The tunable multimodular structure and its complimentary wing envelop are shown to change shape along its length. The arrows show the pattern of the module's distortion and resulting force that is applied to the wing envelope/surface.

FIGS. 36A,B,C show portions of an actuatable wing design built of six sides modules that may use an electromechanical intermodular and intramodular connector system to torsion the linear elements to controllably and reversibly distort the wing structure along its length. Forces may be obliquely applied across the wing's surface by tuning the multimodular structure attached to its surface. FIG. 36A shows a portion of a multimodular assembly, the darkened arrows indicate the direction and level of force being applied to the structure as the actuatable connectors and/or linear elements reversibly deform the structure. FIG. 36B shows a multi modular structure in the form of a wing. The surface interface mechanism (34) connects the multimodular assembly to the wing envelope (35). FIG. 36C shows an examples of a programmable pattern of actuation being applied to a wing's surfaces by the multimodular structure and also the resulting wing twist. Note: the multimodular structure is place outside the wing's interior to make it visible.

An airfoil with continuous reversible spanwise twist would be optimally built from connectors and linear elements of the least possible weight. The lightest weight connectors and linear element system would not contain electromechanical devices. Light weight connectors having the ability to stimulate actuatable smart material linear elements using their associated control system interfaces (18) may be the most desirable system for a wing.

Figure 37A:
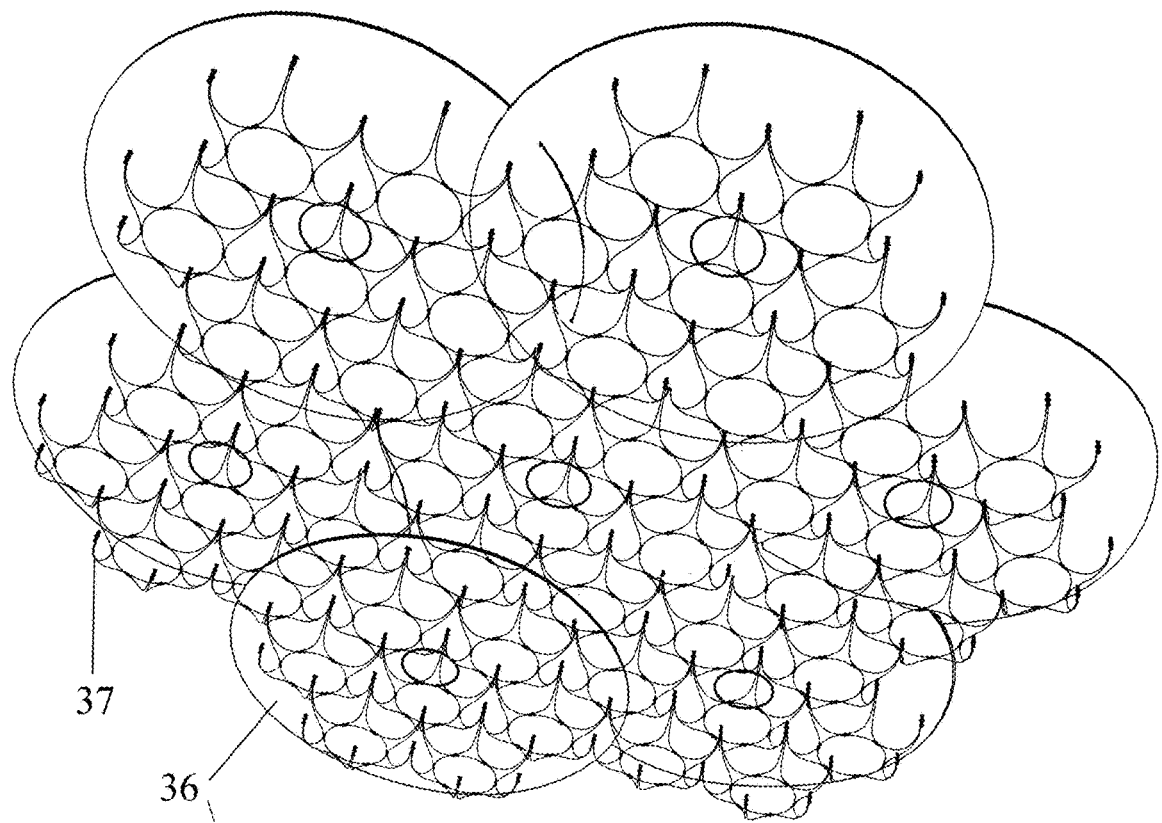
FIGS. 37A, B and C show perspective views of an actuatable smart material shaping system.

FIGS. 37A, B and C show an actuatable smart material shaping system. The connectors and/or linear elements that makes up this single layer shaping structure (37) may be tunable. A surface membrane (36) makes a complementary attachment to the structure's everted legs. The multimodular shaping structure (37) forms and controls the surface membrane(s) (36) it attaches to.

Figure 37B:
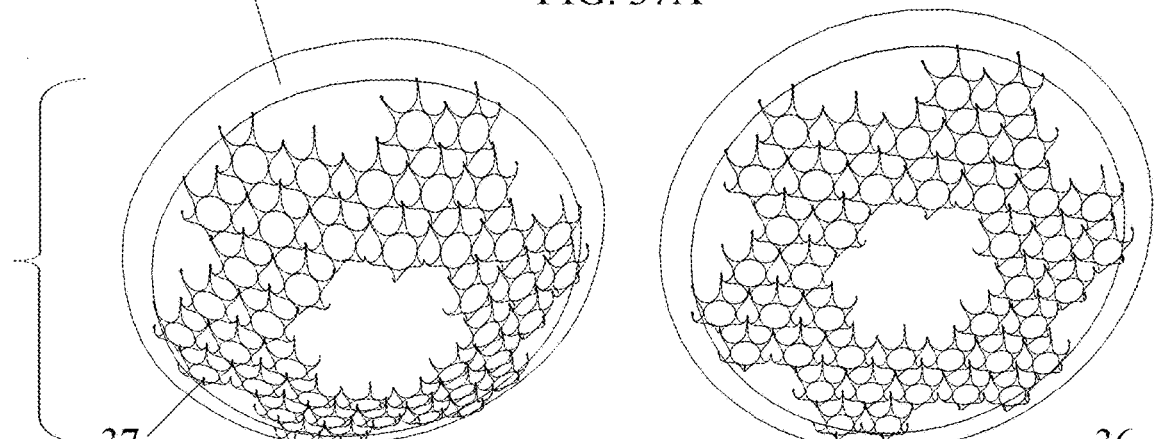
FIG. 37B shows a single layer modular structure and its associated surface membrane in a planar state and after morphing into a parabola.
Figure 37C:
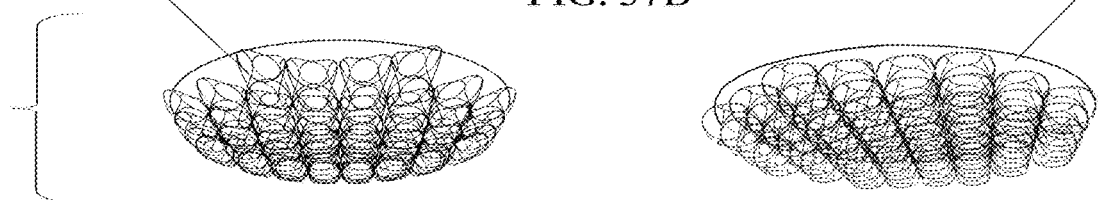
FIG. 37C shows a bi layer modular structure and it associated surface membrane in a planar state and after morphing into a parabola.

FIG. 37A shows a single layer structure of six sided modules attached to an array of round surface membranes (36) forming a versatile controllable parabolic reflector array. FIG. 37B shows a actuatable shaping structure (37) formed from a single layer of modules and also its surface membrane before and after morphing into a parabola. FIG. 37C shows a actuatable shaping structure (37) formed from a bi layer of modules and also its surface membrane before and after morphing into a parabola.

Figure 38:
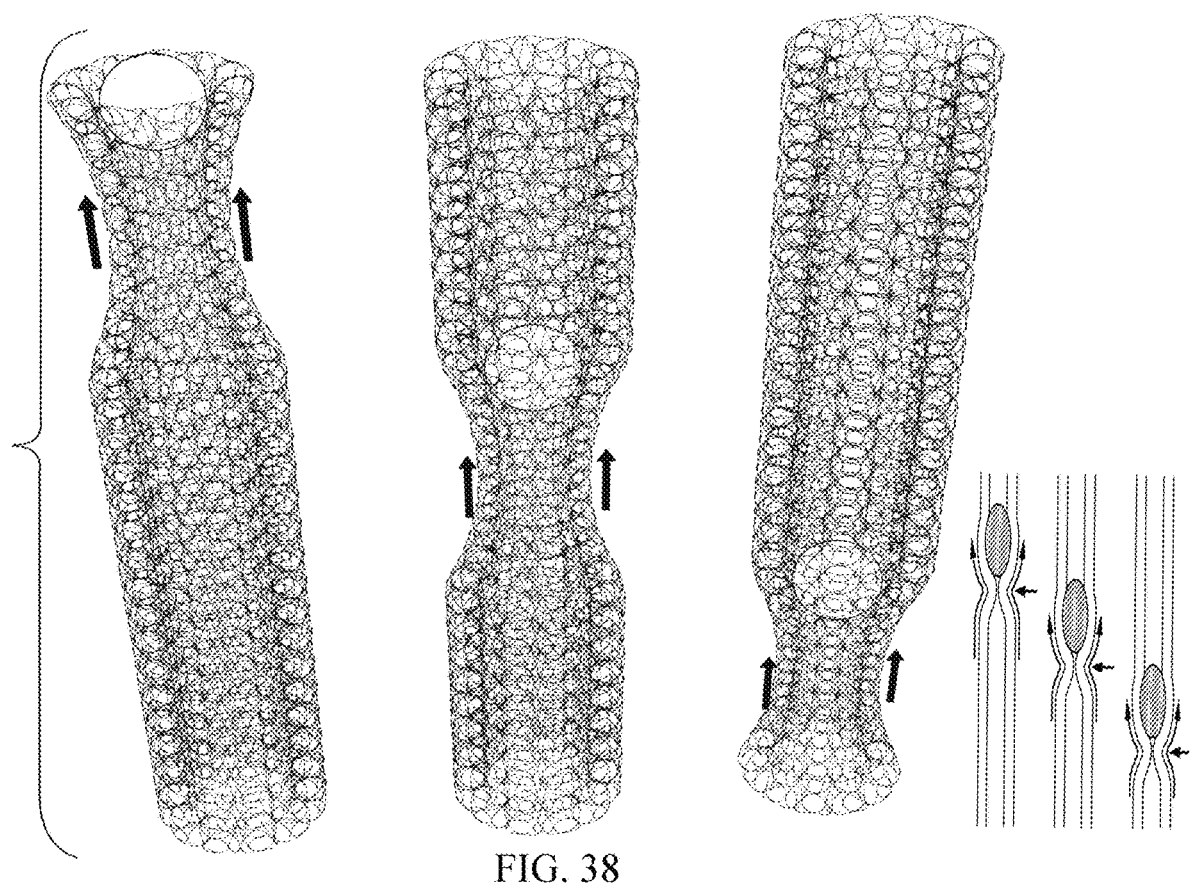
FIG. 38 is a perspective view of a tunable and programmable tube structure built of four sided modules of family A. The structure is shown to produce synchronized contractions along its length generating a wave that pushes material in front of it.

As shown in FIG. 38, an actuatable layer of modules could be formed into a highly controllable muscular tube and programmed to produce a peristaltic wave. The signaling cascade and sequential reversible tuning of a multimodular tube structure along its length could produce peristaltic behavior. The control of the cascade of signals flowing through the length of the tube may be through behavior based programming.

Figures 39A, 39B, 39C, 39D:
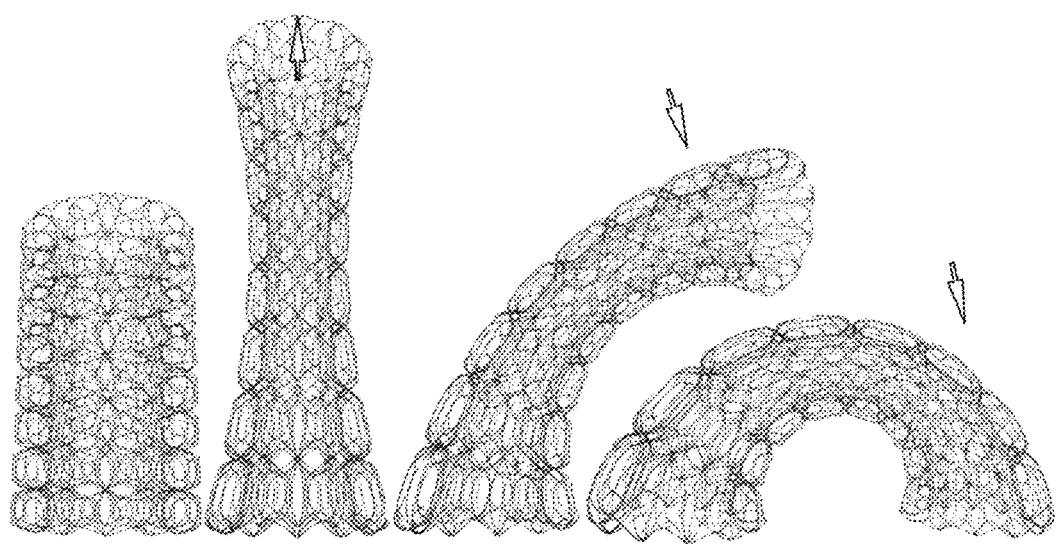
FIGS. 39A,B,C and D show a multimodular actuatable tube in the sequence of controlled movements in perspective view.

Robotic: FIGS. 39A, B, C and D shows an example of a tunable cylinder's locomotive behavior. FIG. 39A shows the cylinder in its static base line position. FIG. 39B shows the cylinder elongating. FIGS. 39C and 39D show the cylinder bending and reaching the locomotive surface. The connectors or linear elements could be made to reversibly grip the surface, allowing the cylinder to cartwheel in a controllable directional manner at a range of speeds, possibly sensing and moving along a chemical gradient.

The antagonistic pair muscle behavior represented in the human arm shown in FIG. 40A may be an example of the behavioral relationship linear elements have during certain locomotive behaviors, like inching and crawling. The linear elements that make up inverted and everted intermodular connections are oriented in such a way to allow the stabilizing agonist antagonist relationship between them.

The combination of forces necessary for locomotive behavior to occur in an individual biological appendage may be applied to the linear elements making up a single everted or inverted intermodular connection, and these forces could also be applied to large network structures containing may linear elements.

Figure 40B:
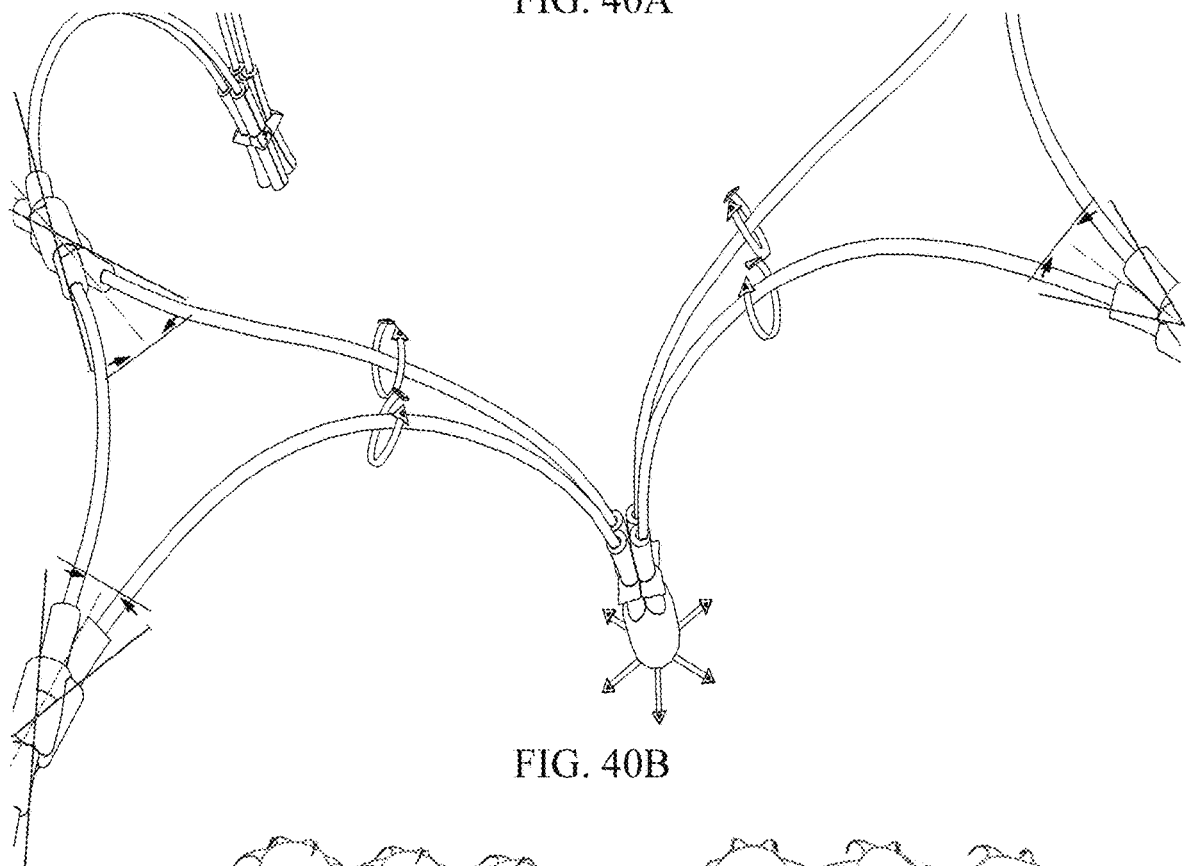
FIG. 40B is a perspective view of an everted structure formed from linear elements and connectors shown to be an appendage capable of motive force and behaviorally similar to biological appendages that do work at the micro and macro scale.

In FIG. 40B linear elements may be programmed to torque and/or tune in a sequence causing the everted or inverted intermodular connections to move in a sequence of directions that could function as a type of locomotion. This ambulatory system of directional movements allows the inverted and/or everted intermodular connection with terminuses to function as the motive appendages used for inching and crawling behaviors.

As seen in FIG. 40B, the linear elements that make up a single inverted or everted appendage are oriented collectively to the axis of the intermodular connector that houses them. This gives the linear elements the ability to collectively force the connector in all directions. FIG. 40B depicts a single everted structure (leg) and its potential behavior based on the tuning of its linear elements and connectors.

Figure 40C:
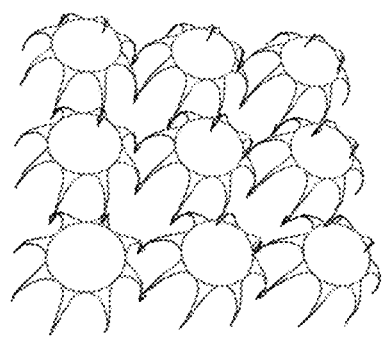
FIGS. 40C and D show perspective views of a programmable tunable modular plane made up of eight sided modules that form a system of the said everted appendage structures.
Figure 40D:
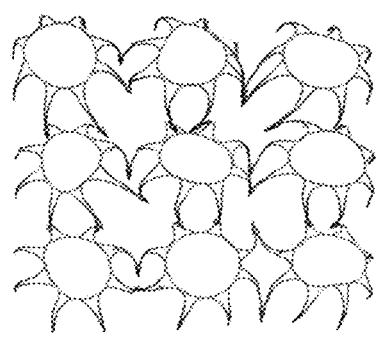
FIG. 40D shows the structure being tuned for locomotion.

The modular plane shown in FIG. 40C has a static orientation. There is no tuning of the everted appendage structures. The modular plane shown in FIG. 40D is tuning its structure and its everted appendages may function as ambulatory devices. The distorted central rings of the morphing modules reflect the forces being experienced by the linear elements.

Figure 41A:
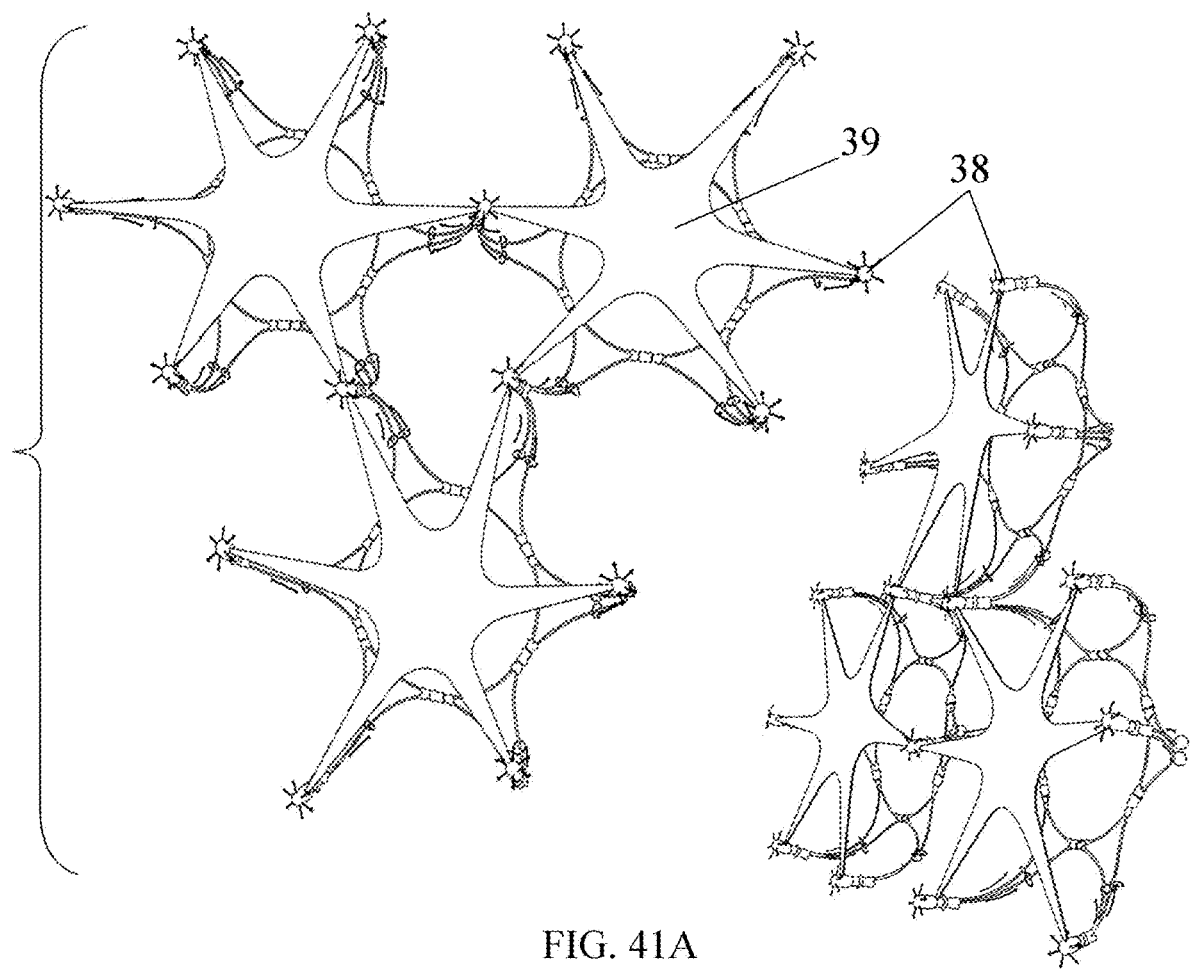
FIGS. 41A and B show perspective views of exemplary multimodular structures that incorporate tunable thin film actuators.

This ability of a multimodular structure to reversibly shape its structure may be further enhanced and controlled by the use of thin film carbon based actuators (38) that link to a structural process (39) created by module to module (intermodular) connections as shown in FIG. 41A. Attaching thin film actuators (38) to intermodular connections is similar to anchoring muscle to bone processes. This modular structure and film actuator system could function similar to biological muscle and bone, but unlike bone the linear element and connectors have controllable elastic properties and do not articulate.

Figure 41B:
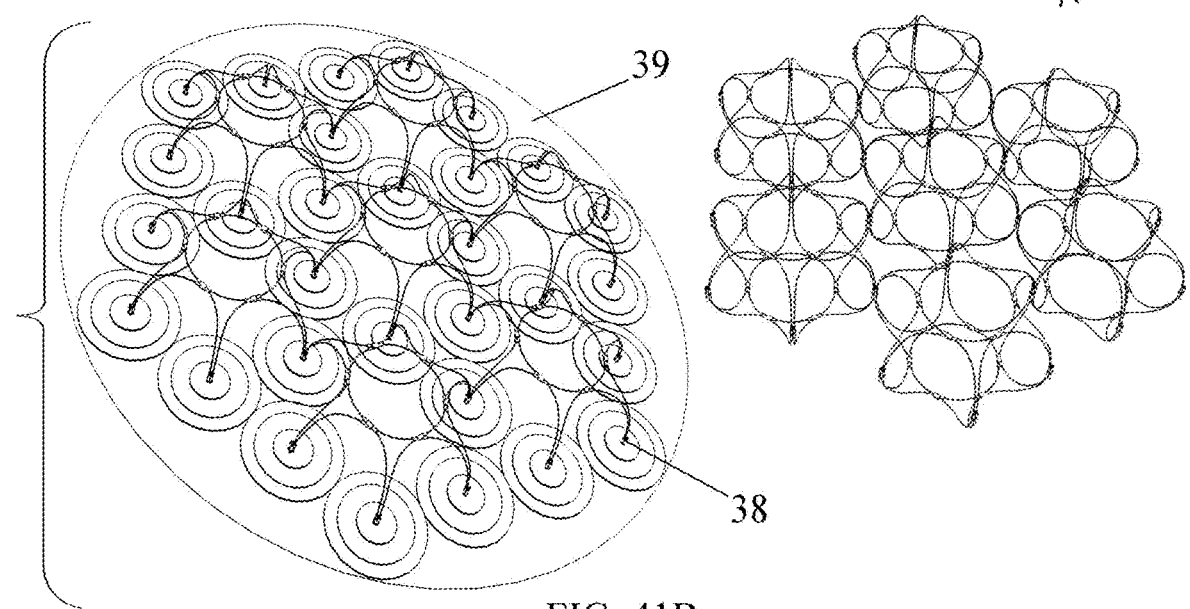
FIG. 41B shows the actuator(s) to be a single structure incorporated into a bilayer multimodular structure.

As shown in FIG. 41B the said film actuator (38) may also be formed from a continuous piece of material attached to many structural processes (39) covering a single layer multimodular structure in this case. The circular regions surrounding the attachment points shown on FIG. 41B depict the films zones contraction. The film actuator's attachment points are the structural processes and they are also the foci of the film actuator's zones of stimulation. In a functioning system the stimulation zones radii would be modulated and may behave dynamically.

The changes that occurs to the linear elements as a structure morphs is similar to a skeleton having its shape altered as muscles pull on it. This actuatable skeleton may allow muscle/thin film actuator lever attachment geometries to be controllable as the linear element formed skeleton changes its shape. The sensing and control of the interdependent individual parts of the system in view of the whole would require a network.

A planar structure made up of a single layer of modules with everted structures may function as an ambulatory device that crawls across a surface as shown in FIG. 40D. If this structure's "legs" are oriented vertically, it could function as a motive surface that transports material along its plane. The motive forces of a network of everted structures could be modeled on tube feet or microvilli.

The programming of linear element within a network structure designed for locomotive behavior requires the programming reflect behavioral fluidity. Instances where fluidity is not desired could be a digging or agitation behavior.

Figure 35B:
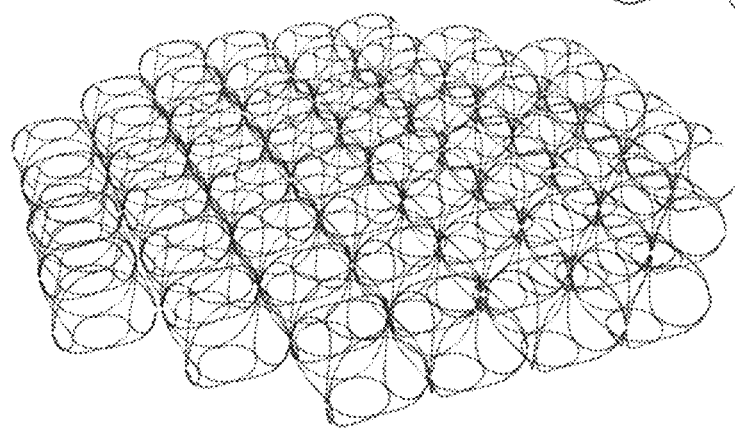

A monolayer multimodular plane shown in FIG. 35A has all everted intermodular connections. The bilayer plane as shown in FIG. 35B is made up of inverted and everted intermodular connections, both systems are adapted to certain locomotive functions. Note: the composition of any type of plane composed of modules is not limited to a specific module type or combination.

The muscular thin film could be replaced with, and/or function as, photovoltaic and/or piezoelectric thin film.

A plane of interconnected modules designed for locomotion could morph into different shapes if it has the correct planar geometry. For example, a plane could morph into a sphere or cylinder. The resulting sphere could retain its locomotive capabilities by modifying its locomotive and/or behavioral programming.

The above describes a nature inspired, hierarchical building system that uses discrete linear elements and connectors to form modules that interconnect to form potentially geometrically complex multimodular structures. This system may form reactive digital material structures built of a plurality of discrete units. The linear elements and connectors may meet and interact in a coordinated way to form structures that may be capable of adaptive behavior. Methods of hierarchical assembly may be used to form modules and/or multimodular structures from discrete linear element and connector parts. Methods of manufacturing modules and/or multimodular systems may employ methods and mechanisms that interface with programmable electronic devices.

In view of the above, it will be seen that the object of the invention is achieved and other advantageous results attained. As various changes could be made in the above structures, use or fabrication without departing from the scope of the invention, it is intended that all matter contained in the above description or shown in the accompanying drawings shall be interpreted as illustrative and not in a limiting sense.

What is claimed:

1. An actuatable modular structure comprising linear elements held in assembly with an intermodular connector and an intramodular connector, said intramodular connector interfacing with at least two linear elements along their lengths, said at least two linear elements passing completely through said intramodular connector, and said intermodular connector interfacing with termini of at least two linear elements, each linear element interfacing with two intramodular connectors and with two intermodular connectors, at least one of said linear elements, intramodular connector or intermodular connector functioning as an actuator for shaping the structure.

2. The actuatable modular structure of claim 1 wherein at least one of said linear elements is formed of a smart material and functions as an actuator.

3. The actuatable modular structure of claim 1 wherein said intramodular connector is formed of a smart material or is a electromechanical device and functions as an actuator.

4. The actuatable modular structure of claim 1 wherein said intermodular connector is formed of a smart material or is a electromechanical device and functions as an actuator.

5. The actuatable modular structure of claim 1 wherein the at least two linear elements overlap in the intermodular connector or in the intramodular connector.

6. The actuatable modular structure of claim 2 wherein the intramodular connector or the intermodular connector allow substantial free rotation of the linear elements in the intramodular connector or the intermodular connector.

7. The actuatable modular structure of claim 6 wherein the intramodular connector or the intermodular connector and the linear elements have complimentary engaging and alignment mechanisms.

8. The actuatable modular structure of claim 2 wherein at least one of said linear elements is composed of a plurality of materials.

9. The actuatable modular structure of claim 1 wherein at least one of said linear elements is composed of a bendable or torsionable material.

10. The actuatable modular structure of claim 1 wherein at least one of said linear elements, intramodular connector or inter modular connector is formed of a plurality of smart regions separated by a material layer that can selectively transmit and receive energy across its surface.

11. The actuatable modular structure of claim 1 wherein the linear elements are formed from isotopically distributed particles or anisotopically distributed particles.

12. The actuatable modular structure of claim 3 or 4 wherein the electomechanical device has a gripping or engaging mechanism for gripping or engaging the linear elements.

13. The actuatable modular structure of claim 12 wherein the electromechanical device is housed within a control system region of the intermodular connector or intramodular connector.

14. An actuatable modular structure comprising linear elements held in assembly with an intermodular connector and an intramodular connector, said intramodular connector interfacing with at least two linear elements along their lengths, said at least two linear elements passing completely through said intramodular connector, and said intermodular connector interfacing with termini of at least two linear elements, each linear element interfacing with two intramodular connectors and with two intermodular connectors, at least one of said intramodular connector or intermodular connector having an electromechanical device for shaping the structure.

15. The actuatable modular structure of claim 14 wherein the linear elements and the electromechanical device have complimentary engaging and alignment mechanisms.

16. The actuatable modular structure of claim 14 comprising a peristaltic device.

17. The actuatable modular structure of claim 14 comprising a parabolic adjustable reflector.

18. The actuatable modular structure of claim 14 comprising a wing.

* * * * *